United States Patent
Nagasawa et al.

[11] Patent Number: 6,141,484
[45] Date of Patent: *Oct. 31, 2000

[54] METHOD OF AND APPARATUS FOR EDITING VIDEO SIGNALS USING A TEMPORARY RECORDING MEDIUM

[75] Inventors: Fumihiro Nagasawa; Kimio Kokubun, both of Kanagawa, Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/898,805

[22] Filed: Jul. 23, 1997

Related U.S. Application Data

[63] Continuation of application No. 08/402,707, Mar. 13, 1995, abandoned.

[30] Foreign Application Priority Data

Mar. 14, 1994 [JP] Japan ................................ 6-042717
Feb. 14, 1995 [JP] Japan ................................ 7-025492

[51] Int. Cl.[7] .................................................. H04N 5/76
[52] U.S. Cl. ............................................. 386/52; 386/65
[58] Field of Search ................................ 386/52, 54, 55, 386/60, 62, 64, 65, 46; 345/328; H04N 5/76

[56] References Cited

U.S. PATENT DOCUMENTS

| | | | |
|---|---|---|---|
| 5,043,828 | 8/1991 | Sasho | 386/52 |
| 5,164,839 | 11/1992 | Lang | 358/335 |
| 5,206,929 | 4/1993 | Langford et al. | 358/311 |
| 5,216,552 | 6/1993 | Dunlap et al. | 348/705 |
| 5,477,337 | 12/1995 | Schuler | 358/335 |
| 5,539,527 | 7/1996 | Kajimoto et al. | 386/52 |
| 5,647,047 | 7/1997 | Nagasawa | 386/52 |

*Primary Examiner*—Huy Nguyen
*Attorney, Agent, or Firm*—Frommer Lawrence & Haug, LLP.; William S. Frommer; Dexter T. Chang

[57] ABSTRACT

An editing method and an editing system can considerably improve an efficiency for editing. This editing system includes a reproducing-side VCR (2), a temporary recording medium (3), a DME (5), an audio mixer (6), a recording-side VCR (8) and an editing controller (10) under which control image data indicative of a first cut reproduced by the reproducing-side VCR (2) is recorded by the recording-side VCR (8), a part of image data indicative of the first cut is recorded on the temporary recording medium (3), image data indicating a second cut and an output from the temporary recording medium (3) are processed by the DME (5) and the audio mixer (6) and processed results are recorded by the recording-side VCR (8).

26 Claims, 26 Drawing Sheets

FIG. 4A

Editing Table

| Cut No. | Cut Start Point | Cut End Point | Buffering Start Point | Buffering End Point | Effect Start Point | Effect End Point | Buffering Data Output Start Point |
|---|---|---|---|---|---|---|---|
| Cn | Pi | Po | Bi | Bo | Ei | Eo | Ep |

FIG. 4B

Temporary Recording Medium Table

| Cut No. | Time Code | Lead Sector Address | Data Length Data |
|---|---|---|---|
| Cn | HMSF | #0000000 | 10Megabytes |

FIG. 4C

Default Values

| Buffering Time Data | BU |
| Effect Time Data | EF1 |
| Pre-Roll Time Data | PR |
| Delay Time Data | D |
| Time Data Required Before Effect Starts | EF2 |
| Time Code Data of Recording Start Point | Ri |
| Time Code Data of Playback Start Point | Ps |

FIG. 4D

Calculated Values

| Reference Differential Data | Ref |
| Recording-Side/Reproducing Side Differential Data | RStc |
| Present Differential Data | Ntc |

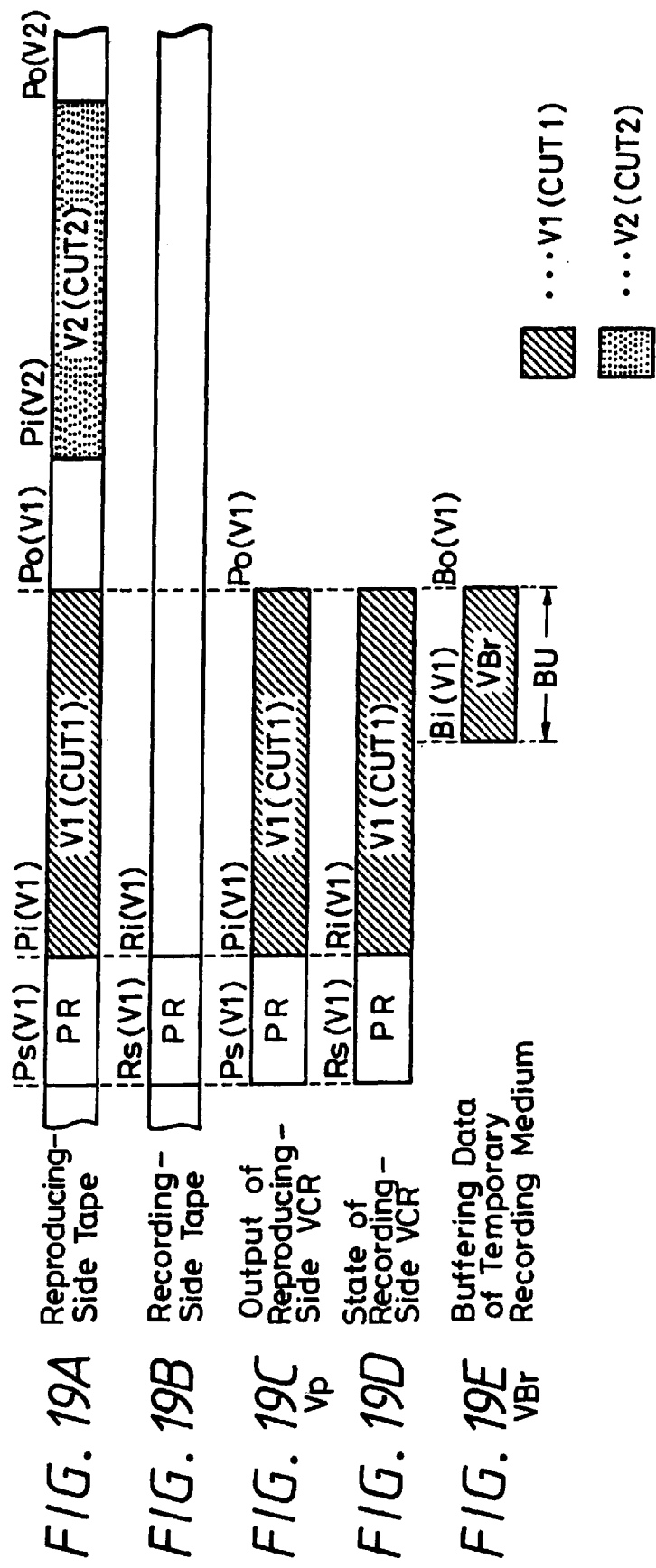

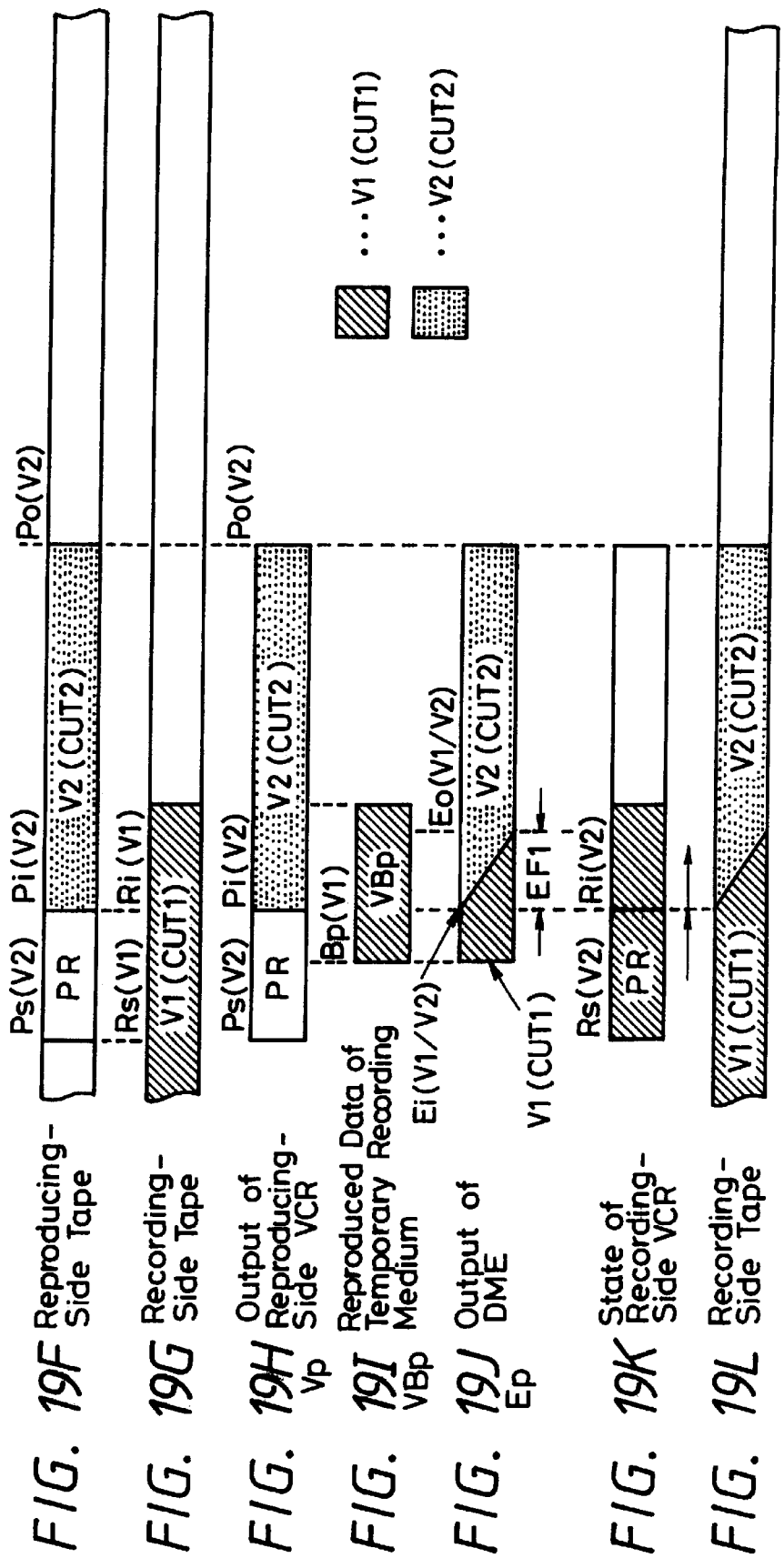

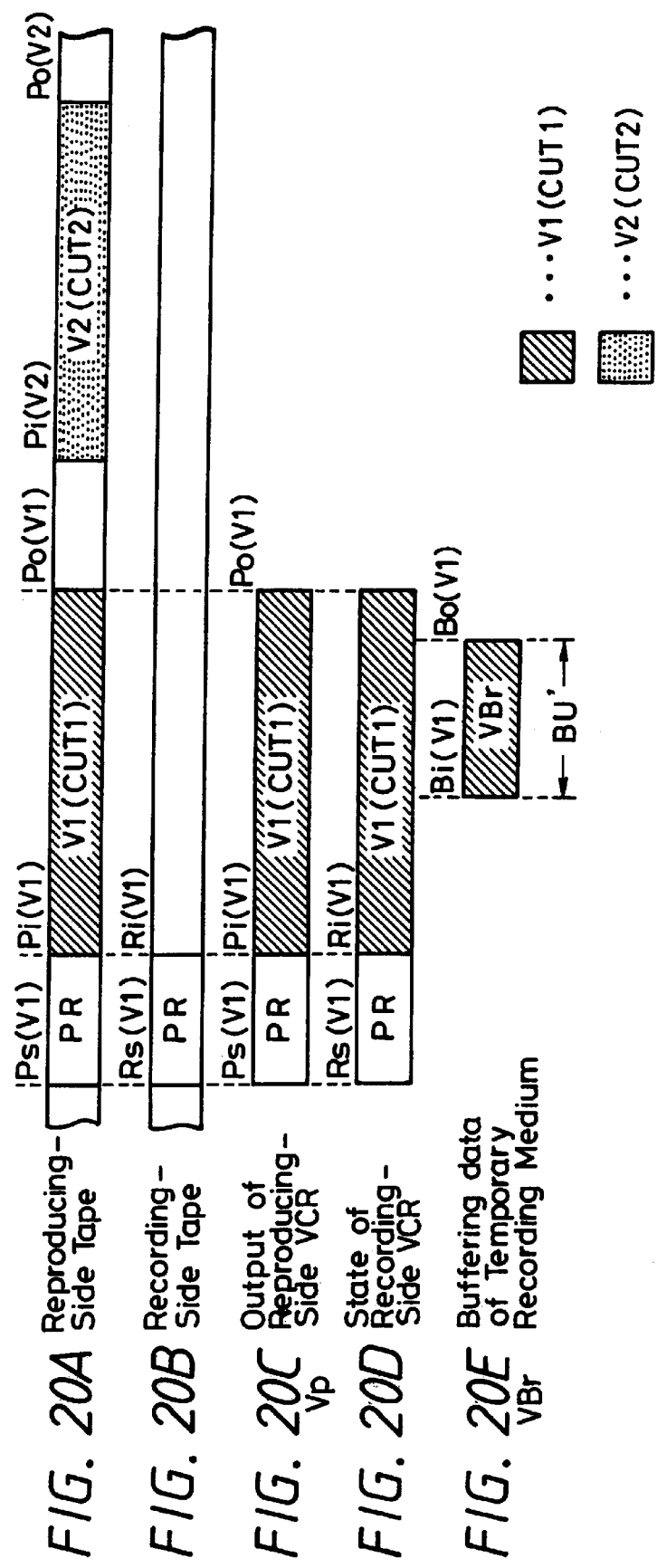
FIG. 20A Reproducing-Side Tape
FIG. 20B Recording-Side Tape
FIG. 20C Output of Reproducing-Side VCR Vp
FIG. 20D State of Recording-Side VCR
FIG. 20E Buffering data of Temporary Recording Medium VBr

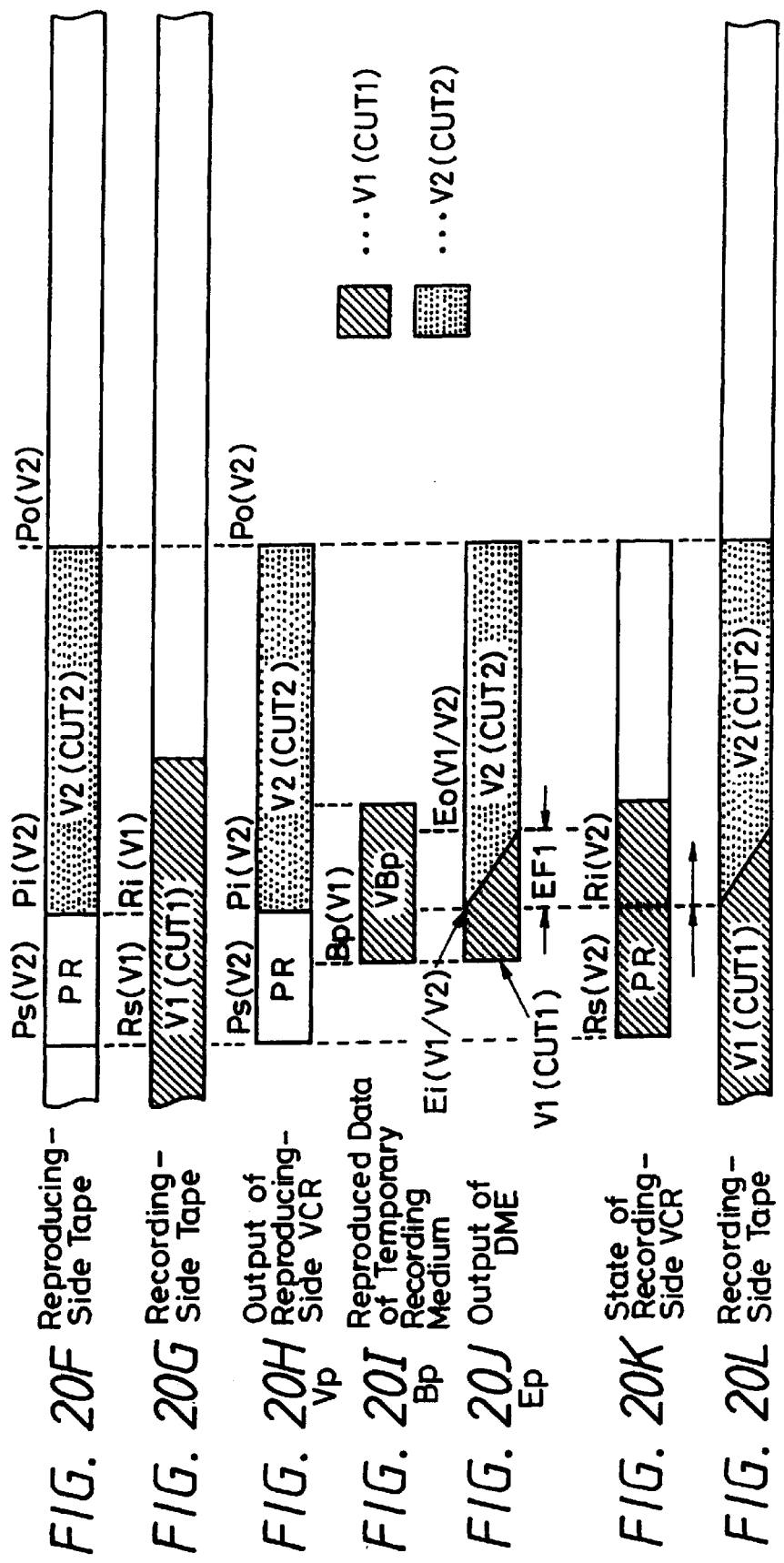

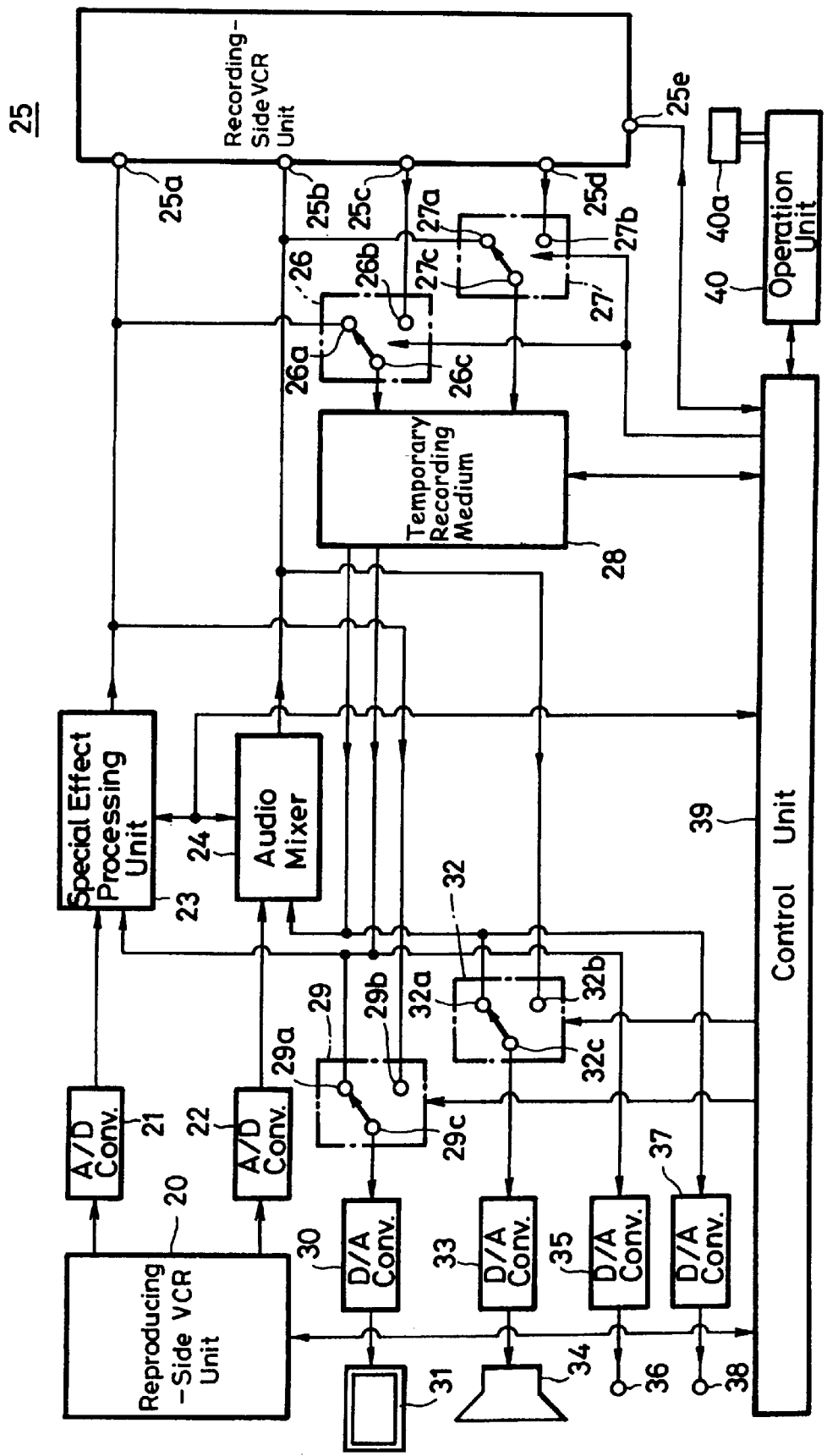

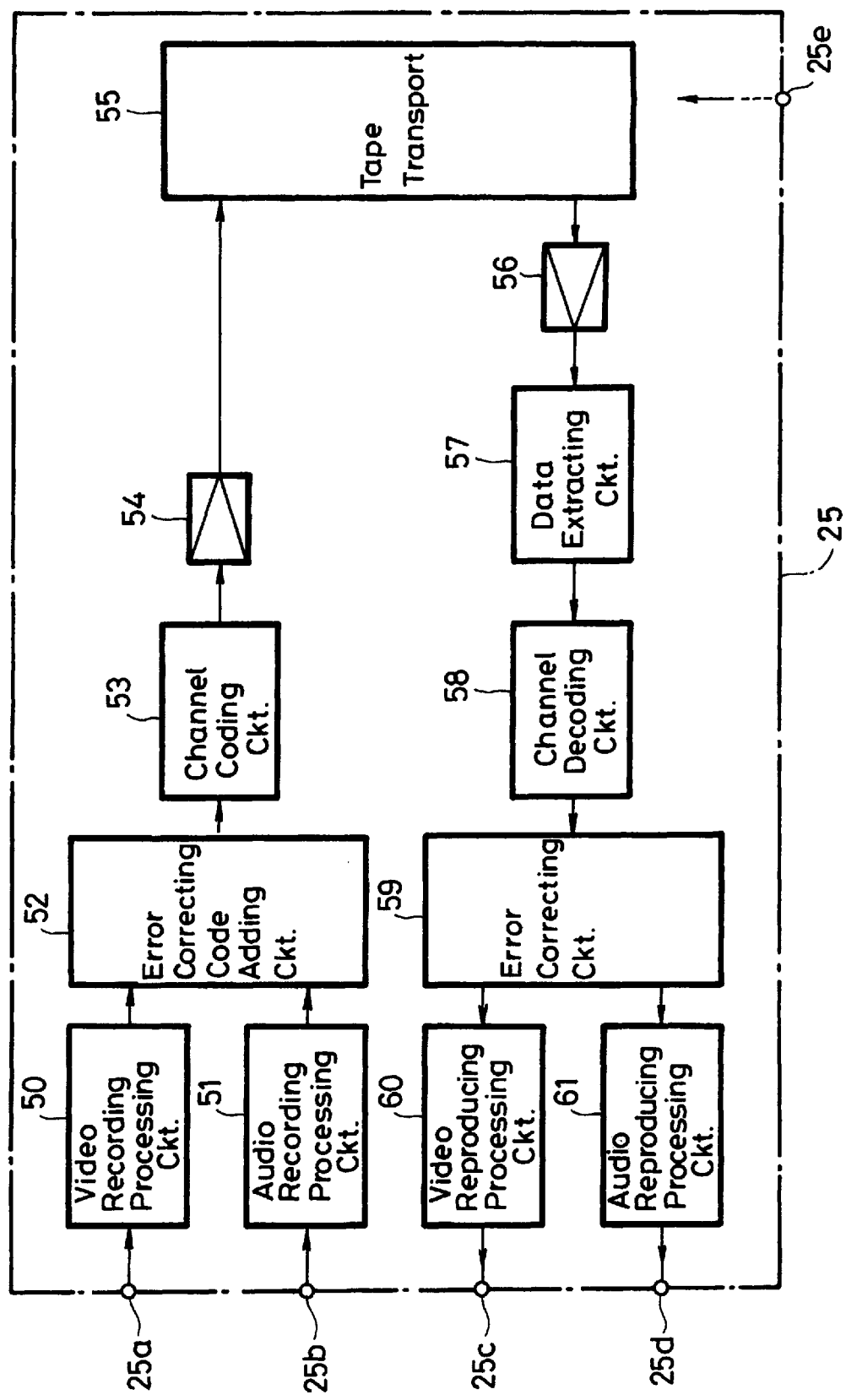

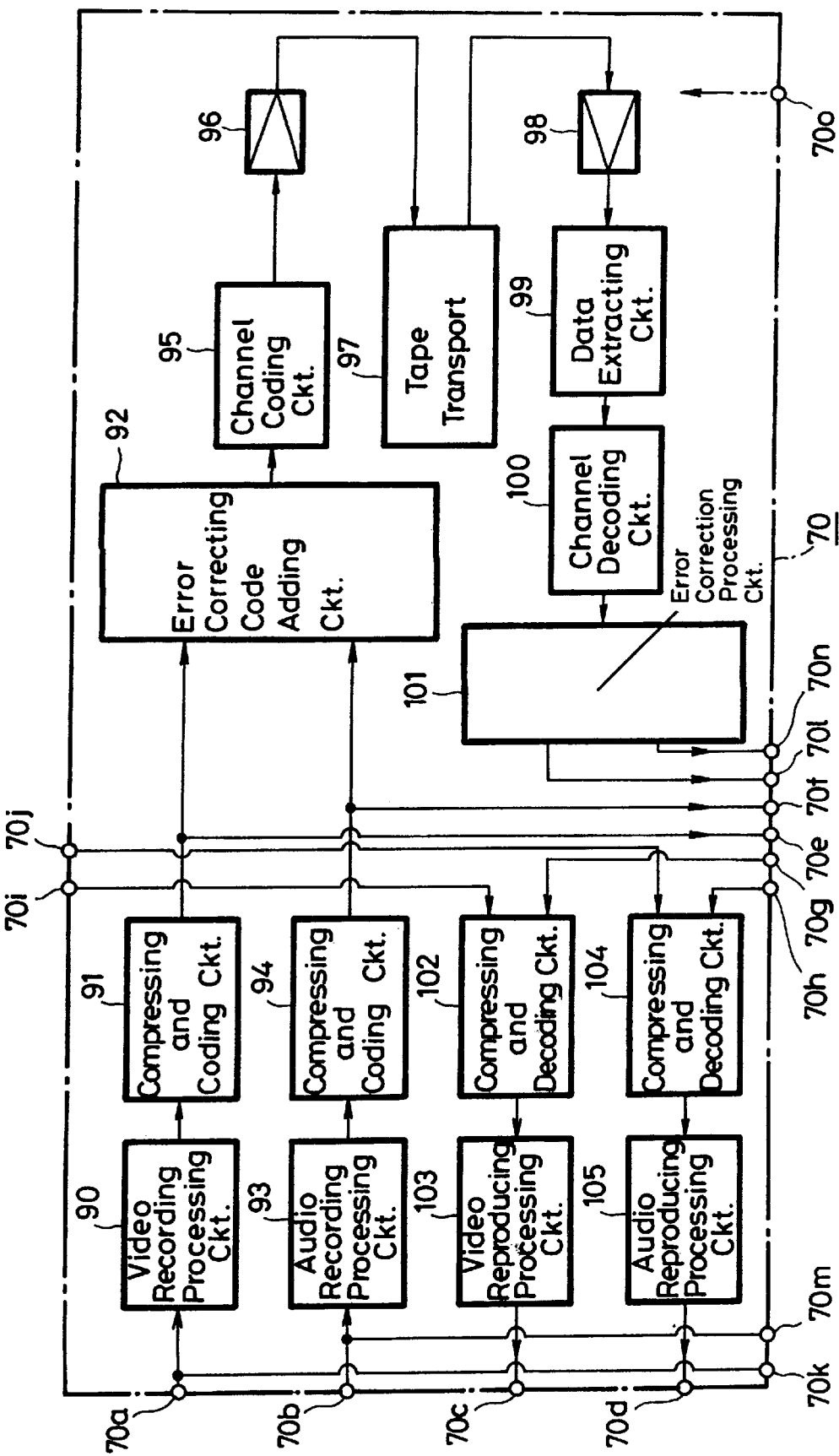

METHOD OF AND APPARATUS FOR EDITING VIDEO SIGNALS USING A TEMPORARY RECORDING MEDIUM

This application is a continuation of application Ser. No. 08/402,707, filed Mar. 13, 1995 abandoned.

BACKGROUND OF THE INVENTION

The present invention relates to method of and apparatus for editing a video signal for use with an integrated-type editing machine, a video cassette recorder (VCR) with an editing function or editing system for editing and recording a video signal, for example.

Editing systems for editing a video signal (including an audio signal) need a plurality of VCRs for reproducing video signals, a digital multi-effector (DME) or digital video effector (DVE), audio mixer, recording VCR in order to implement so-called A-B roll editing, i.e., to provide a wide variety of special effects on two video and audio recorded materials (i.e., digital special effect such as "mix", "wipe", "enlarge", "reduce" and coordinate transform of video signal and audio mix effect et cetera) and an editing apparatus for executing editing by controlling these devices.

FIG. 1 of the accompanying drawings shows in block form an example of an editing system. The editing system will be described below with reference to FIG. 1.

Referring to FIG. 1, the editing system comprises a reproducing-side VCR 102 for reproducing a recorded material tape 101 serving as an A roll, a reproducing-side VCR 103 for reproducing a recorded material tape 104 serving as a B roll, a DME (digital multi-effector) for creating special effects on a reproduced video signal V1 supplied thereto from the reproducing-side VCR 102 and a reproduced video signal V2 supplied thereto from the reproducing-side VCR 103, an audio mixer 106 for creating various audio effects on a reproduced audio signal A1 supplied thereto from the reproducing-side VCR 102 and a reproduced audio signal A2 supplied thereto from the reproducing-side VCR 103, a recording-side VCR 107 for recording an output signal Vo supplied thereto from the DME 105 and an output signal Ao from the audio mixer 106 on a magnetic tape of a video tape cassette 108 and an editing controller 109 for controlling the above-mentioned respective units.

As shown in FIG. 1, the recorded material tape 101 serving as the A roll is set on the reproducing-side VCR 102 and the recorded material tape 104 serving as the B roll is set on the reproducing-side VCR 103. The reproduced video signals V1, V2 from the reproducing-side VCRs 102, 103 are supplied to the DME 105 and the reproduced audio signals A1, A2 are supplied to the audio mixer 106, respectively. The recorded material tape 104 serving as the B roll is made by copying the recorded video signal of the recorded material tape 101 serving as the A roll.

The DME 105 creates various special effects, such as "mix", "wipe" and "dissolve" on the reproduced video signals V1, V2 supplied thereto from the reproducing-side VCRs 102, 103 under the control of a control signal supplied thereto from the editing controller 109 which will be described later on. The DME 105 supplies the video signal Vo to the recording-side VCR 107 as a processed result. The audio mixer 106 creates various effects, such as "delay", "reverberation", "equalizing", "panning" and "mix" on the reproduced audio signals A1, A2 supplied thereto from the reproducing-side VCRs 102, 103 under the control of a control signal supplied thereto from the editing controller 109. The audio mixer 106 supplies the audio signal Ao to the recording-side VCR 107 as a processed result.

The recording-side VCR 107 records the video signal Vo supplied thereto from the DME 105 and the audio signal Ao supplied thereto from the audio mixer 106 on the magnetic tape of the video tape cassette 108 by using rotary magnetic heads (not shown) so as to form slant tracks under the control of a control signal supplied thereto from the editing controller 109. Thus, the video tape cassette 108 is produced as a finally edited recorded material tape cassette.

The editing controller 109 controls the above-mentioned devices based on a variety of editing commands entered thereto by the operator through a console unit (not shown) or editing data, such as EDL (edit decision list) data composed of time code data of edit points and a variety of control data.

Operation of the editing system shown in FIG. 1 will be described with reference to FIG. 2. FIG. 2 is a schematic diagram used to explain operation of the editing system shown in FIG. 1 to record three cuts by using the reproduced video signals V1, V2 from the reproducing-side VCRs 102, 103 to provide the video tape cassette 108 as the finally edited recorded material tape cassette.

In FIG. 2, reference symbol V1 (ST1) depicts the reproduced video signal supplied from the reproducing-side VCR 102 at step ST1 which is the first processing step; reference symbol V2 (ST2) depicts the reproduced video signal supplied from the reproducing-side VCR 103 at the step ST1 which is the first processing step ST1; reference symbol Vo1 (ST1) depicts the output video signal supplied from the DME 105 at step ST1 which is the first processing step; reference symbol Vo2 depicts a recording signal at step ST1 which is the first processing step ST1; reference symbol V1 depicts a reproduced video signal supplied from the reproducing-side VCR 103 at step ST2 which is the next processing step; reference symbol V2 (ST2) depicts a reproduced video signal supplied from the reproducing-side VCR 103 at step ST2 which is the next processing step; reference symbol Vo1 (ST2) depicts an output video signal supplied from the DME 105 at step ST2 which is the next processing step; reference symbol Vo2 depicts a recording signal at step ST2 which is the next processing step; and reference symbol Vr depicts an edited result that is finally recorded on the tape of the video tape cassette 108 set on the recording VCR 107.

Further, in FIG. 2, reference symbols CUT1, CUT2 and CUT3 depict recorded material cuts, respectively. Reference symbol (1/2) affixed to the cut CUT2 depicts the first half portion of the cut CUT2. Reference symbol (2/2) affixed to the cut CUT2 depicts the second half portion of the cut CUT2. Reference symbol PRt depicts a pre-roll period, reference symbol Td depicts a special effect period, reference symbol Tv1 depicts a recorded period, and reference symbol Tv2 depicts a recording period, respectively.

It is an object of this example to obtain the video tape cassette 108 in which the video and audio signals are recorded as the finally edited result Vr. Therefore, the operator has to separately reproduce the recorded material tapes 101 and 104 by the reproducing-side VCRs 102 and 103 or the operator has to reproduce the recorded material tape 101 by the reproducing-side VCR 102 and to designate a desired cut by entering an edit-in (cut-in point) and an edit-out (cut-out point). There are two methods for implementing the above-mentioned work.

According to one method, the operator has to designate the edit-in and the edit-out by depressing operation keys of the editing controller 109 in a real time fashion while visually confirming a picture displayed on a television monitor (not shown).

According to another method, the operator has to search for the edit-in and the edit-out by visually confirming a picture displayed on a television monitor (not shown). Then, when the edit-in or edit-out is determined, the operator reads out time code data displayed on the display portion (not shown) of the editing controller 109 and notes the time code data thus read out on a paper or the like. Thereafter, the operator enters the above-mentioned time code data on the note to the editing controller 109 by the operation keys of the editing controller 109 or the like. When the operator carries out the above-mentioned works at every cut, time code data indicating the edit-in and the edit-out of the cut designated by the operator are stored in a memory (not shown) of the editing controller 109 or the like.

Having entered the image data indicating the cut to the editing controller 109, the operator designates image data of reproduced cuts to the reproducing-side VCRs 102 and 103. In this example, the operator can select image data of cuts CUT1 and CUT3 from the reproduced video signal from the reproducing-side VCR 102 and use the same for editing. Also, the operator can select image data of cut CUT2 for editing from the reproduced video signal from the reproducing-side VCR 103 and use the same for editing. Further, the operator can designate the special effect period between the cuts CUT1 and CUT2 by entering time code data. Furthermore, with respect to the cut CUT2, the operator can designate edit-in and edit-out of the first half portion and edit-in (edit-out of the first half portion) and edit-out of the second half portion, respectively.

When the operator enters a command for executing editing after the operator had designated various items for editing, the reproducing-side VCR 102 detects a starting portion of the cut CUT1 and the reproducing-side VCR 103 detects a starting portion of the cut CUT2 during a predetermined period of time including the pre-roll period under the control of the control signals supplied thereto from the editing controller 109. Then, when supplied with a playback start control signal from the editing controller 109, the reproducing-side VCR 102 is placed in the reproducing mode and the reproduced video signal V1 (ST1) serving as image data indicative of the cut CUT1 is output from the reproducing-side VCR 102.

Having recognized a time point advanced from the start time point of the special effect period by the pre-roll period PRt by monitoring the time code data from the reproducing-side VCR 102, the editing controller 109 supplies the control signal to the reproducing-side VCR 103 so that the reproducing-side VCR 103 is set in the reproducing mode. The reproducing-side VCR 103 outputs the reproduced video signal V2 (ST1) as the cut CUT2(1/2). Having recognized the start time point of the special effect period by monitoring the time code data from the reproducing-side VCR 103, the editing controller 109 supplies the control signal to the DME 105 so that the DME 105 is energized to create special effects on the video signal.

Therefore, the DME 105 outputs the output Vo1 (ST1) in which a special effect is created on the portion between the cuts CUT1 and CUT2(1/2) during the special effect period Td. This output Vo1 (ST1) is supplied to the recording-side VCR 107 as the recording signal Vo2 (ST1) and thereby recorded on the magnetic tape of the video tape cassette 108. This is the processing executed at the step ST1 which is the first processing step.

In the processing step ST2, under the control of the editing controller 109, the reproducing-side VCR 102 detects a starting point of the cut CUT3 including the pre-roll period PRt and the reproducing-side VCR 103 detects the starting point of the cut CUT2(2/2) including the pre-roll period PRt. Thereafter, initially, the reproducing-side VCR 103 is set to the reproducing mode in response to the control signal supplied thereto from the editing controller 109. When the reproducing-side VCR 103 is placed in the reproducing mode, the reproducing-side VCR 103 outputs the reproduced video signal V2 (ST2). When the editing controller 109 detects by monitoring the time code data supplied thereto from the reproducing-side VCR 103 that the time point reaches the starting portion of the cut CUT2(2/2), the editing controller 109 supplies the control signal to the recording-side VCR 107 to enable the recording-side VCR 107 to record the cut CUT2(2/2).

Subsequently, having recognized by monitoring the time code data supplied thereto from the reproducing-side VCR 103 that a time point reaches a time point at which the reproducing-side VCR 102 is operated in the reproducing mode, the editing controller 109 supplies the control signal to the reproducing-side VCR 102, thereby the reproducing-side VCR 102 being set in the reproducing mode. Then, having recognized the special effect period Td by monitoring the time code data supplied thereto from the reproducing-side VCR 102 or 103, the editing controller 109 supplies the control signal to the DME 105 so that the DME 105 implements the special effect processing. The output Vo1 (ST2) of the DME 105 is presented as shown in FIG. 2. This output Vo1 (ST2) is supplied to the recording-side VCR 107 and thereby recorded on the magnetic tape of the video tape cassette 108 set on the recording-side VCR 107.

Study of the recording signal Vo2 (ST2) reveals that a period Tv1 becomes a recording signal period of the previous step ST1 and that a period Tv2 becomes a recording signal period of the step ST2. Then, a resultant recording signal (or recorded signal on a magnetic tape) becomes a continuous recording signal. The edited result Vr can be obtained by the above-mentioned processing steps. Study of the edited result Vr reveals that the cut CUT1, the cut CUT2 and the cut CUT3 are continuously recorded on the magnetic tape of the video tape cassette 108 set on the recording-side VCR 107 and that a period between the cut CUT1 and the cut CUT2 and a period between the cut CUT2 and the cut CUT3 are processed in special effect by the special effect period Td.

In FIG. 2, similarly, the audio signal also is processed by the audio mixer 106 and recorded on the magnetic tape of the video tape cassette 108 set on the recording-side VCR 107, though not shown.

The editing system shown in FIG. 1 needs the two reproducing-side VCRs 102, 103, the recording-side VCR 107, the DME 105, the audio mixer 106 and the editing controller 109 in order to carry out the A-B roll editing including the special effect. Therefore, the editing system becomes large physically and the arrangement of the editing system becomes complicated.

As earlier noted, when the editing is carried out by using many rolls, reproducing-side VCRs have to be added more, making the system arrangement become large in scale. Moreover, operation of the editing system becomes complex and the editing system becomes expensive.

Furthermore, as earlier noted, in order to carry out the A-B roll editing, it is necessary to carry out a cumbersome work that the recorded material tape 101 serving as the A roll is copied to the magnetic tape of another video tape cassette to thereby make the recorded material tape 104 serving as the B roll. This work is cumbersome for the operator and the efficiency in editing is deteriorated considerably.

SUMMARY OF THE INVENTION

In view of the aforesaid aspects, it is an object of the present invention to provide an editing method and an editing apparatus in which a recorded material tape for editing need not be copied upon editing.

It is another object of the present invention to provide an editing method and an editing apparatus in which a scale of an editing system can be reduced and operation can be simplified, thereby making it possible to considerably improve an efficiency for editing.

It is a further object of the present invention to provide an editing method and an editing apparatus in which a comfortable and convenient editing circumstance can be given to the editing operator.

According to a first aspect of the present invention, there is provided an editing method for editing first recorded material information and second recorded material information. The editing method comprises the steps of a first recording step for recording the first recorded material information on a first recording medium, a holding step for recording the first recorded material information on a second recording medium whose access speed is higher than that of the first recording medium by a recording amount corresponding to a buffering period, an editing step for editing an editing period portion of the second recorded material information and the first recorded material information of the buffering period amount reproduced from the second recording medium by an amount corresponding to the editing period, and a second recording step for recording the edited recorded material information and the second recorded material information from a recording start point on the first recording medium.

According to a second aspect of the present invention, there is provided an editing apparatus which is comprised of a recorded information supplying means for supplying recorded material information, a recording means for recording the recorded material information supplied thereto from the recorded material information supplying means on a recording medium, a temporary holding means for temporarily holding the recorded material information supplied thereto from the recorded material information supplying means, a signal processing means for processing the recorded material information supplied thereto from the recorded material information supplying means and held recorded material information supplied thereto from the temporary holding means, and a control means for controlling the recording means, the temporary holding means and the signal processing means, wherein the control means controls the recorded material information supplying means and the recording means so that the recorded material information supplying means outputs first recorded material information and that the first recorded material information is recorded on the recording medium of the recording means in a first processing step, the control means controls the temporary holding means so that recorded material information of a part of the first recorded material information supplied from the recorded material information supplying means is held in the temporary holding means as held recorded material information in a second processing step, and the control means controls the recorded material information supplying means, the temporary holding means, the signal processing means and the recording means such that the recorded material information supplying means outputs second recorded material information, the temporary holding means outputs the held recorded material information, the signal processing means processes the second recorded material information supplied thereto from the recorded material information supplying means and the held recorded material information supplied thereto from the temporary holding means and that an output of the signal processing means is recorded on said recording medium of said recording means in a third processing step.

BRIEF DESCRIPTION OF THE DRAWINGS

FIGS. 4A through 4D are schematic diagrams showing an example of a format used in the editing system shown in FIG. 3, wherein FIG. 4A is a schematic diagram used to explain an example of an editing table;

FIG. 4B is a schematic diagram used to explain an example of a temporary recording medium table;

FIG. 4C is a schematic diagram used to explain an example of default values;

FIG. 4D is a schematic diagram used to explain an example of calculated values;

FIGS. 19A through 19L are schematic diagrams used to explain an operation executed by the editing system shown in FIG. 3 when an edited recorded material tape is made by using image data of two cuts in the editing system (when the position of buffering data is agreed with the end of cut);

FIGS. 20A through 20L are schematic diagrams used to explain an operation executed by the editing system shown in FIG. 3 when an edited recorded material tape is made by using two cuts in the editing system (when the position of buffering data is agreed with an arbitrary position of cut);

FIG. 21 is a block diagram showing a practical example of the editing system shown in FIG. 3;

FIG. 22 is a block diagram showing an example of a recording-side VCR shown in FIG. 21;

FIG. 24 is a block diagram showing an example of a recording-side VCR shown in FIG. 23.

DETAILED DESCRIPTION OF THE PREFERRED EMBODIMENTS

Figure 1:
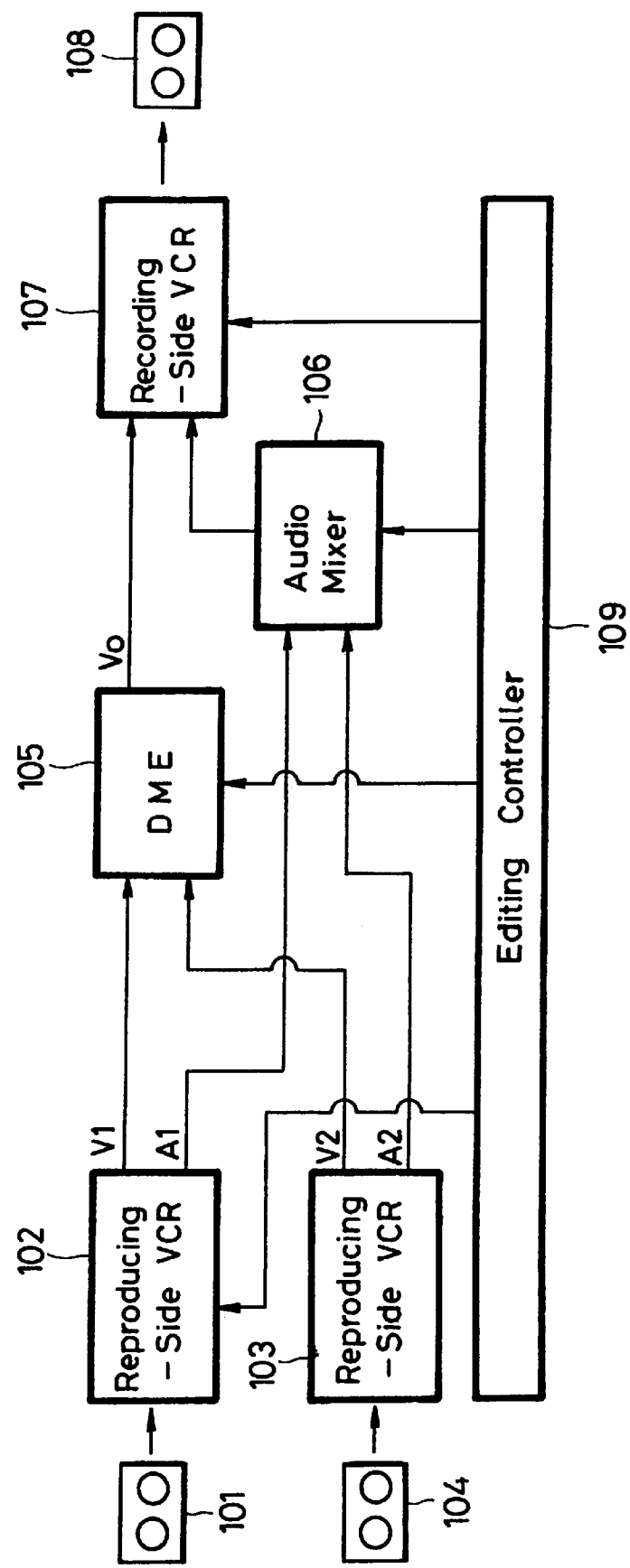
FIG. 1 is a block diagram showing an example of an editing apparatus.
Figure 2:
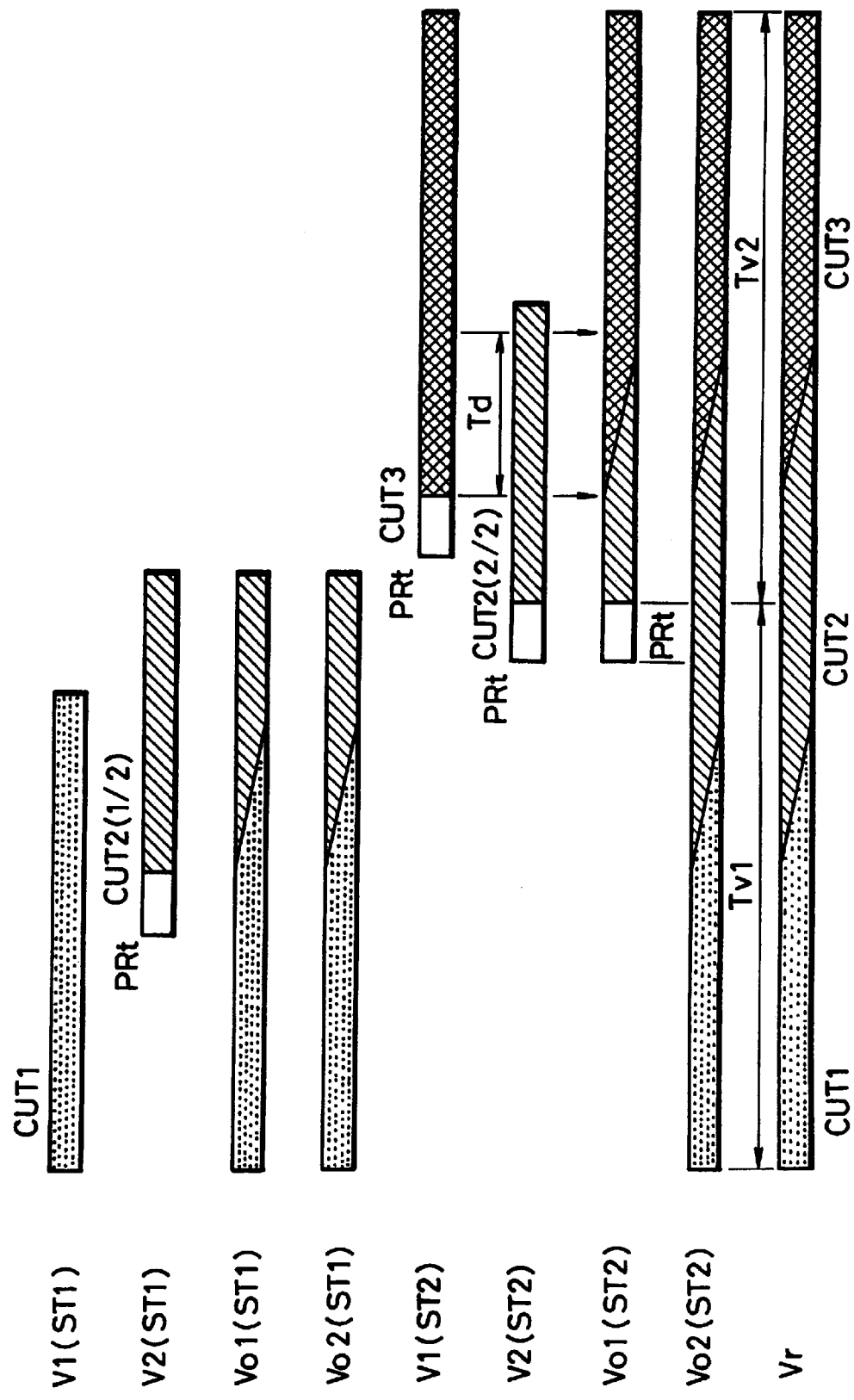
FIG. 2 is a schematic diagram used to explain an editing operation of the editing apparatus shown in FIG. 1.

An editing method and an apparatus thereof according to embodiments of the present invention will be described below in detail with reference to FIGS. 3 to 24.

Referring to the drawings in detail and initially to FIG. 3, an arrangement of the editing system according to the present invention will be described below.

Figure 3:
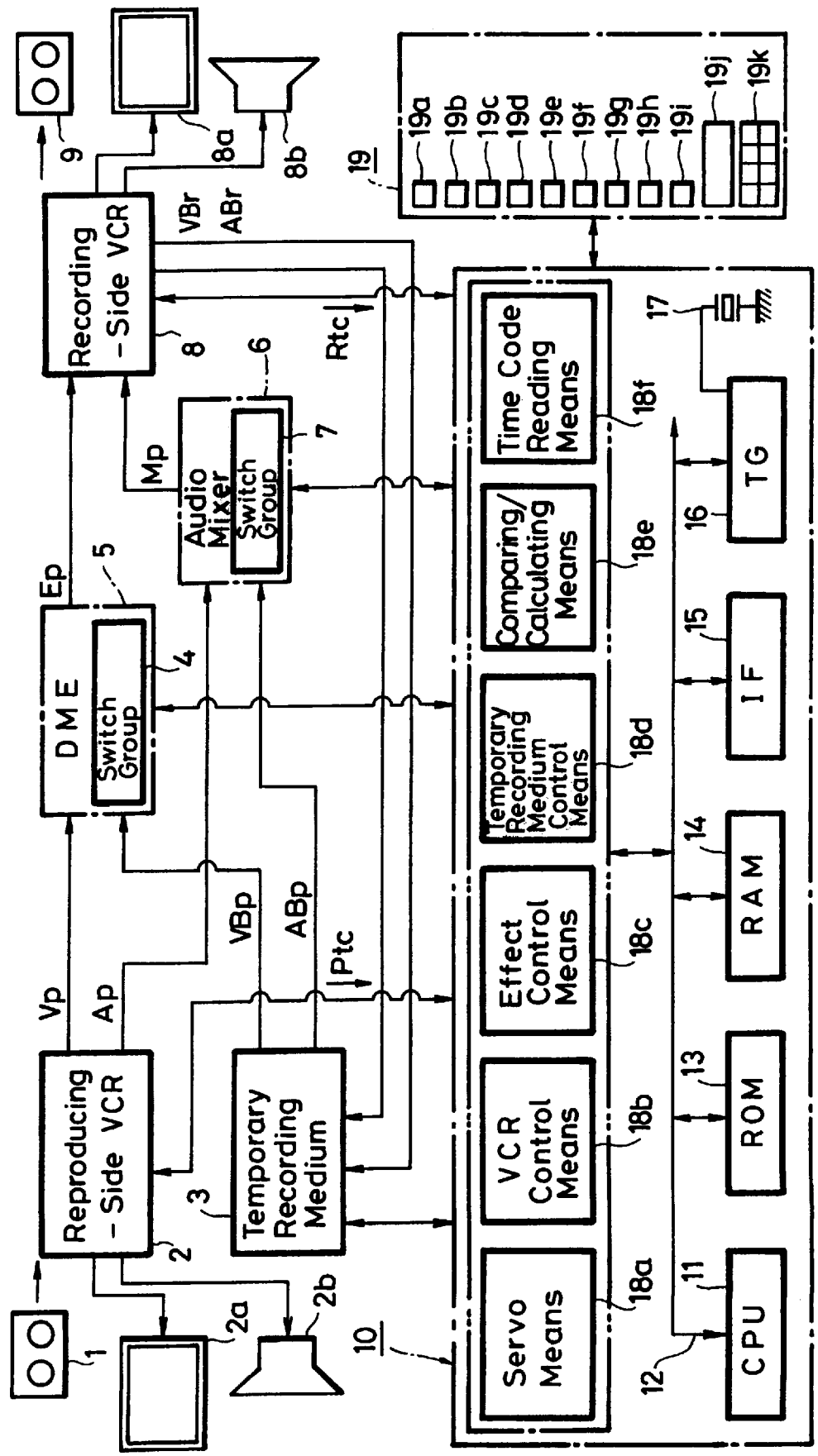
FIG. 3 is a block diagram showing an arrangement of an editing system according to a first embodiment of the present invention.

FIG. 3 is a block diagram showing an editing system according to an embodiment of the present invention to which the editing method and apparatus according to the present invention are applied.

As shown in FIG. 3, an editing system is composed of a reproducing-side VCR 2 for reproducing a video tape cassette 1 serving as a recorded material tape cassette, a temporary recording medium 3 in which reproduced video data vp and reproduced audio data Ap from the reproducing-side VCR 2 are temporarily recorded, a DME 4 for creating video special effect (special effect processing), such as "mix", "wipe" and "dissolve"on the reproduced video data Vp supplied thereto from the reproducing-side VCR 2 and buffering video data VBp supplied thereto from the temporary recording medium 3, an audio mixer 6 for creating audio special effect, such as "equalizing", "panning", "boost" and "mixing" on the reproduced audio data Ap supplied thereto from the reproducing-side VCR (digital VCR) 2 and buffering audio data ABp supplied thereto from the temporary recording medium 3, a recording-side VCR (digital VCR) 8 for recording an output Ep of the DME 5 and an output Mp of the audio mixer 6 on a video tape of a video tape cassette 9 serving as a finally edited video tape cassette, an operation unit 19 for controlling respective portions and an editing controller 10.

The DME 5 includes a switch group 4 composed of levers for effecting switching, wipe or the like in order to carry out a variety of effect processings. The audio mixer 6 includes a switch group 7 for effecting a variety of effect processings. The temporary recording medium 3 is formed of a hard disk drive, a magneto-optical disk drive, a silicon disk drive or the like, for example. A read-only memory (ROM) 13 is formed of an electrically erasable programmable read-only memory (EEPROM) in order to rewrite program data and default values, which will be described later on, when necessary.

The editing controller 10 is composed of a central processing unit (CPU) 11, a bus 12 formed of address bus, data bus and control bus connected to the CPU 11, the ROM 13 which stores the program data and the default values shown by flow-charts which will be described later on, a random-access memory (RAM) 14 for work area, an interface circuit (IF) 15 for supplying time code data from the reproducing-side VCR 2 and the recording-side VCR 8 to the editing controller 10 and supplying control signals to the DME 15, the audio mixer 6 and the temporary recording medium 3, an oscillator 17 and a timing generator (TG) 16 for generating timing signals to control the reproducing-side VCR 2, the temporary recording medium 3, the DME 5, the audio mixer 6 and the recording-side VCR 8.

When the editing system is powered and program data stored in the ROM 13 is loaded on a main memory (not shown) of the CPU 11, the editing controller 10 can afford a servo means 18a, a VCR control means 18b, an effect control means 18c, a temporary recording medium control means 18d, a comparing/calculating means 18e and a time code reading means 18f which function as follows.

The servo means 18a functions to fine adjust tape speeds of the reproducing-side VCR 2 and the recording-side VCR 8 and to match the tape positions of the reproducing-side VCR 2 and the recording-side VCR 8 in order to obtain accuracy in editing.

The VCR control means 18b functions to control the reproducing-side VCR 2 and the recording-side VCR 8 so that the reproducing-side VCR 2 and the recording-side VCR 8 are set in the recording mode, the reproducing mode, the rewind mode, the fast-forward mode and the pause mode.

The effect control means 18c functions to control the DME 5 and the audio mixer 6 so that the DME 5 and the audio mixer 6 can carry out a variety of effect processings.

The temporary recording medium control means 18d functions to record and/or reproduce data on and/or from the temporary recording medium 3.

The comparing/calculating means 18e functions to calculate data to control the editing system based on time code data supplied thereto from the reproducing-side VCR 2 and the recording-side VCR 8 and default values stored in the ROM 13 and compare calculated results with the default values to control the editing system.

The time code reading means 18f functions to read out time code data from the reproducing-side VCR 2 and the recording-side VCR 8.

The operation unit 19 includes a set key 19a, a cut start key 19b, a cut end key 19c, a buffering start key 19d, a buffering end key 19e, an effect start key 19f, an effect end key 19g, a manual key 19h, a recording start key 19i, a display portion 19j and an operation key group 19k for setting the reproducing-side VCR 2 and the recording-side VCR 3 in the recording mode, the reproducing mode, the fast forward mode, the stop mode and the pause mode.

When the set key 19a is depressed, various settings are determined and execution of processing is instructed;

When the cut start key 19b is depressed, a cut start point is designated (playback side);

When the cut end key 19c is depressed, a cut end point is designated (playback side);

When the buffering start key 19d is depressed, a buffering start point is designated;

When the buffering end key 19e is depressed, a buffering end point is designated;

When the effect start key 19f is depressed, an effect processing start point is designated;

When the effect end key 19g is depressed, an effect processing end point is designated;

When the manual key 19h is depressed, a manual processing is instructed; and

When the recording start key 19i is depressed, a recording start point is designated (recording side).

Let it now be assumed that, when two cuts (referred to as "first cut" and "second cut") are designated on the magnetic tape of the video tape cassette 1 by the cut start key 19b and the cut end key 19c of the operation unit 19, the A-B roll editing is carried out by using the first and second cuts and a resulting video signal (including an audio signal) is recorded on a magnetic tape of a video tape cassette 9 by the recording-side VCR 8. Because operation of the above-mentioned means of the editing controller 10 shown in FIG. 3 will be described later with reference to flow-charts shown in FIGS. 5 to 18, such operation need not be described herein in detail.

When the set key 19a of the operation unit 19 is depressed, video data Vp of the first cut is reproduced from the magnetic tape of the video tape cassette 1 by the reproducing-side VCR 2 under the control of the editing controller 10 shown in FIG. 3. The editing controller 10 supplies control signals to the DME 5 and the audio mixer 6 so that the DME 5 and the audio mixer 6 output input data as they are. The video data Vp of the first cut is supplied through the DME 5 to the recording-side VCR 8 as video data Ep. Audio data Ap of the first cut is supplied through the audio mixer 6 to the recording-side VCR 8 as audio data Mp. The video data Ep and the audio data Mp of the first cut are recorded on the magnetic tape of the video tape cassette 9 set on the recording-side VCR 8 so as to form slant tracks.

The video data Ep and the audio data Mp that were supplied to the recording-side VCR 8 are output from the recording-side VCR 8 as buffering video data VBr and buffering audio data ABr and then supplied to the temporary recording medium 3, thereby recorded on the temporary recording medium 3 by a predetermined period of time.

Under the control of the editing controller 10, video data Vp and audio data Ap of the second cut including the pre-roll period are output from the reproducing-side VCR 2 and the recording-side VCR 8 is set in the reproducing mode. The video data Vp of the second cut is supplied to the DME 5, from which the video data Vp is supplied to the recording-side VCR 8 as it is until the magnetic tape reaches the starting position (starting position of the effect period) of the second cut under the control of the edit controller 10. The audio data Ap of the second cut is supplied to the audio mixer 6, from which the audio data Ap is supplied to the recording-side VCR 8 as it is until the magnetic tape reaches the starting portion (starting position of the effect period) of the second cut under the control of the editing controller 10.

Having recognized a timing point at which the buffering video data VBp and the buffering audio data ABp should be reproduced during the pre-roll period of the video data Vp and the audio data Ap from the reproducing-side VCR 2, the editing controller 10 supplies the control signal to the temporary recording medium 3 to reproduce the buffering video data VBp and the buffering audio data ABp stored in the temporary recording medium 3.

The buffering video data VBp from the temporary recording medium 3 is supplied to the DME 5 and the buffering audio data ABp from the temporary recording medium 3 is supplied to the audio mixer 6. Thereafter, when the video data from the reproducing-VCR 2 reaches the starting position of the video data Vp of the second cut, the editing controller 10 supplies the control signal to the recording-side VCR 8 to set the recording-side VCR 8 in the recording mode from the reproducing mode. Also, the editing controller 10 supplies the control signals to the DME 5 and the audio mixer 6 to set the DME 5 and the audio mixer 6 in the operable states.

Therefore, the DME 5 carries out effect processing using the video data Vp of the second cut supplied thereto from the reproducing-side VCR 2 and the buffering video data VBp supplied thereto from the temporary recording medium 3. The audio mixer 6 carries out effect processing using the audio data Ap of the second cut supplied thereto from the reproducing-side VCR 2 and the buffering audio data ABp supplied thereto from the temporary recording medium 3. The video data Ep of the second cut that had been processed in special effect by the DME 5 and the audio data Mp of the second cut that had been processed in special effect by the audio mixer 6 are supplied to the recording-side VCR 8. Then, the video data Ep and the audio data Mp of the second cut are recorded on the magnetic tape of the video tape cassette 9 set on the recording-side VCR 8 so as to form slant tracks.

According to the above-mentioned processing, the video and audio data of the first cut and the video and audio data of the second cut are recorded on the magnetic tape of the video tape cassette 9 under the condition that a special effect is created on a predetermined period of the second half portion of the first cut and a predetermined period of the first half portion of the second cut.

A format used in the editing system shown in FIG. 3 will be described with reference to FIGS. 4A through 4D.

FIGS. 4A through 4D are diagrams used to explain an example of the format used in the editing system shown in FIG. 3.

FIG. 4A is a diagram showing an editing table composed of information of a plurality of cuts. FIG. 4B is a diagram showing a temporary recording medium table composed of position information of buffering video data and audio data on the temporary recording medium. FIG. 4C is a diagram showing default values required upon editing. FIG. 4D is a diagram showing calculated values required upon editing.

The editing table is formed on the RAM 14 shown in FIG. 3. As shown in FIG. 4A, the editing table is composed of cut No. data Cn, cut starting point time code data Pi, cut ending point time code data Po, buffering starting point time code data Bi, buffering ending point time code data Bo, effect starting point time code data Ei, effect ending point time code data Eo and reproducing starting point time code data Bp of the buffering data. When two cuts of the first and second cuts are edited, for example, information of each cut is registered on the editing table and registered information is referred to upon editing, if necessary.

In this embodiment, the effect starting point time code data Ei and the effect ending point time code data Eo can be set only during a period from the buffering starting point time code data Bi to the buffering ending point time code data Bo. Specifically, the effect starting point time code data Ei becomes the same value as that of the buffering starting point time code data Bi when it is smallest. The effect ending point time code data Eo becomes the same value as that of the buffering ending point time code data Bo when it is largest.

Then, when the first cut is recorded and the portion buffered from the first cut and the second cut are processed in special effect and the portion thus processed in special effect and the second cut are recorded after the first cut, a range of the effect starting point time code data Ei and the effect ending point time code data Eo of the first cut cover a range of the buffering starting point time code data Bi and the buffering ending point time code data Bo of the first cut, and the effect starting point time code data Ei of the second cut becomes the starting point time code data Pi of the second cut constantly.

Further, according to this embodiment, since it is assumed that the editing is carried out after the tape speeds of the reproducing-side VCR 2 and the recording-side VCR 8 had been fine adjusted and the tape positions of the reproducing-side VCR 2 and the recording-side VCR 8 had been matched, once a recording point on the magnetic tape of the video tape cassette set on the recording-side VCR 8 is determined, the editing is carried out based on the time code data from the reproducing-side VCR 2.

The temporary recording medium table is formed on the RAM 14. As shown in FIG. 4B, the temporary recording medium is compose of cut No. data Cn, time code data (HMSF: time, minute, second and frame), starting sector address data ("#0000000" in this embodiment) and data length data ("10 megabytes" in this embodiment). When the two cuts of the first and second cuts are edited, the temporary recording medium table is referred to in order to read out the buffering video data and the buffering audio data of the first cut from the temporary recording medium 3 shown in FIG. 3.

The default values are data that are previously stored in the ROM 13 shown in FIG. 3. As shown in FIG. 4C, the default values are composed of buffering time data BU, effect time data EF1, pre-roll time data PR, delay time data D and time data EF2 required before effect starts (hereinafter simply referred to as time data EF2). These data will be described more fully below.

The buffering time data BU is used to buffer video and audio data in the temporary recording medium 3 shown in FIG. 3. The buffering time data BU becomes valid when the buffering time is not instructed in accordance with the manual. The buffering time data BU can be converted to data length data when a medium is a medium to which the temporary recording medium 3 has to supply data length data upon recording.

The effect time data EF1 is data indicative of effect times in the DME 5 and the audio mixer 6 shown in FIG. 3. The effect time data EF1 becomes valid when the effect time data is not instructed in accordance with the manual.

The pre-roll time data PR indicates a pre-roll time in the reproducing-side VCR 2 and the recording-side VCR 8 shown in FIG. 3.

The delay time D indicates a processing time required by the DME 5 and the audio mixer 6 shown in FIG. 3.

The time data EF2 is time data ranging from the buffering starting point to the effect starting point. The time data EF2 is used to obtain the effect starting point time code data Ei when the effect starting point time code data Ei is not stored in the editing table shown in FIG. 4A.

The calculated values are data stored in the RAM 14 shown in FIG. 3 during processing. As shown in FIG. 4D, the calculated value is composed of recording starting point time code data Ri, reproducing-side reproducing starting point time code data Ps, recording-side reproducing starting point time code data Rs, reference differential data Ref, recording-side/reproducing-side differential data RStc and present differential data Ntc. These data will be described more fully below.

The recording starting point time code data Ri will be described below initially.

The recording starting point time code data Ri is recording starting point time code data recorded on the magnetic tape of the video tape cassette 9 set on the recording-side VCR 8. The time code data Ri of the first cut recording start point is time coded data read out from the recording-side VCR 8 when the recording start key 19*i* of the operation unit 19 shown in FIG. 3 is depressed. Recording start point time code data Ri of the cut following the second cut is time code data which results from adding effect starting point time code data Ei of the cut following the second cut and reference differential data Ref. Therefore, when the reference differential data Ref is a positive value, the recording starting point time code data Ri becomes time code data which is delayed from the effect starting point time code data by the reference differential data Ref. When the reference differential data Ref is a negative value, the recording starting point time code data Ri becomes time code data advanced from the effect starting point time code data Ei by the reference differential data Ref.

The time code data Ps of the reproducing starting point on the reproducing side will be described below.

The time code data Ps of the reproducing starting point on the reproducing side is reproducing starting point time code data recorded on the magnetic tape of the video tape cassette 1 set on the reproducing-side VCR 2 shown in FIG. 3. The reproducing-side reproducing starting point time code data Ps is time code data which results from subtracting the pre-roll time data PR from the cut starting point data Pi.

The recording-side reproducing starting point time code data Rs will be described below.

The recording-side reproducing starting point time code data Rs is reproducing starting point time code data recorded on the magnetic tape of the video tape cassette 9 set on the recording-side VCR 8 shown in FIG. 3. The recording-side reproducing starting point time code data Rs is time code data which results from subtracting the pre-roll time data PR (when not designated) from the recording starting point time code data Ri.

The reference differential data Ref will be described below.

The reference differential data Ref is differential data between the recording starting point time code data Ri and the cut starting point data Pi and results from subtracting the cut starting point data Pi from the time code data Ri. If an inequality of time code data Ri> cut starting point data Pi is satisfied, then the reference differential data Ref becomes a positive value. If an inequality of time code data Ri< cut starting point data Pi is satisfied, then the reference differential data Ref becomes a negative value.

The recording-side/reproducing-side differential data RStc will be described below.

The recording-side/reproducing-side differential data is differential data between the time code data Ptc from the reproducing-side VCR 2 and the time code data Rtc from the recording-side VCR 8 and required in order to fine adjust the tape speeds of the reproducing-side VCR 2 and the recording-side VCR 8 to match the tape positions of the reproducing-side VCR and the recording-side VCR 8 so as to enhance accuracy in editing. When the reference differential data Ref is a positive value, the time code data Ptc from the reproducing-side VCR 2 is subtracted from the time code data Rtc from the recording-side VCR 8. When the reference differential data Ref is a negative value, the time code data Rtc from the recording-side VCR 8 is subtracted from the time code data Ptc from the reproducing-side VCR 2.

The present differential data Ntc will be described below.

The present differential data Ntc is differential data between the recording-side/reproducing-side differential data RStc and the reference differential data Ref and is required in order to fine adjust the tape speeds of the reproducing-side VCR 2 and the recording-side VCR 8 to match the tape positions of the reproducing-side VCR 2 and the recording-side VCR 8 so as to enhance accuracy in editing. If the reference differential data Ref is a positive value, then the recording-side/reproducing-side differential data RStc is subtracted from the reference differential data Ref. If the reference differential data Ref is a negative value, then the reference differential data Ref is added to the recording-side/reproducing-side differential data RStc.

When the tape speeds of the reproducing-side VCR 2 and the recording-side VCR 8 are fine adjusted and the tape positions of the reproducing-side VCR 2 and the recording-side VCR 2 are matched to enhance accuracy in editing, the present differential data Ntc is controlled so as to become "0".

Operation of the editing system shown in FIG. 3 based on a main routine will be described with reference to a flow-chart of FIG. 5. In this case, mainly, control operation of the inside of the editing controller 10 shown in FIG. 3, i.e., CPU 11, the servo means 18a, the VCR control means 18b, the effect control means 18c, the temporary recording medium control means 18d, the comparing/calculating means 18e and the time code reading means 18f will be described with reference to the flowchart of FIG. 5.

Figure 5:
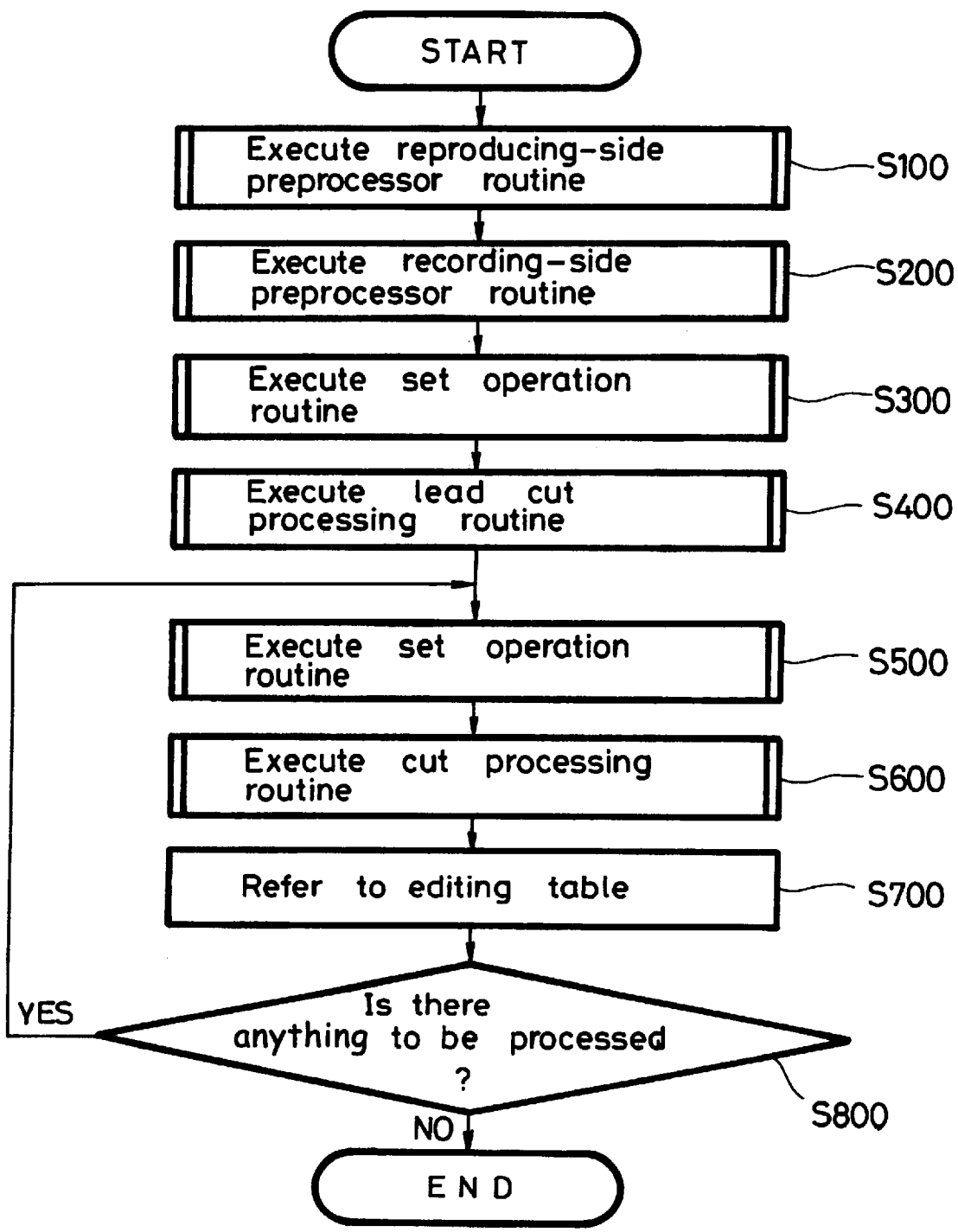
FIG. 5 is a flowchart to which reference will be made in explaining a processing of a main routine of a program executed by an editing controller shown in FIG. 3.

Referring to FIG. 5, following the start of operation, a processing based on a reproducing-side preprocessor routine is executed at step S100. Specifically, in step S100, one cut is set from video and audio data recorded on the magnetic tape of the video tape cassette 1 loaded to the reproducing-side VCR 2 and a buffering period and an effect period are set. Further, an editing table is generated by a processing based on an editing table generating routine provided within this reproducing preprocessor routine.

In the next step S200, a processing based on a recording-side preprocessor routine is executed to set a recording starting point on the magnetic tape of the video cassette tape 9 set within the recording-side VCR 8.

In step S300, a processing based on a set operation routine is executed to control the reproducing-side VCR 2 and the recording-side VCR 8, respectively. Then, the position of the magnetic tape of the video tape cassette 1 set on the reproducing-side VCR 2 is set to the position at which the reproducing starting point time code data Ps is recorded. The position of the magnetic tape of the video tape cassette 9 set on the recording-side VCR 8 is set to the position at which the reproducing start point time code data Rs is recorded.

In step S400, a processing based on a starting cut processing routine is executed to enable the video data Vp and the audio data Ap of the starting cut to be recorded on the magnetic tape of the video tape cassette 9 set on the recording-side VCR 8 so as to form slant tracks. Also, video data VBr and audio data ABr of predetermined periods are temporarily buffered in the temporary recording medium 3.

In step S500, a set operation routine is executed to control the reproducing-side VCR 2 and the recording-side VCR 8, respectively. Then, the position of the magnetic tape of the video tape cassette 1 set on the reproducing-side VCR 2 is set to the position at which the reproducing starting point time code data Ps is recorded. The position of the video tape cassette 9 set on the recording-side VCR 8 is set to the position at which the reproducing starting point time code data Rs is recorded. The set operation routine executed at step S500 is the same as the set operation routine executed at step S300 and executed on the program by some suitable methods, such as a subroutine call.

In step S600, a processing based on a cut processing routine is executed to enable the buffering video data VBp of the first cut and the video data Vp of the second cut to be processed by the DME 5 in special effect. Also, the buffering audio data ABp of the first cut and the audio data Ap of the second cut are processed by the audio mixer 6 in special effect. Then, resulting video data Ep and resulting audio data Mp are recorded on the magnetic tape of the video tape cassette 9 set on the recording-side VCR 8 so as to form slant tracks. Further, the video and audio data Ep and Ap of the predetermined periods are buffered in the temporary recording medium 3.

In step S700, the editing table is referred to and it is determined whether or not there is any cut to be processed.

In the next decision step S800, it is determined whether or not there is the next cut to be processed. If a YES is output at decision step S800, then the processing returns to step S500. If a NO is output at decision step S800, then the processing is ended.

Then, the buffering video data VBp of the second cut and the video data Vp of the third cut and the buffering audio data ABp of the second cut and the audio data Ap of the third cut are processed sequentially. In this way, until all cuts registered on the editing table are processed, buffering video data VBp of nth cut, video data vp of n+1th cut and buffering audio data ABp of nth cut and audio data Ap of n+1th cut are processed, in that order.

Operation based on the reproducing side preprocessor routine will be described with reference to flow-charts of FIGS. 6 and 7.

The reproducing side preprocessor routine will be described below.

Processing operation based on the reproducing side preprocessor routine of step S100 in the main routine shown in FIG. 5 will be described with reference to the flow-charts of FIGS. 6 and 7.

Figure 6:
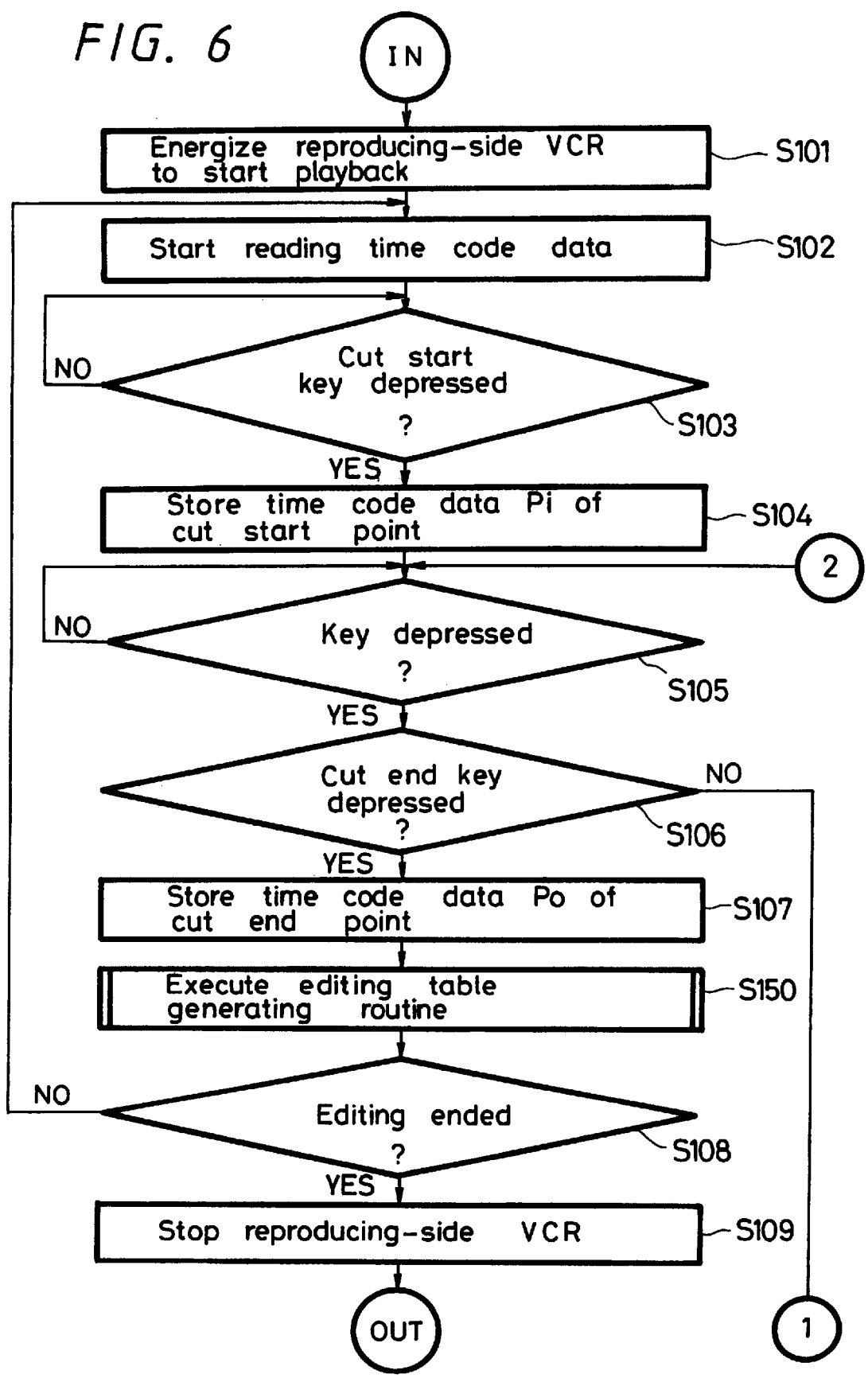
FIG. 6 is a flowchart to which reference will be made in explaining a processing of a reproducing-side preprocessor routine of the program executed by the editing controller shown in FIG. 3.

Referring to FIG. 6, in step S101, the VCR control means 18b shown in FIG. 3 supplies a playback start control signal to the reproducing-side VCR 2 through the interface circuit 15 and the reproducing-side VCR 2 is set in the playback mode. Then, the processing proceeds to step S102.

In step S102, the time code reading means 18f shown in FIG. 3 reads out time code data Ptc supplied from the reproducing-side VCR 2 through the interface circuit 15. Then, the processing proceeds to the next decision step S103.

In decision step S103, it is determined by the CPu 11 shown in FIG. 3 whether or not the cut start key 19b is depressed. If the cut start key 19b is depressed as represented by a YES at decision step S103, then the processing proceeds to step S104.

In step S104, the CPU 11 shown in FIG. 3 stores the time code data Ptc, which the time code reading means 18f had read out at step S103 when the cut start key 19b is depressed, in the editing table (see FIG. 4A) of the RAM 14 as time code data Pi of cut start point. Then, the processing proceeds to the next decision step S105.

It is determined in the next decision step S105 by the CPU 11 shown in FIG. 3 whether or not the key is depressed. If the key is depressed as represented by a YES at decision step S105, then the processing proceeds to the next decision step S106.

It is determined in decision step S106 by the CPU 11 shown in FIG. 3 whether or not the cut end key 19c is depressed. If the cut end key 19c is depressed as represented by a YES at decision step S106, then the processing proceeds to step S107. If on the other hand a NO is output at decision step S106, then the processing proceeds to step S110 shown in the flowchart of FIG. 7.

In step S107, the CPU 11 shown in FIG. 3 stores the time code data Ptc, which the time code reading means 18f had read out when the cut end key 19c is depressed, in the editing table (see FIG. 4A) of the RAM 14 as time code data Po of cut end point. Then, the processing proceeds to step S150.

In step S150, the processing based on the editing table generating routine is executed. Then, the processing proceeds to decision step S108. The editing table generating routine will be described more fully later with reference to flow-charts of FIGS. 8 and 9.

It is determined in decision step S108 by the CPU 11 shown in FIG. 3 whether or not the editing is ended. If the editing is ended as represented by a YES at decision step S108, then the processing proceeds to step S109. If on the other hand a NO is output at decision step S108, then the processing returns to step S102 and the following steps are repeated. It is determined that the editing is ended when the set key 19a of the operation unit 19 shown in FIG. 3 is depressed. The operator can designate the next cut sequentially so long as it is not determined that the editing is ended.

In step S109, the VCR control means 18b shown in FIG. 3 supplies a control signal to the reproducing-side VCR 2 through the interface circuit 15 and the reproducing-side VCR 2 is therefore stopped. Then, this reproducing-side preprocessor routine is ended and the processing proceeds to step S200 of the flowchart shown in FIG. 5.

Figure 7:
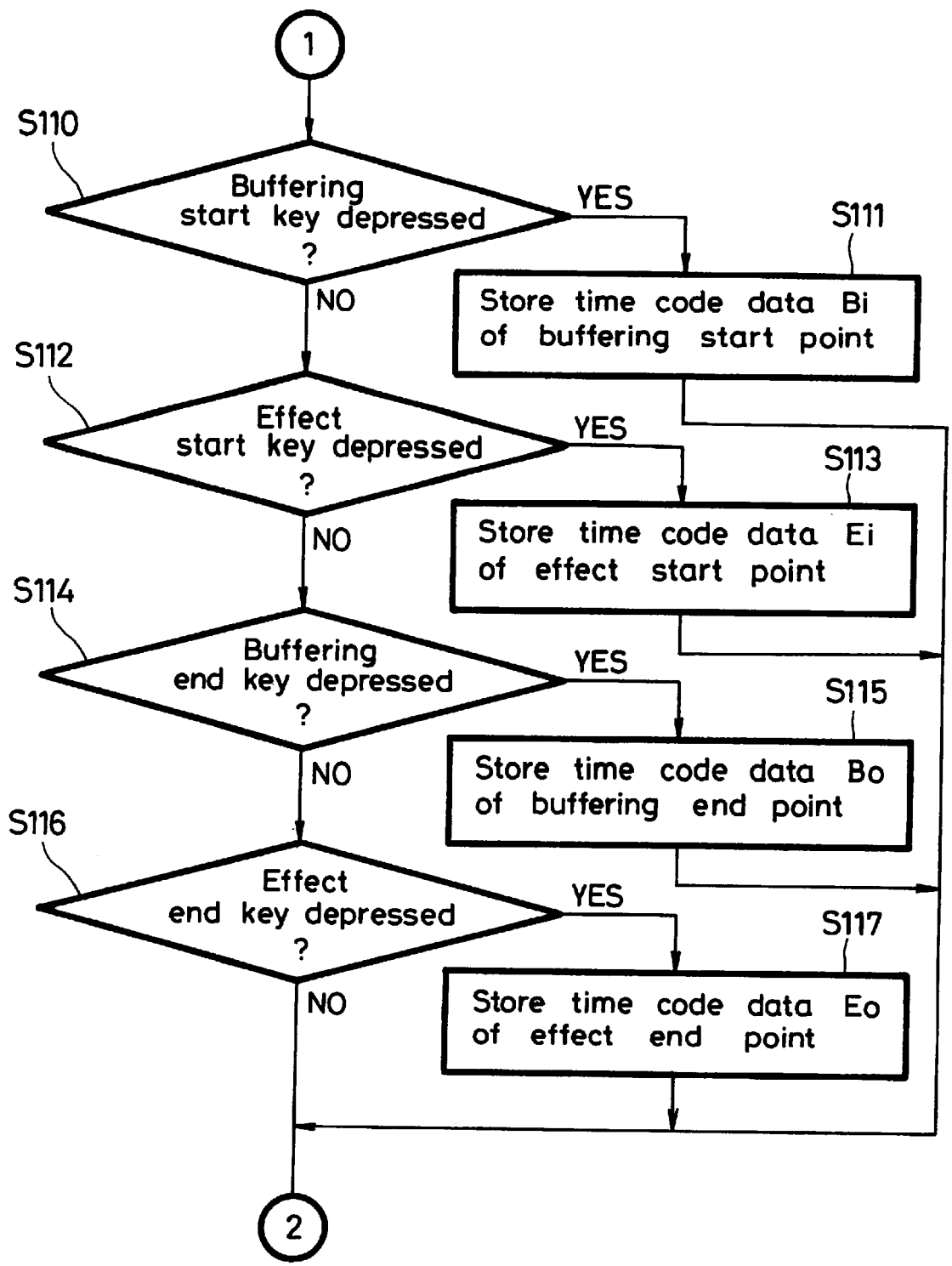
FIG. 7 is a flowchart to which reference will be made in explaining a processing of the reproducing-side preprocessor routine of the program executed by the editing controller shown in FIG. 3.

If it is determined in decision step S106 by the CPU 11 shown in FIG. 3 that the cut end key 19c is not depressed, then the processing proceeds to decision step S110 of the flowchart shown in FIG. 7. It is determined in decision step S110 by the CPU 11 whether or not the buffering start key 19d is depressed. If the buffering start key 19d is depressed as represented by a YES at decision step S110, then the processing proceeds to step S111. If on the other hand a NO is output at decision step S110, the processing proceeds to the next decision step S112.

In step S111, the CPU 11 shown in FIG. 3 stores the time code data Ptc, which the time code reading means 19d had read when the buffering start key 19d is depressed. in the editing table (see FIG. 4A) of the RAM 14 as time code data Bi of buffering start point. Then, the processing returns to step S105 of the flowchart shown in FIG. 6.

It is determined in decision step S112 by the CPU 11 shown in FIG. 3 whether or not the effect start key 19f is depressed. If the effect start key 19f is depressed as represented by a YES at decision step S112, then the processing proceeds to step S113. If on the other hand a NO is output at decision step S112, then the processing proceeds to the next decision step S114.

In step S113, the CPU 11 shown in FIG. 3 reads out the time code data Ptc, which the time code reading means 18f shown in FIG. 3 had read when the effect start key 19f is depressed, in the editing table (see FIG. 4A) of the RAM 14 as time code data Ei of effect start point. Then, the processing returns to step S105 of the flowchart shown in FIG. 6.

It is determined in decision step S114 by the cPu 11 shown in FIG. 3 whether or not the buffering end key 19e is depressed. If the buffering end key 19e is depressed as represented by a YES at decision step S114, then the processing proceeds to step S115. If on the other hand a NO is output at decision step S114, then the processing proceeds to the next decision step S116.

In step S115, the CPU 11 shown in FIG. 3 stores the time code data Ptc, which the time code reading means 18f shown in FIG. 3 had read when the buffering end key 19e is depressed, in the editing table (see FIG. 4A) of the RAM 14 as time code data Bo of buffering end point. Then, the processing returns to decision step S105 shown in FIG. 6.

It is determined in decision step S116 by the CPU 11 shown in FIG. 3. whether or not the effect end key 19g is depressed. If the effect end key 19g is depressed as represented by a YES at decision step S116, then the processing proceeds to step S117. If on the other hand a NO is output at decision step S116, then the processing returns to decision step S105 of the flowchart shown in FIG. 6.

In step S117, the CPU 11 shown in FIG. 3 stores the time code data Ptc, which the time code reading means 18f shown in FIG. 3 had read when the effect end key 19g is depressed, in the editing table (see FIG. 4A) of the RAM 14 as time code data Eo of effect end point. Then, the processing returns to decision step S105 of the flowchart shown in FIG. 6.

Operation based on the routine shown as decision step S105 of the flowchart shown in FIG. 6, i.e., editing table generating routine will be described below with reference to FIGS. 8 to 10. In this editing table generating routine, the buffering start point, the buffering end point, the effect start point and the effect end point which were not registered because they were not designated in the reproducing-side preprocessor routine are searched for and these data are generated, thereby the editing table being completed.

Figure 8:
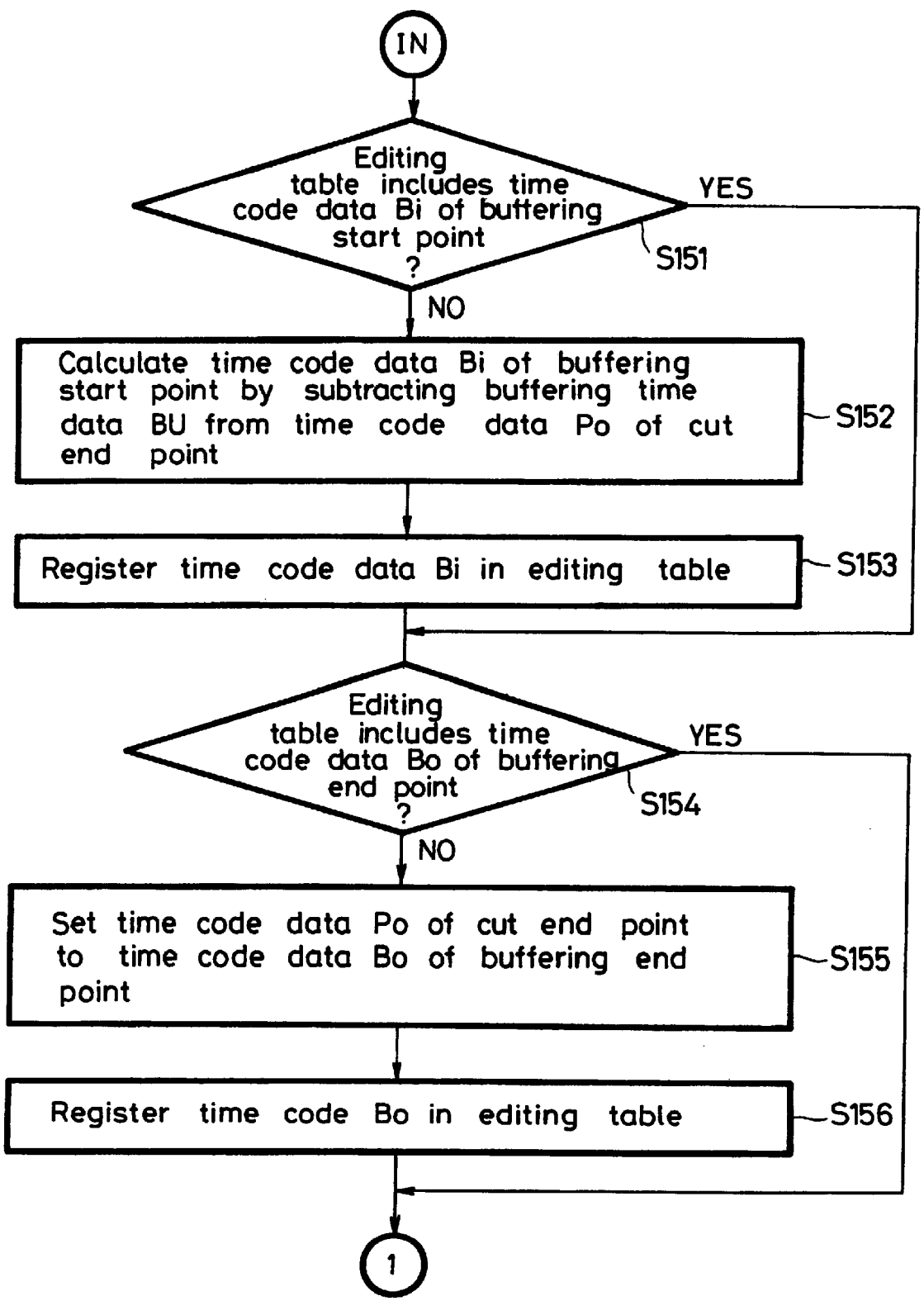
FIGS. 8 through 10 are flowcharts to which reference will be made in explaining a processing of an editing table generating routine of the program executed by the editing controller shown in FIG. 3.

As shown in FIG. 8, at decision step S151, the CPU 11 shown in FIG. 3 searches for the editing table stored in the RAM 14 and it is determined by the CPU 11 whether or not the editing table includes time code data Bi indicative of the buffering start point of the present target cut that is to be processed. If the editing table includes the time code data Bi as represented by a YES at decision step S151, then the processing proceeds to step S152. If on the other hand a NO is output at decision step S151, then the processing proceeds to step S152.

In step S152, the comparing/calculating means 18e shown in FIG. 3 calculates the time code data Bi of the buffering start point by subtracting the buffering time data BU from the time code data Po of the cut end point. Then, the processing proceeds to step S153. The buffering time data BU is the default value. The buffering time data BU is data stored in the ROM 13 shown in FIG. 3 as earlier noted with reference to FIG. 4A.

In step S153, the CPU 11 shown in FIG. 3 registers the time code data Bi calculated at step S152 in the editing table. Then, the processing proceeds to the next decision step S154.

In decision step S154, the CPU 11 shown in FIG. 3 searches for the editing table stored in the RAM 14 and it is determined by the CPU 11 whether or not the editing table include the time code data Bo of the buffering end point of the present target cut. If the editing table includes the time code data Bo as represented by a YES at decision step S154, then the processing proceeds to decision step S157 of the flowchart shown in FIG. 9. If a NO is output at decision step S154, then the processing proceeds to step S155.

In step S155, the comparing/calculating means 18e shown in FIG. 3 sets the time code data Po of cut end point to the time code data Bo of buffering end point. Then, the processing proceeds to step S156.

In step S156, the CPU 11 shown in FIG. 3 registers the time code data Bo obtained at step S155 in the editing table. Then, the processing proceeds to decision step S157 of the flowchart shown in FIG. 9.

Figure 9:
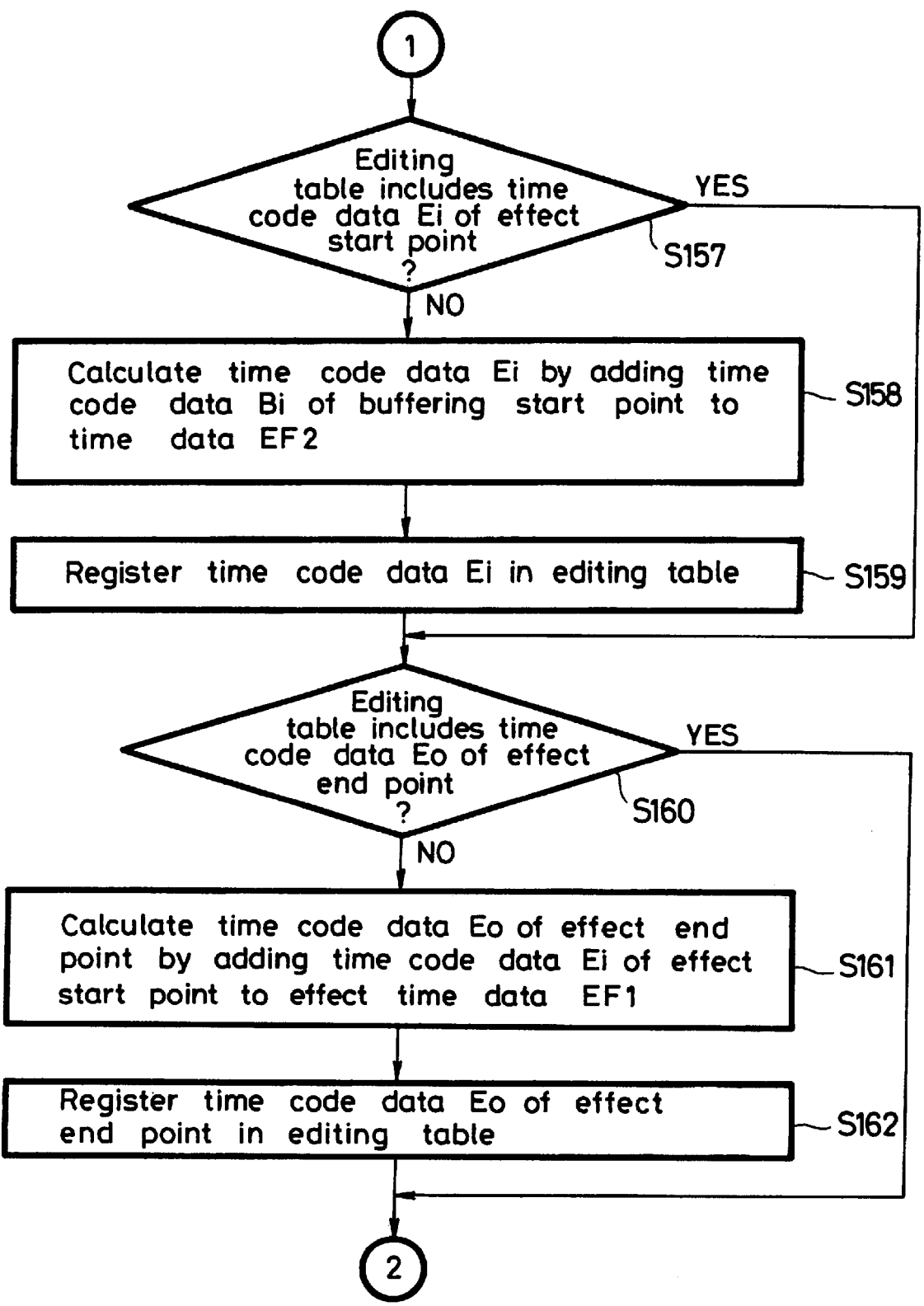

As shown in FIG. 9, the CPU 11 shown in FIG. 3 searches for the editing table and it is determined by the CPU 11 whether or not the editing table includes time code data Ei of the present target cut to be processed. If the editing table includes the time code data Ei as represented by a YES at decision step S157, then the processing proceeds to step S160. If a NO is output at decision step S157, then the processing proceeds to step S158.

In step S158, the comparing/calculating means 18e shown in FIG. 3 calculates time code data Ei of effect start point by adding the time code data Bi of buffering time point registered on the editing table and the effect time data EF2 stored in the ROM 13. Then, the processing proceeds to step S159.

In step S159, the CPU 11 shown in FIG. 3 registers the time code data Ei obtained at step S158 in the editing table of the RAM 14. Then, the processing proceeds to the next decision step S160.

In decision step S160, the CPU 11 shown in FIG. 3 searches for the editing table stored in the RAM 14 and it is determined by the CPU 11 whether or not the editing table includes time code data Eo of effect ending point of a present target cut. If the editing table includes the time code data Eo as represented by a YES at decision step S160, then this routine is ended and the processing proceeds to step S108 in the flowchart shown in FIG. 6. If on the other hand a NO is output at decision step S160, then the processing proceeds to step S161.

In step S161, the comparing/calculating means 18e shown in FIG. 3 calculates the time code data Eo of the effect ending point by adding the effect time data EF1 to the time code data Ei of the effect start point. The effect time data EF1 is the effect time data described before with reference to FIG. 4C and is a default value stored in the ROM 13 shown in FIG. 3.

In the next step S162, the CPU 11 shown in FIG. 3 registers the time code data Eo of the effect end time in the editing table stored in the RAM 14. Then, the processing proceeds to decision step S163 of the flowchart shown in FIG. 10.

Figure 10:
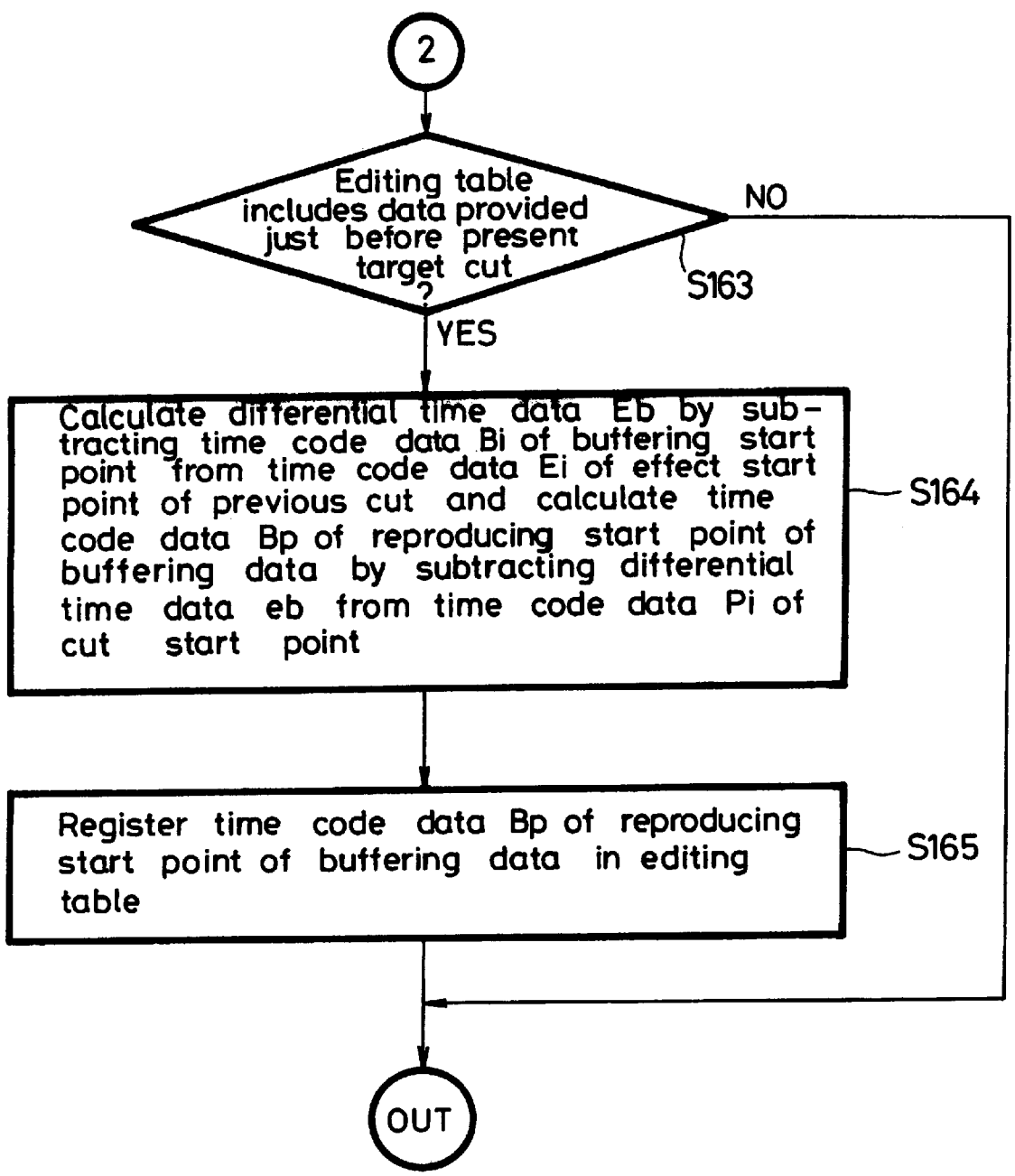

Referring to FIG. 10, in decision step S163, the CPU 11 shown in FIG. 3 searches for the editing table stored in the RAM 14 and it is determined by the CPU 11 whether or not the editing table includes a cut provided immediately before the present target cut. If the editing table includes such cut as represented by a YES at decision step S163, then the processing proceeds to step S164. If a NO is output at decision step S163, this editing table generating routine is ended and the processing proceeds to step S108 of the flowchart shown in FIG. 6.

In step S164, the comparing/calculating means 18e calculates differential time data eb by subtracting the time code data Bi of the buffering start point from the time code data Ei of the effect start point of the previous cut. Also, the comparing/calculating means 18e calculates time code data Bp of buffering data playback start point by subtracting the differential time data eb from the time code data Pi of the cut start point of the present cut. Then, the processing proceeds to the next step S165.

In step S165, the CPU 11 shown in FIG. 3 registers the time code data Bp of the buffering data obtained at step S164 in the editing table stored in the RAM 14.

According to the editing table generating routine, the editing table shown in FIG. 4A is formed on the storage space of the RAM 14 shown in FIG. 3.

Operation done by the editing system shown in FIG. 3 based on the recording-side preprocessor routine will be described with reference to FIG. 11.

Figure 11:
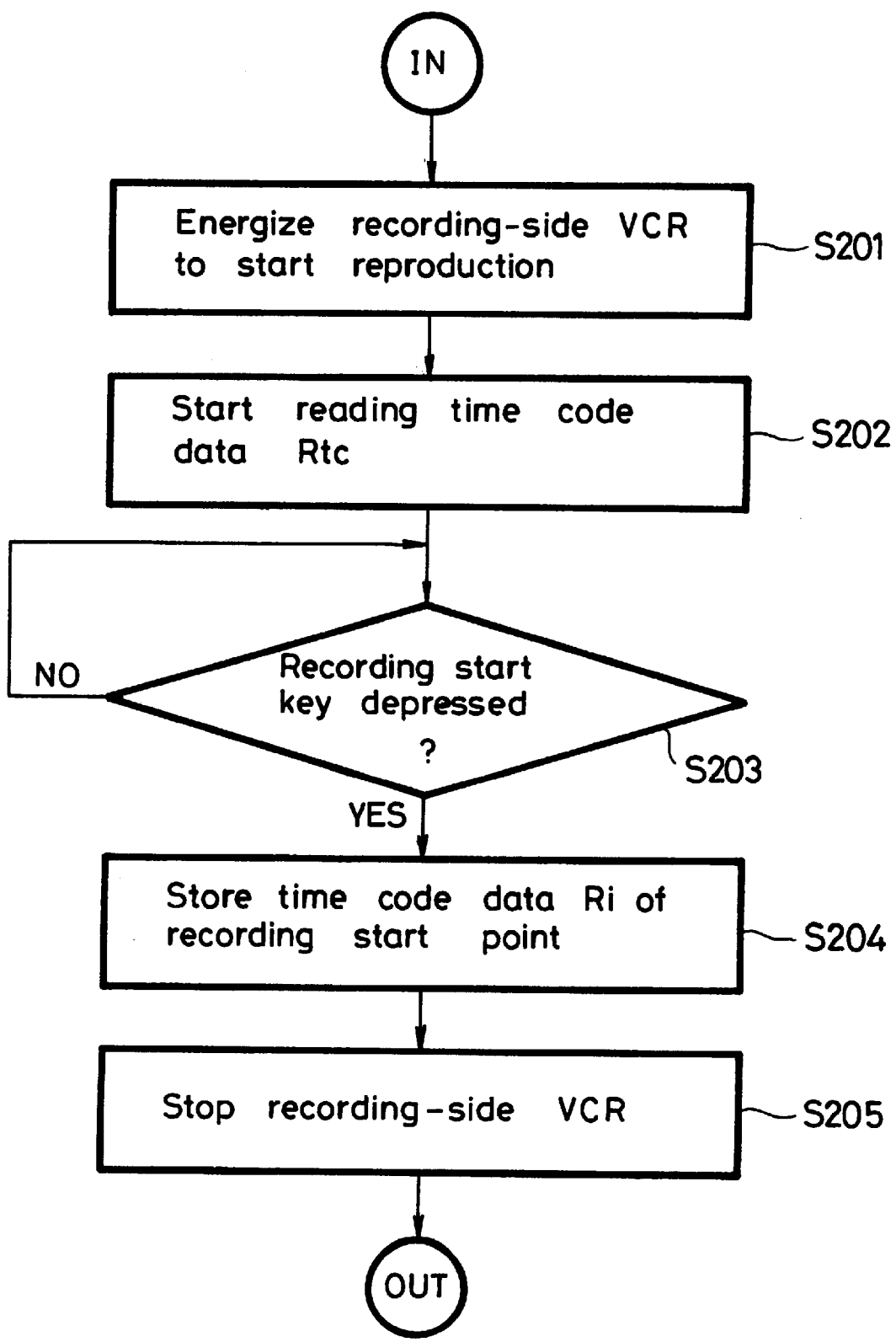
FIG. 11 is a flowchart to which reference will be made in explaining a processing of a recording-side preprocessor routine of the program executed by the editing controller shown in FIG. 3.

As shown in FIG. 11, in step S201, the VCR control means 18b shown in FIG. 3 supplies a control signal to the recording-side VCR 8 and the recording-side VCR 8 is set in the playback mode. Then, the processing proceeds to step S202.

In step S202, the time code reading means 18f shown in FIG. 3 starts reading time code data Rtc supplied thereto from the recording-side VCR 8 through the interface circuit 15. Then, the processing proceeds to the next decision step S203.

It is determined in decision step S203 by the CPU 11 shown in FIG. 3 whether or not the recording start key 19i is depressed. If the recording start key 19i is depressed as represented by a YES at decision step S203, then the processing proceeds to step S204.

In step S204, the CPU 11 shown in FIG. 3 stores time code data Ri of recording start point in the RAM 13. Then, the processing proceeds to step S205.

In step S205, the VCR control means 18b shown in FIG. 3 supplies a control signal to the recording-side VCR 8 and the recording-side VCR 8 is stopped. Then, this recording-side preprocessor routine is ended and the processing proceeds to step S300 of the flowchart shown in FIG. 5.

Operation done by the editing system shown in FIG. 3 based on the set operation routine will be described with reference to FIGS. 12 and 13.

Figure 12:
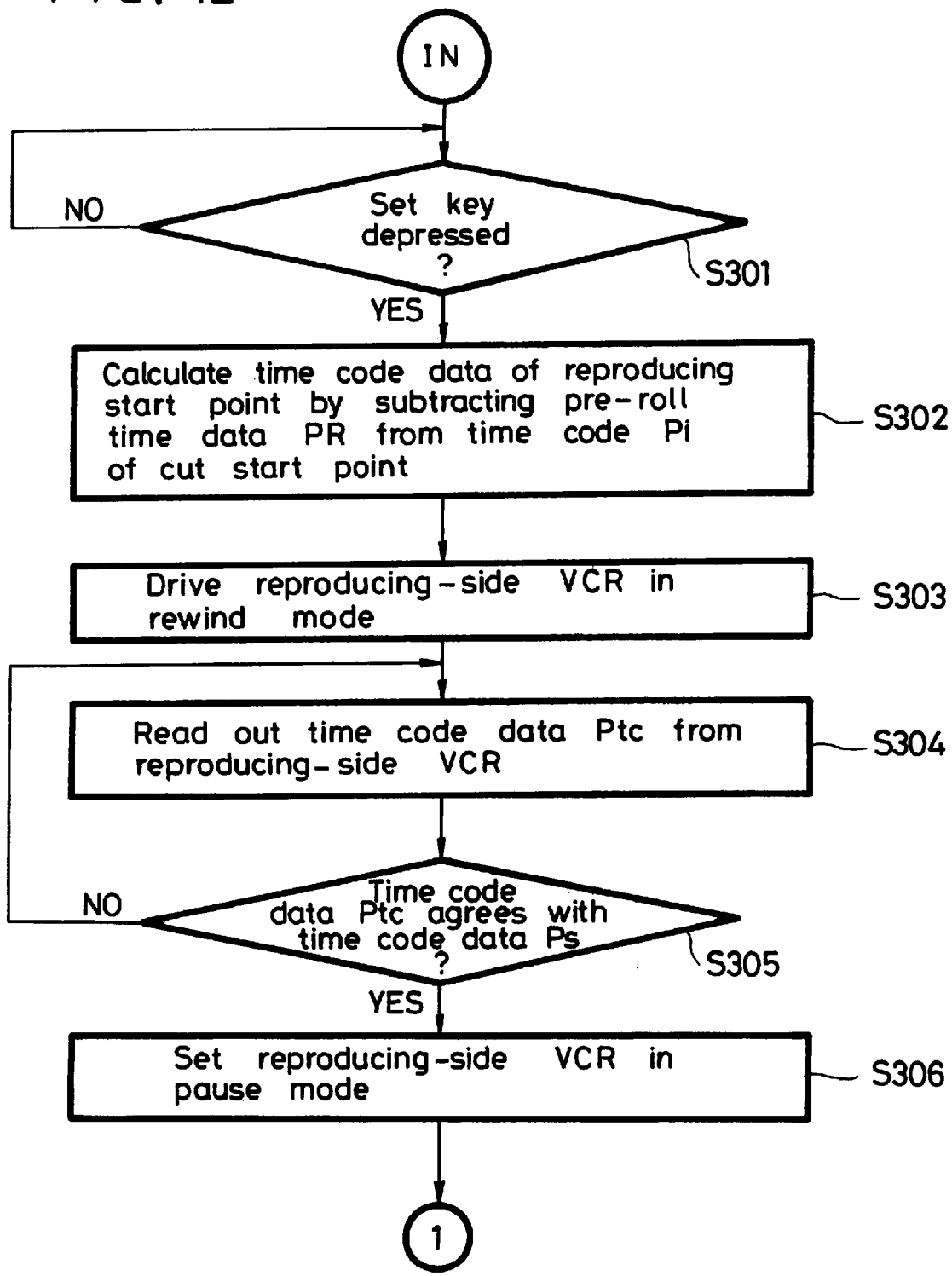
FIGS. 12 and 13 are flowcharts to which reference will be made in explaining a processing of a set operation routine of the program executed by the editing controller shown in FIG. 3.

As shown in FIG. 12, it is determined in decision step S301 whether or not the set key 19a of the operation unit 19 shown in FIG. 3 is depressed. If the set key 19a is depressed as represented by a YES at decision step S301, then the processing proceeds to step S302.

In step S302, the comparing/calculating means 18e shown in FIG. 3 calculates time code data Ps of playback start point by subtracting pre-roll time data PR from the time code data Pi of the cut start point. Then, the processing proceeds to step S303. The pre-roll time data PR is the pre-roll time data shown in FIG. 4C and is the default value stored in the Rom 13. The time code data Ps is the time code data Ps (see FIG. 4D) of the playback start point on the magnetic tape of the video tape cassette set on the reproducing-side VCR 2. The time code data Ps is stored in the RAM 14 by the CPU 11 shown in FIG. 3.

In step S303, the VCR control means 18b shown in FIG. 3 supplies a control signal to the reproducing-side VCR 2 and the reproducing-side VCR 2 carries out rewind operation. Then, the processing proceeds to step S304.

In step S304, the time code reading means 18f shown in FIG. 3 reads time code data Ptc supplied thereto from the reproducing-side VCR 2 through the interface circuit 15. Then, the processing proceeds to the next decision step S305.

It is determined in decision step S305 by the comparing/calculating means 18e shown in FIG. 3 whether or not the time code data Ptc supplied from the reproducing-side VCR 2 is agreed with the time code data Ps stored in the RAM 14. If the time code data Ptc is agreed with the time code data Ps as represented by a YES at decision step S305, then the processing proceeds to step S306. If on the other hand a NO is output at decision step S305, then the processing returns to step S304 and step S304 and step S305 are repeated.

In step S306, the VCR control means 18b shown in FIG. 3 supplied a control signal to the reproducing-side VCR 2 and the reproducing-side VCR 2 is set in the pause mode. Then, the processing proceeds to the next decision step S307 of the flowchart shown in FIG. 13.

Figure 13:
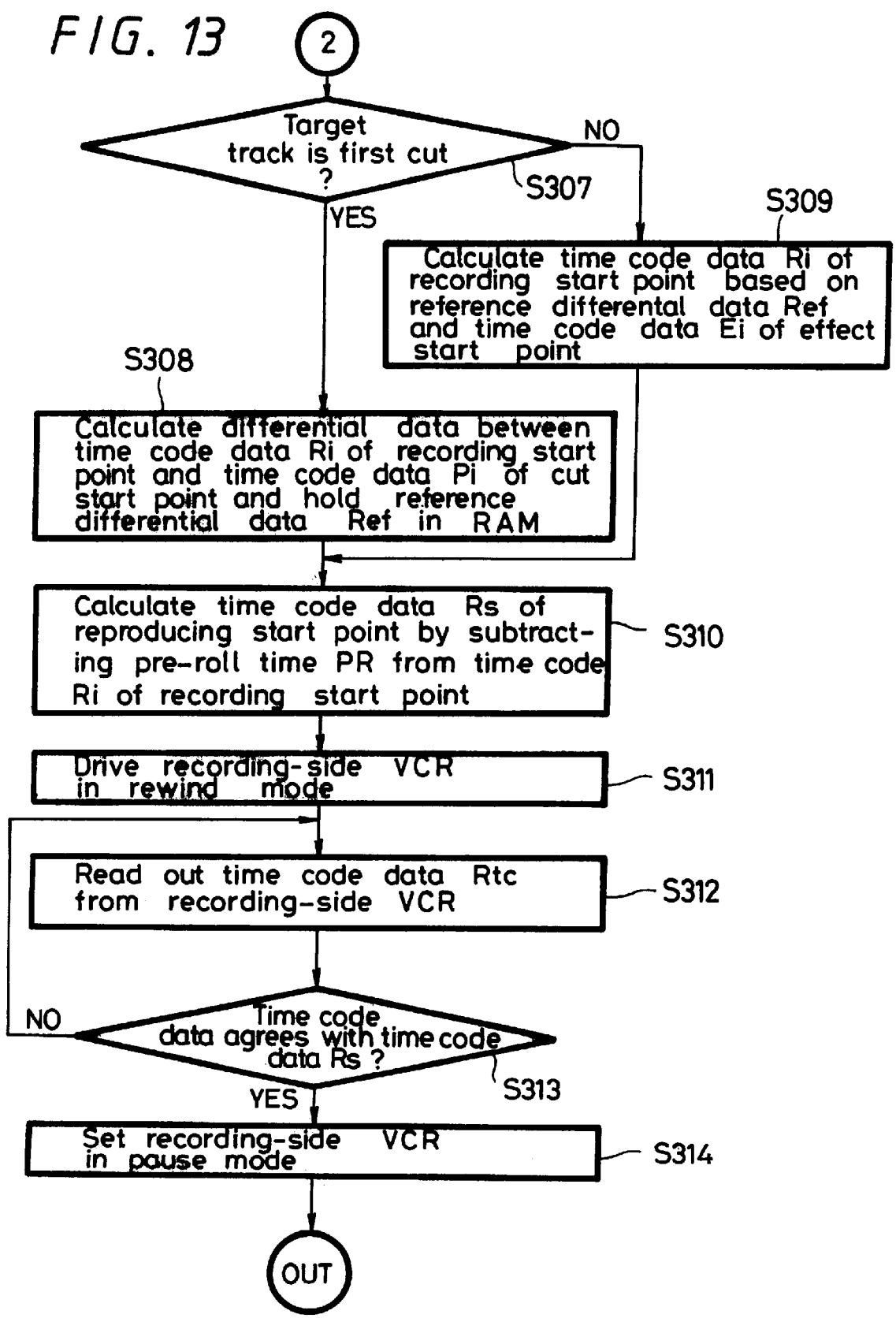

Referring to FIG. 13, it is determined in decision step S307 by the CPU 11 shown in FIG. 3 whether or not a target cut is a first cut. If the target cut is the first cut as represented by a YES at decision step S307, then the processing proceeds to step S308. If on the other hand a NO is output at decision step S307, then the processing proceeds to step S309.

In step S308, the comparing/calculating means 18e shown in FIG. 3 calculates differential data between the time code data Ri of the recording start point and the time code data Pi of the cut start point. Resulting reference differential data Ref from the comparing/calculating means 18e is stored in the RAM 14. Then, the processing proceeds to step S310. The reference differential data Ref is the reference differential data Ref shown in FIG. 4D.

In step S309, the comparing/calculating means 18e shown in FIG. 3 obtains time code data Ri of recording start point based on the reference differential data Ref and time code data Ei of effect start point. Then, the processing proceeds to step S310.

While the time code data Ri of recording start point used when the first cut is recorded becomes the time code data Ri set in the recording-side preprocessor routine, time code data Ri of recording start points after the second recording start point are calculated based on the reference differential data Ref and the time code data Ei of effect start point. Specifically, if the reference differential data Ref is a positive value, then the time code data Ri of the recording start point becomes time code data delayed from the time code data Ei of the effect start point by the reference differential data Ref. If the reference differential data Ref is a negative value, then the time code data of the recording start point becomes time code data advanced from the time code data Ei of the effect start point by the reference differential data Ref.

In step S310, the comparing/calculating means 18e shown in FIG. 3 calculates time data Rs of reproducing-side playback start point by subtracting the pre-roll time data PR from the time code data Ri of recording start point. Then, the processing proceeds to step S311. The pre-roll time data PR is the pre-roll time data shown in FIG. 4C and is a default value stored in the ROM 13. Further, the time code data Rs is the time code data Rs (see FIG. 4D) of playback start point on the magnetic tape of the video tape cassette 9 set on the recording-side VCR 8. The time code data Rs is stored in the RAM 14 by the CPU 11 shown in FIG. 3.

In step S311, the VCR control means 18b shown in FIG. 3 supplies a control signal to the recording-side VCR 8 and the recording-side VCR 8 starts the rewinding operation. Then, the processing proceeds to step S312.

In step S312, the time code reading means 18f shown in FIG. 3 reads time code data Rtc supplied thereto from the recording-side VCR 8 through the interface circuit 15. Then, the processing proceeds to the next decision step S313.

In decision step S313, it is determined by the comparing/calculating means 18e shown in FIG. 3 whether or not the value indicated by the time code data from the recording-side VCR 8 and the value indicated by the time code data Rs of playback start point are agreed with each other. If a YES is output at decision step S313, then the processing proceeds to step S314. If on the other hand a NO is output at decision step S313, then the processing returns to step S312.

In step S314, the VCR control means 18b shown in FIG. 3 supplies a control signal to the recording-side VCR 8 and the recording-side VCR 8 is set in the pause mode. Then, the processing proceeds to step S400 of the flowchart shown in FIG. 5.

If time code data is read out upon rewind or fast forward mode and the time code data thus read out becomes target time code data, then in order to set the position of the magnetic tape to a proper position, upon rewind or fast forward mode, the magnetic tape is paused at a time point in which the target time code data is read out. Then, the apparatus is set in the reproducing mode by an amount advanced from the target position so that the apparatus is stopped at the target position. Of course, a control signal for stopping the apparatus from the rewind mode and the fast forward mode may be supplied to the recording-side VCR 8 and the reproducing-side VCR 2 at a timing in which the apparatus can be stopped at the target position.

Operation based on the first cut processing routine of the editing system shown in FIG. 3 will be described with reference to FIGS. 14 and 15.

Figure 14:
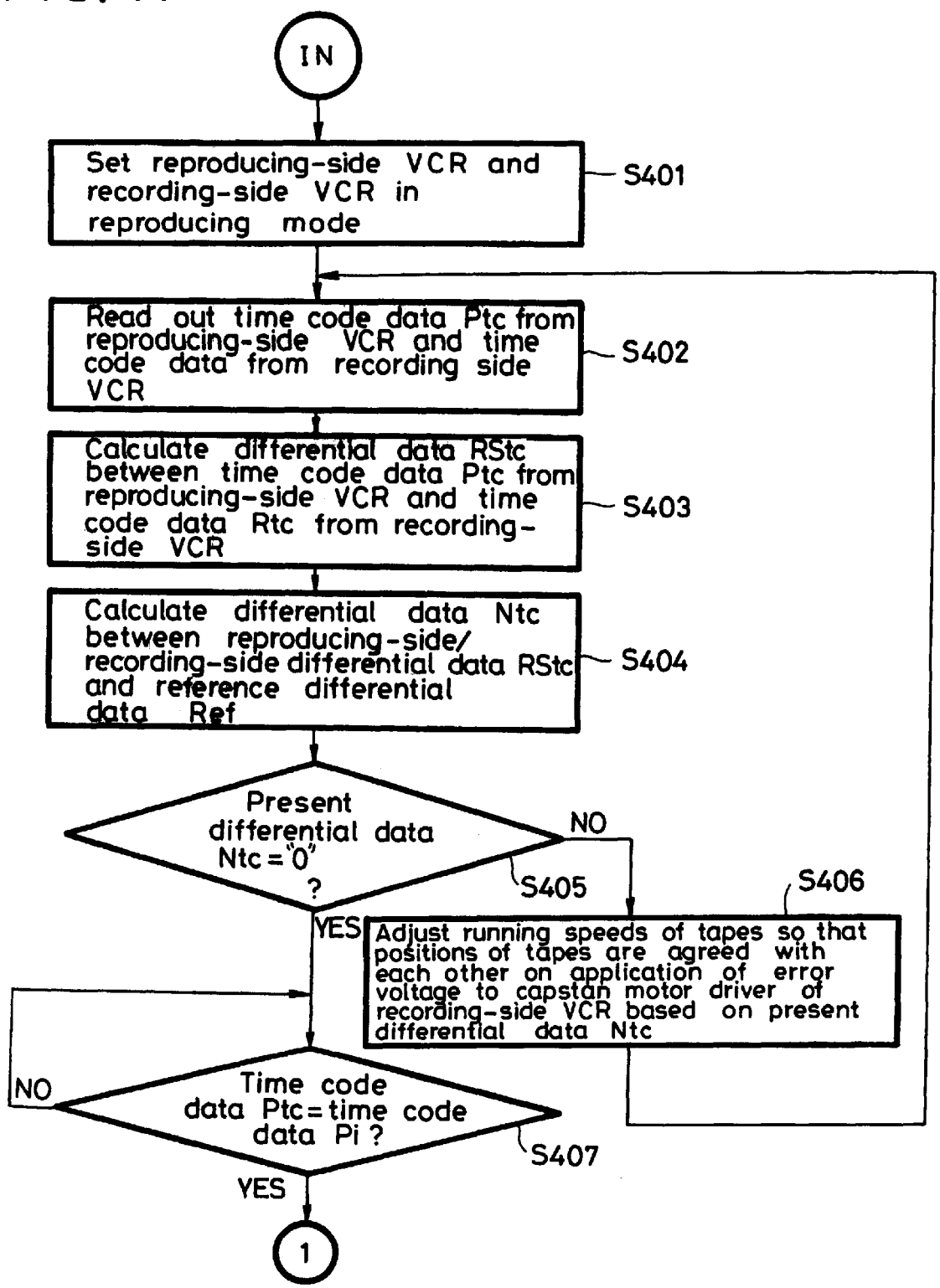
FIGS. 14 and 15 are flowcharts to which reference will be made in explaining a processing of a first cut routine of the program executed by the editing controller shown in FIG. 3.

As shown in FIG. 14, in step S401, the VCR control means 18b shown in FIG. 3 supplies control signals to the reproducing-side VCR 2 and the recording-side VCR 8, respectively, and the reproducing-side VCR 2 and the recording-side VCR 8 are respectively set in the reproducing mode. Then, the processing proceeds to step S402. The reproducing-side VCR 2 carries out pre-roll operation by starting reproducing the magnetic tape of the video tape cassette 1 set thereon from the recorded position of time code data Ps of playback start point. The recording-side VCR 8 carries out pre-roll operation by starting reproducing the magnetic tape of the video tape cassette 9 set thereon from the recorded position of the time code data RS of the reproducing start point.

In step S402, the time code reading means 18f shown in FIG. 3 reads out the time code Ptc supplied thereto from the reproducing-side VCR 2 through the interface circuit 15 and the time code Rtc supplied thereto from the recording-side VCR 8 through the interface circuit 15. Then, the processing proceeds to step S403.

In step S403, the comparing/calculating means 18e shown in FIG. 3 calculates differential data RStc between the time code Ptc supplied thereto from the reproducing-side VCR 2 through the interface circuit 15 and the time code Rtc supplied thereto from the recording-side VCR 8 through the interface circuit 15. Then, the processing proceeds to step S404.

In step S404, the comparing/calculating means 18e shown in FIG. 3 calculates present differential data Ntc which is differential data between the playback-side/recording-side differential data RStc obtained at step S403 and the reference differential data Ref. Then, the processing proceeds to the next decision step S405.

It is determined in decision step S405 by the comparing/calculating means 18e shown in FIG. 3 whether or not the present differential data Ntc is "0". If the present differential data Ntc is "0" as represented by a YES at decision step S405, then the processing proceeds to the next decision step S407. If on the other hand a NO is output at decision step S405, then the processing proceeds to step S406.

In step S406, the servo means 18a shown in FIG. 3 obtains error voltage data based on the present differential data Ntc and supplies the error voltage data through the interface circuit 15 to the recording-side VCR 8 with the result that the recording-side VCR 8 controls a capstan motor driver (not shown) to fine adjust the running speeds of the magnetic tapes to properly match the tape positions of the magnetic tapes. Then, the processing returns to step S402.

It is determined in decision step S407 by the comparing/calculating means 18e shown in FIG. 3 whether or not the time code data Ptc supplied thereto from the reproducing-side VCR 2 through the interface circuit 15 and the time code data Pi of the cut start point are agreed with each other. If the time code data Ptc and the time code data Pi are agreed with each other as represented by a YES at decision step S407, then the processing proceeds to step S408 in the flowchart shown in FIG. 15.

Figure 15:
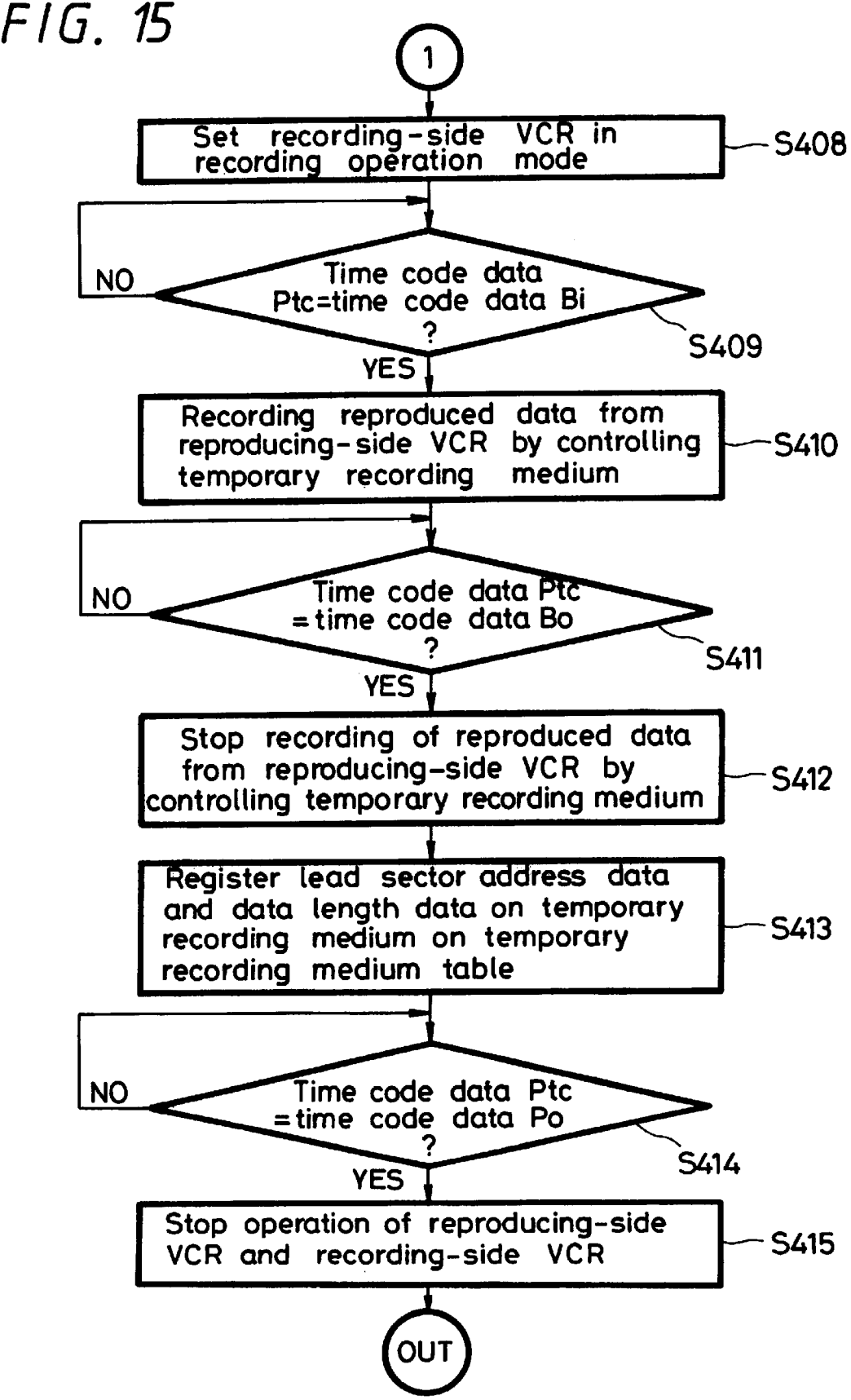

As shown in FIG. 15, the VCR control means 18*b* shown in FIG. 3 supplies a control signal to the recording-side VCR 8 and the recording-side VCR 8 starts recording. Then, the processing proceeds to the next decision step S409.

It is determined in decision step S409 by the comparing/calculating means 18*e* shown in FIG. 3 whether or not the time code data Ptc supplied thereto from the reproducing-side VCR 2 through the interface circuit 15 and the time code data Bi of the buffering start point are agreed with each other. If the time code data Ptc and the time code data Bi are agreed with each as represented by a YES at decision step S409, then the processing proceeds to step S410.

In step S410, the temporary recording medium control means 18*d* shown in FIG. 3 supplies a control signal through the interface circuit 15 to the temporary recording medium 3 to record the reproduced data from the reproducing-side VCR 2 in the temporary recording medium 3. Then, the processing proceeds to the next decision step S411.

It is determined in decision step S411 by the comparing/calculating means 18*e* shown in FIG. 3 whether or not the time code data Ptc supplied thereto from the reproducing-side VCR 2 through the interface circuit 15 and the time code data Bo of buffering end point are agreed with each other. If the time code data Ptc and the time code data Bo are agreed with each other as represented by a YES at decision step S411, then the processing proceeds to step S412.

In step S412, the temporary recording medium control means 18*d* shown in FIG. 3 supplies a control signal through the interface circuit 15 to the temporary recording medium 3 to stop the recording of the reproduced data supplied from the reproducing-side VCR 2 on the temporary recording medium 3. Then, the processing proceeds to step S413.

In step S413, the temporary recording medium control means 18*d* shown in FIG. 3 registers leading sector address data and data length data on the temporary recording medium 3 in the temporary recording medium table (see FIG. 4B) stored in the RAM 14. Then, the processing proceeds to the next decision step S414.

It is determined in decision step S414 by the comparing/calculating means 18*e* shown in FIG. 3 whether or not the time code data Ptc supplied thereto from the reproducing-side VCR 2 through the interface circuit 15 and time code data Po of cut end point are agreed with each other. If the time code data Ptc and the time code data Po are agreed with each other as represented by a YES at decision step S414, then the processing proceeds to step S415.

In step S415, the VCR control means 18*b* shown in FIG. 3 supplies control signals through the interface circuit 15 to the reproducing-side VCR 2 and the recording-side VCR 8 and the reproducing-side VCR 2 and the recording-side VCR 8 are stopped in operation. Then, this routine is ended and the processing proceeds to step S500 shown in FIG. 5.

In step S500, the setting for recording the next cut is carried out by the setting operation routine similar to that of step S300. In step S500, the setting operation routine described with reference to S300 is called by some suitable methods, such as subroutine call on the program and processed as step S500.

Operation of the cut processing routine of the editing system shown in FIG. 3 will be described with reference to FIGS. 16 through 18.

Figure 16:
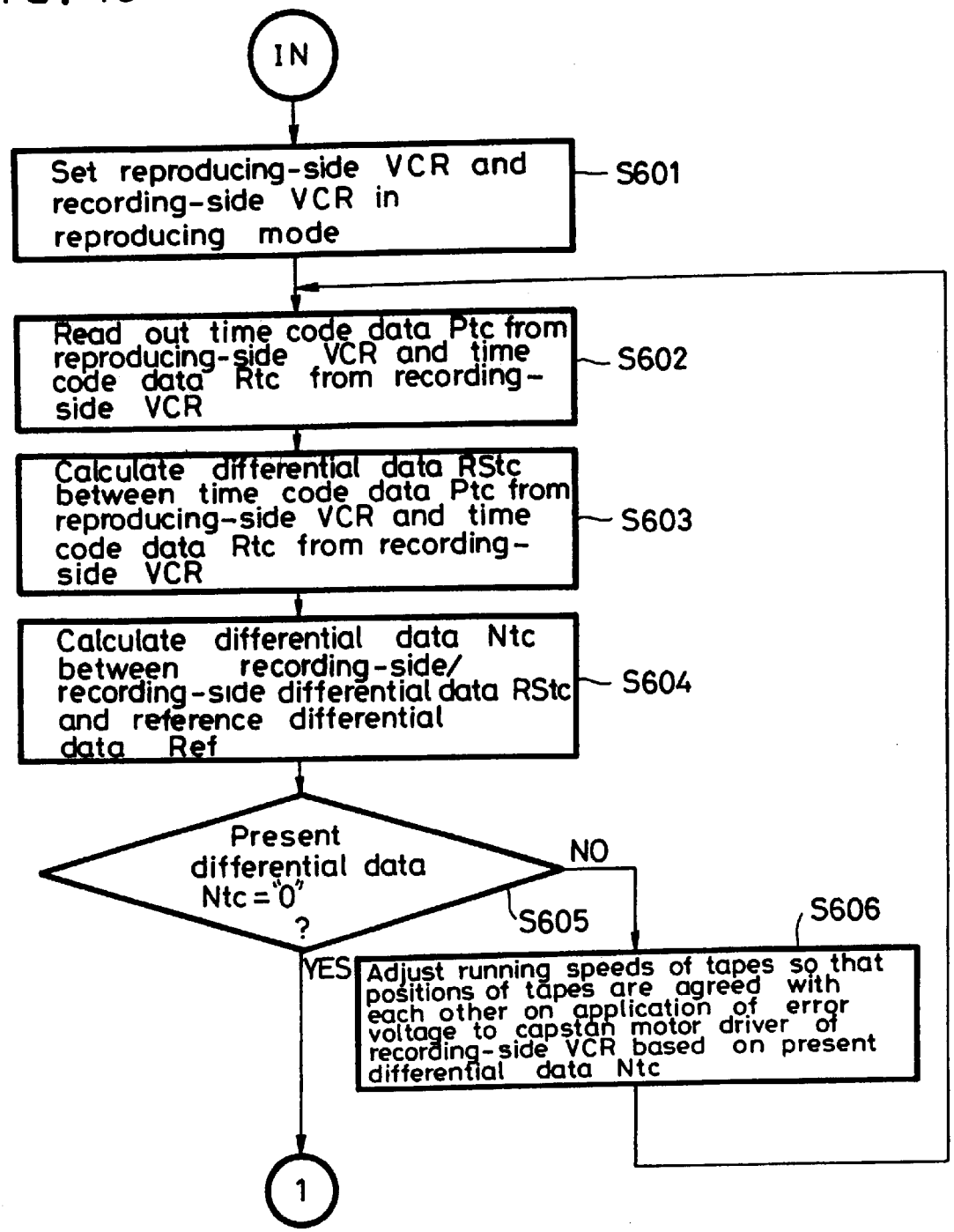
FIGS. 16 through 18 are flowcharts to which reference will be made in explaining a processing of a cut routine of the program executed by the editing controller shown in FIG. 3.

As shown in FIG. 16, in step S601, the VCR control means 18*b* shown in FIG. 3 supplies control signals through the interface circuit 15 to the reproducing-side VCR 2 and the recording-side VCR 8 and therefore the reproducing-side VCR 2 and the recording-side VCR 8 are set in the playback mode, respectively. Then, the processing proceeds to step S602.

In step S602, the time code reading means 18*f* shown in FIG. 3 reads the time code data Ptc supplied thereto from the reproducing-side VCR 2 through the interface circuit 15 and the time code data Rtc supplied thereto from the recording-side VCR 8 through the interface circuit 15. Then, the processing proceeds to step S603.

In step S603, the comparing/calculating means 18*e* shown in FIG. 3 calculates differential data RStc between the time code data Ptc supplied thereto from the reproducing-side VCR 2 through the interface circuit 15 and the time code data Rtc supplied thereto from the recording-side VCR 8 through the interface circuit 15. Then, the processing proceeds to step S604.

In step S604, the comparing/calculating means 18*e* shown in FIG. 3 calculates present differential data Ntc which is the reference differential data Ref between the recording-side/reproducing-side differential data RStc obtained at step S603 and the reference differential data Ref. Then, the processing goes to the next decision step S605.

It is determined in decision step S605 by the comparing/calculating means 18*e* shown in FIG. 3 whether or not the present differential data Ntc obtained at step S604 is "0". If the present differential data Ntc is "0" as represented by a YES at decision step S605, then the processing proceeds to the next decision step S607 in the flowchart shown in FIG. 17. If on the other hand a NO is output at decision step S605, then the processing proceeds to step S606.

In step S606, the servo means 18*a* shown in FIG. 3 obtains error voltage data based on the present differential data Ntc. Then, the servo means 18*a* supplies the error voltage data through the interface circuit 15 to the recording-side VCR 8 so that the recording-side VCR 8 controls the capstan motor driver (not shown) so as to fine adjust the tape speeds to properly match the tape positions of the magnetic tapes. Then, the processing returns to step S602 and step S602 and the following steps are repeated.

Figure 17:
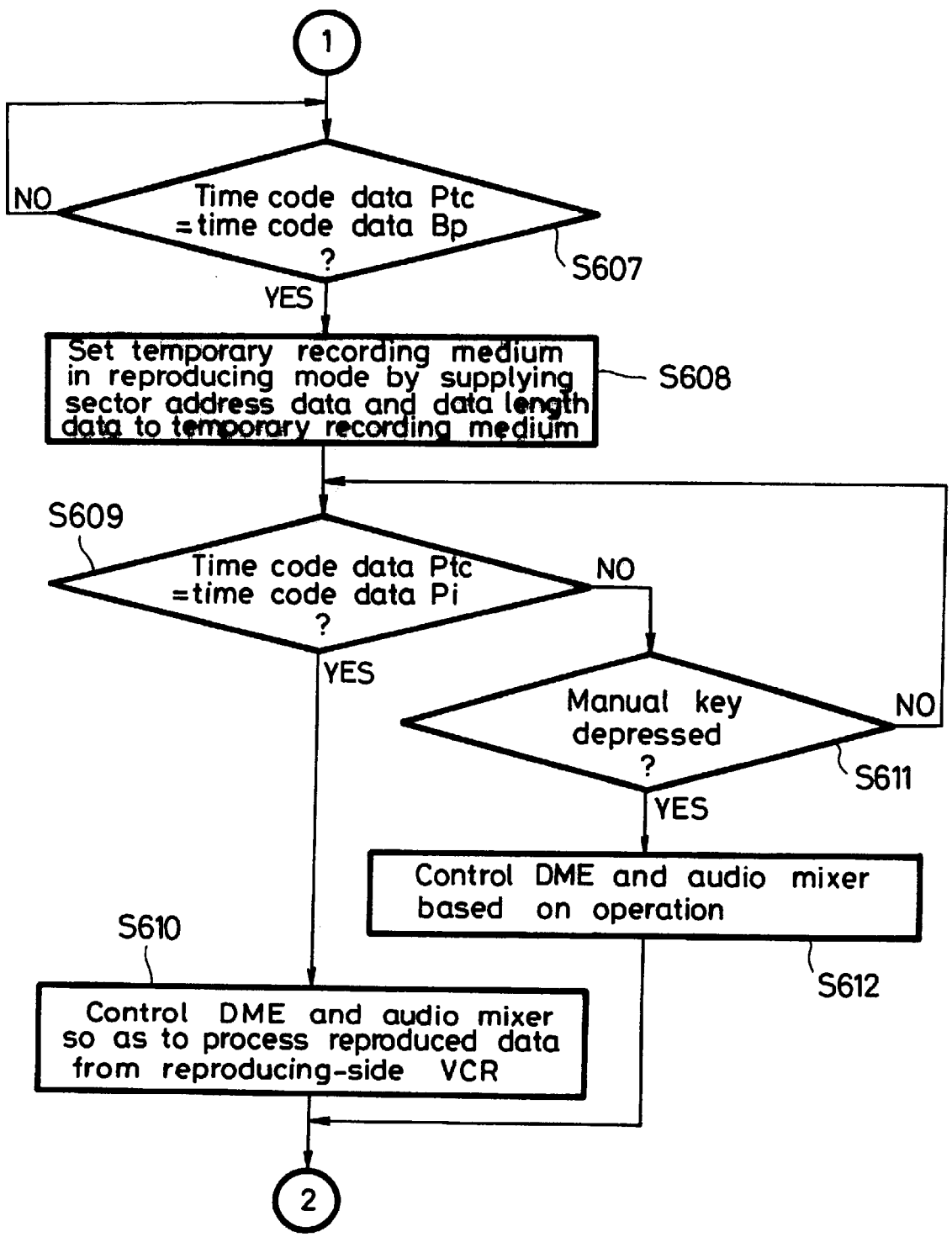

As shown in FIG. 17, it is determined in decision step S607 by the comparing/calculating means 18*e* shown in FIG. 3 whether or not the time code data Ptc supplied thereto from the reproducing-side VCR 2 through the interface circuit 15 and the time code data Bp of the buffering data reproducing start point are agreed with each other. If the time code data Ptc and the time code data Bp are agreed with each other as represented by a YES at decision step S607, then the processing proceeds to step S608.

In step S608, the temporary recording medium control means 18*d* shown in FIG. 3 refers to the temporary recording medium table stored in the RAM 14 and supplies the sector address data and the data length data to the temporary recording medium 3 so that the temporary recording medium 3 starts reproducing the buffering data. Then, the processing proceeds to the next decision step S609.

It is determined in decision step S609 by the comparing/calculating means 18*e* shown in FIG. 3 whether or not the time code data Ptc supplied thereto from the reproducing-side VCR 2 through the interface circuit 15 and the time code data Pi of the cut start point are agreed with each other. If the time code data Ptc and the time code data Pi are agreed with each other as represented by a YES at decision step S609, then the processing proceeds to step S610. If on the other hand a NO is output at decision step S609, then the processing proceeds to the next decision step S611.

In step S610, the effect control means 18c shown in FIG. 3 supplies control signals through the interface circuit 15 to the DME 5 and the audio mixer 6 and the DME 5 and the audio mixer 6 are therefore energized to execute effect processings, respectively. As data for effecting automatic effect processing, there can be used the EDL data which was earlier noted. The EDL data is loaded onto the RAM 14 from a flexible disk, for example.

It is determined in decision step S611 by the CPU 11 shown in FIG. 3 whether or not the manual key 19h is depressed. If the manual key 19h is depressed as represented by a YES at decision step S611, then the processing proceeds to step S612. If on the other hand a NO is output at decision step S611, then the processing returns to decision step S609 and the decision step S609 is repeated. The manual key 19h is used to indicate that operations of the switch group 4 of the DME 5 and operations of the switch group 7 of the audio mixer 6 are made valid.

In step S612, the effect control means 18c shown in FIG. 3 controls the DME 5 and the audio mixer 6 based on the operation of the manual key 19h. Then, the processing proceeds to step S614 in the flowchart shown in FIG. 18. The control based on the operation means that, if it is determined in decision step S611 that the manual key 19h is depressed, then the control based on the EDL data is not carried out. In other words, if the manual key 19h is depressed, then the processings based on the operations of the switch group 4 of the DME 5 and the operations of the switch group 7 of the audio mixer 6 become valid.

Figure 18:
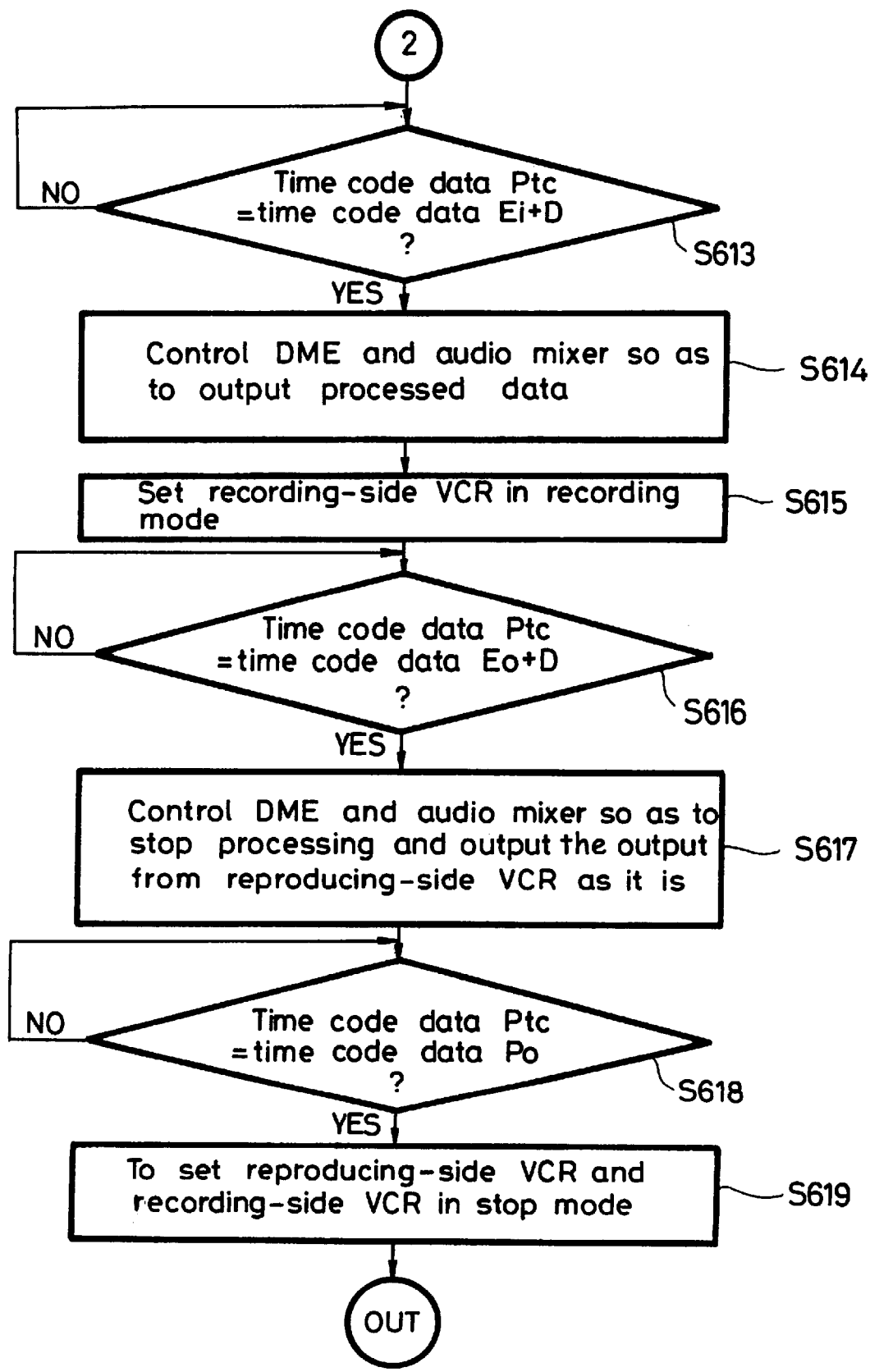

As shown in FIG. 18, it is determined in decision step S613 by the comparing/calculating means 18e shown in FIG. 3 whether or not the time code data Ptc supplied thereto from the reproducing-side VCR 2 through the interface circuit 15 and an added result which results from adding delay time data D to the time code data Ei of the effect start point are agreed with each other. If the time code data Ptc and the added result are agreed with each other as represented by a YES at decision step S613, then the processing proceeds to step S614.

In step S614, the effect control means 18c shown in FIG. 3 supplies control signals through the interface circuit 15 to the DME 5 and the audio mixer 6 and therefore the DME 5 and the audio mixer 6 output data that had been added with video and audio effect. The step S614 is the step at which the output timings of the DME 5 and the audio mixer 6 and the recording timing of the recording-side VCR 8 are adjusted. Also, the step S614 is used to adjust an error amount of the delay time data D.

In step S615, the VCR control means 18b shown in FIG. 3 supplies a control signal through the interface circuit 15 to the recording-side VCR 8 and hence the recording-side VCR 8 is set in the recording mode, whereby video data Ep that had been added with video effect by the DME 5 and audio data Mp that had been added with audio effect by the audio mixer 6 are supplied to the recording-side VCR 8 and recorded on the magnetic tape of the video tape cassette 9 set on the recording-side VCR 8 so as to form slant tracks.

It is determined in decision step S616 by the VCR control means 18b shown in FIG. 3 whether or not the time code data Ptc supplied thereto from the reproducing-side VCR 2 through the interface circuit 15 and an added result which results from adding the time code data Eo of the effect end point and the delay time data D are agreed with each other.

If the time code data Ptc and the added result are agreed with each other as represented by a YES at decision step S616, then the processing proceeds to step S617.

In step S617, the effect control means 18c shown in FIG. 3 supplies control signals to the DME 5 and the audio mixer 6 and the DME 5 and the audio mixer 6 are therefore set in the stop mode, respectively, whereby the video data Vp and the audio data Mp from the reproducing-side VCR 2 are output as they are. Then, the processing proceeds to the next decision step S618.

It is determined in decision step S618 by the comparing/calculating means 18e shown in FIG. 3 whether or not the time code data Ptc supplied thereto from the reproducing-side VCR 2 through the interface circuit 15 and the time code data Po of the cut end point are agreed with each other. If the time code data Ptc and the time code data Po are agreed with each other as represented by a YES at decision step S618, then the processing proceeds to step S619.

In step S619, the VCR control means 18b shown in FIG. 3 supplies control signals through the interface circuit 15 to the reproducing-side VCR 2 and the recording-side VCR 8 to set the reproducing-side VCR 2 and the recording-side VCR 8 in the stop mode, respectively. Then, this cut processing routine shown in FIG. 18 is ended and the processing proceeds to step S700 in the flowchart shown in FIG. 5.

According to the processing that has been described so far, the selected cuts are sequentially recorded on the magnetic tape of the video tape cassette 9 set on the recording-side VCR 8. Also, the connected portion between the cuts, i.e., the first cut and the next cut becomes video and audio data which are provided as effect processed results of the buffered video and audio data.

The case that the edited recorded material tape is made by using the two cuts according to the editing system shown in FIG. 3 will be described with reference to FIGS. 19A through 19L. The example shown in FIGS. 19A through 19L shows the case that the buffering is carried out automatically. In FIGS. 19A through 19L, audio data is not shown but the audio data is similar to video data from a timing standpoint. Therefore, the audio data need not be described in detail.

Reference symbols in FIGS. 19A through 19L mean as follows (the same reference symbols as those of FIGS. 3 through 18 mean similarly).

V1 (CUT1) . . . cut selected in "first cut processing routine" shown in FIG. 5 (referred to hereinafter as "first cut";

V2 (CUT2) . . . cut selected in "cut processing routine" shown in FIG. 5 (referred to hereinafter as "second cut");

VBr . . . buffering data of the temporary recording medium 3 recorded in "first cut processing routine" shown in FIG. 5; and VBp . . . buffering data recorded in "first cut processing routine" and reproduced in "cut processing routine" shown in FIG. 5.

Reference symbol "V1" in the parenthesis affixed to reference symbols other than the above-mentioned reference symbols, such as Ps(V1) means reference symbol associated with the first cut V1 (CUT1). Reference symbol Ps depicts a reproducing start point in the video tape cassette 1 set on the reproducing-side VCR 2 as earlier noted. Accordingly, when "(V1)" is affixed to "Ps", Ps(V1) depicts a reproducing start point to process the first cut designated in the video tape cassette 1 set on the reproducing-side VCR 2.

As shown in FIG. 19A, the first cut V1 (CUT1) is set on the magnetic tape (reproducing-side tape) of the video tape cassette 1 when the time code data Pi (Vi) of cut start point and the time code data Po (V1) of cut end point are designated according to the processing based on the reproducing-side preprocessor routine. Also, the second cut V2 (CUT2) is set when time code data Pi (V2) of cut start point and time code data Po (V2) of cut end point are designated.

By the processing based on the set operation routine, time code data Ps (V1) recorded at the position advanced by the pre-roll time data PR from the time code Pi (V1) of the cut start point of the first cut V1 (CUT1) is set on the magnetic tape of the video tape cassette 1 as the reproducing start point. Similarly, by the set operation routine, time code data Ps (V2) recorded at the position advanced by the pre-roll time data PR from time code data Pi (V2) of the cut start point of the second cut V2 (CUT2) is set on the magnetic tape of the video tape cassette 1 as the reproducing start point.

On the other hand, as shown in FIG. 19B, by the recording-side preprocessor routine, time code data Ri (V1) of recording start point is set on the magnetic tape (recording-side tape) of the video tape cassette 9, thereby setting the position at which the first cut V1 (CUT1) is recorded.

Then, by the operation based on the set operation routine, time code data Rs (V1) recorded at the position advanced by the pre-roll time PR from the time code data Ri (V1) of the recording start point of the first cut V1 (CUT1) is set on the magnetic tape of the video tape cassette 9 as the reproducing start point.

After data had been set as described above, according to the first cut processing routine, as shown in FIG. 19C, recorded data is sequentially reproduced from the magnetic tape of the video tape cassette 1 set on the reproducing-side VCR 2 at its position in which the time code data Ps (V1) is recorded. Then, as shown in FIG. 19D, recorded data is sequentially reproduced from the magnetic tape of the video tape cassette 9 set on the recording-side VCR 8 at its position in which the time code data Rs (V1) is recorded.

When the position on the magnetic tape of the video tape cassette 1 set on the reproducing-side VCR 2 is agreed with the position at which the time code data Pi (V1) is recorded, the recording-side VCR 8 is placed in the recording mode, whereby the first cut V1 (CUT1) supplied from the reproducing-side VCR 2 is recorded on the magnetic tape of the video tape cassette 9 set on the recording side VCR 8 at its position in which the time code data Ri (V1) of recording start point is recorded.

As shown in FIG. 19E, when the position on the magnetic tape of the video tape cassette 1 set on the reproducing-side VCR 2 is agreed with the position at which the time code data Bi of buffering start point is recorded, the first cut V1 (CUT1) supplied from the reproducing-side VCR 2 is sequentially recorded on the temporary recording medium 3 as the buffering data VBr, ABr. This recording time becomes buffering time data BU serving as a default value.

To record the second cut V2 (CUT2) on the magnetic tape of the video tape cassette 9 set on the recording-side VCR 8 after the second cut V2 (CUT2) and the buffering data VBp had been processed in special effect will be described with reference to FIGS. 19F through 19L.

As shown in FIG. 19F, after the first cut V1 (CUT1) was processed by the first cut processing routine, operation based on the set operation routine is carried out. By the processing in the set operation routine, the position of the magnetic tape (reproducing-side tape) of the video tape cassette 1 is agreed with the position at which the time code data Ps (V2) of reproducing start point is recorded. As shown in FIG. 19G, the position of the magnetic tape (recording-side tape) of the video tape cassette 9 is agreed with the position at which the time code data Rs (V2) of reproducing start point is recorded.

After time code data had been set as described above, according to the cut processing routine, as shown in FIG. 19H, recorded data is sequentially reproduced from the magnetic tape of the video tape cassette 1 set on the reproducing-side VCR 2 at its position in which the time code data Ps (V2) is recorded. Then, recorded data is sequentially reproduced from the magnetic tape of the video tape cassette 9 set on the recording-side VCR 8 at its position in which the time code data Rs (V2) is recorded.

When the position on the magnetic tape of the video tape cassette 1 set on the reproducing-side VCR 2 reaches the position at which the time code data Bp (V1) is recorded, as shown in FIG. 19I, the temporary recording medium 3 outputs the buffering data VBp. At that time, image data of the buffering data VBp and image data of the second cut V2 (CUT2) are supplied to the DME 5 and audio data of the buffering data ABp and audio data of the second cut V2 (CUT2) are supplied to the audio mixer 6, respectively.

Then, when the position on the magnetic tape of the video tape cassette 1 set on the reproducing-side VCR 2 reaches the position at which time code data Ei (V1/V2) is recorded, data are processed in special effect by the DME 5 and the audio mixer 6, respectively. Study of FIG. 19J which shows the output Ep from the DME 5 reveals that data are processed in special effect by a period indicated by the effect time data EF1.

When the position on the magnetic tape of the video tape cassette 1 set on the reproducing-side VCR 2 reaches the position at which the time code data Ei (V1/V2) is recorded, the recording-side VCR 8 is placed in the recording mode. Thus, the outputs Ep and Mp from the DME 5 and the audio mixer 6 start being recorded on the magnetic tape of the video tape cassette 9 set on the recording-side VCR 8 when the position on the magnetic tape of the video tape cassette 1 set on the reproducing-side VCR 2 reaches the position at which the time code data Ei (V1/V2) is recorded.

As shown in FIG. 19K, the recording-side VCR 8 is kept in the reproducing mode by a duration of time ranging from the magnetic tape of the video tape cassette 9 set thereon at its position at which the time code data Rs (V2) of the reproducing start point is recorded to the pre-roll time PR and set to the recording mode from the position at which the time code data Ri (V2) of the recording start point is recorded. Therefore, as shown in FIG. 19L, the first cut V1 (CUT1) is initially recorded on the magnetic tape (recording-side tape) of the video tape cassette 9 and then the second cut V2 (CUT2) is recorded on that magnetic tape while the portion of the effect time data EF1 of the starting portion is processed in special effect together with the buffering data vBp, ABp of the first cut V1 (CUT1).

To make the edited recorded material tape by using the two cuts according to the editing system shown in FIG. 3 will be described with reference to FIG. 20A through 20L. The example shown in FIGS. 20A through 20L shows the case that the buffering start point and the buffering end point are set in a manual fashion. In FIGS. 20A through 20L, fundamental operation becomes similar to that of FIGS. 19A through 19L and therefore only different operations will be described in detail. In FIGS. 20A through 20L, audio data is not shown but audio data is the same as the video data from a timing standpoint. Therefore, audio data will be described briefly.

FIG. 20A shows the state on the magnetic tape (reproducing-side tape) of the video tape cassette 1. FIG. 20B shows the state on the magnetic tape (recording-side tape) of the video tape cassette 9. As shown in FIG. 20C, recorded data is sequentially reproduced from the magnetic tape of the video tape cassette 1 set on the reproducing-side VCR 2 at its position in which the time code data Ps (V1) is recorded. On the other hand, recorded data is sequentially reproduced from the magnetic tape of the video tape cassette 9 set on the recording-side VCR 8 at its position in which the time code data Rs (V1) is recorded.

When the position on the magnetic tape 1 set on the reproducing-side VCR 2 reaches the position at which the time code data Pi (V1) is recorded, the recording-side VCR 8 is placed in the recording mode, whereby image data indicative of the first cut V1 (CUT1) supplied from the reproducing-side VCR 2 is sequentially recorded on the magnetic tape of the video tape cassette 9 of the recording-side VCR 8 from the position at which the time code data Ri (V1) of the recording start point is recorded.

As shown in FIG. 20E, when the position on the magnetic tape of the video tape cassette 1 set on the reproducing-side VCR 2 reaches the position at which the time code data Bi of the buffering start point is recorded, image data indicative of the first cut V1 (CUT1) supplied from the reproducing-side VCR 2 is sequentially recorded on the temporary recording medium 3 as the buffering data VBr, ABr. This recording time become buffering time data BU' in which the buffering start point and the buffering end point are set in a manual fashion.

Noticeably, unlike the case that the buffering time data BU is used as the default value, the buffering end point is set in front of the cut end point of the first cut V1 (CUT1).

To record image data indicating the second cut V2 (CUT2) on the magnetic tape of the video tape cassette 9 set on the recording-side VCR 8 after image data indicative of the second cut V2 (CUT2) and the buffering data VBp had been processed in special effect will be described with reference to FIGS. 20F through 20L.

As shown in FIG. 20F, the position on the magnetic tape (reproducing-side tape) of the video tape cassette 1 is agreed with the position at which the time code data Ps (V2) of the reproducing start point is recorded. On the other hand, as shown in FIG. 20G, the position on the magnetic tape (recording-side tape) of the video tape cassette 9 is agreed with the position at which the time code data Rs of the reproducing start point is recorded. As shown in FIG. 20G, the position of the cut start point of the second cut V2 (CUT2) is advanced by the advanced amount of the period from the buffering start point to the buffering end point in the first cut V1 (CUT1) with reference to the first cut V1 (CUT1) unlike the example shown in FIGS. 19A through 19L.

FIG. 20H shows an output from the reproducing-side VCR 2 and FIG. 20K shows an output from the recording-side VCR 8. As shown in FIG. 20I, when the time code data from the reproducing-side VCR 2 becomes the time code data Bp (V1) of the reproducing start point of the buffering data, the temporary recording medium 3 outputs the buffering data VBp, ABp.

When the position on the magnetic tape of the video tape cassette 1 set on the reproducing-side VCR 2 reaches the position at which the time code data Ei (V1/V2) is recorded, data are processed in special effect by the DME 5 and the audio mixer 6. Study of FIG. 20J which shows the output Ep of the DME 5 reveals that data are processed in special effect by the period shown by the effect time data EF1. As shown in FIG. 20J, unlike the example shown in FIGS. 19A through 19L, the position of the effect start point is advanced from the position of the first cut V1 (CUT1) by the advanced amount of the period ranging from the buffering start point to the buffering end point.

Further, when the time code data Ptc from the reproducing-side VCR 2 is agreed with the time code data Ei (V1/V2), the outputs Ep and Mp from the DME 5 and the audio mixer 6 start being recorded on the magnetic tape of the video tape cassette 9 set on the recording-side VCR 8. FIG. 20K shows the state of the recording-side VCR 8.

Therefore, as shown in FIG. 20L, the image data indicative of the first cut V1 (CUT1) is initially recorded on the magnetic tape (recording-side tape) of the video tape cassette 9. Then, the image data indicative of the second cut V2 (CUT2) is recorded on that magnetic tape while the portion of the effect time data EF1 of the starting portion is processed in special effect together with the buffering data VBp of the first cut V1 (CUT1).

Having compared with the example shown in FIGS. 19A through 19L, according to the example shown in FIGS. 20A through 20L, the first cut V1 (CUT1) is reduced more and then edited.

Effects achieved by the first embodiment of the present invention will be described below.

As described above, according to this embodiment, image data of the cut reproduced by the reproducing-side VCR 2 is recorded on the magnetic tape of the video tape cassette 9 set on the recording-side VCR 8. Video and audio data of the buffering period BU are recorded on the temporary recording medium 3 from the above-mentioned cut as the buffering data VBr and ABr. Then, when image data of the next cut is recorded on the magnetic tape of the video cassette tape 9 set on the recording-side VCR 8, the buffering data VBr and ABr stored in the temporary recording medium 3 are reproduced as the buffering data VBp and ABp. The buffering data VBp and ABp thus reproduced are processed in special effect by the DME 5 and the audio mixer 6 during the period of the effect time data EF1 together with video and audio data of the next cut and then the next cut is recorded.

Therefore, when the A-B roll editing, for example, is carried out, the B roll need not be made and it is sufficient to provide the single reproducing VCR. Further, the arrangement of the editing apparatus or system can be simplified and the editing work also can be simplified. Thus, it is possible to considerably improve efficiency for editing. Moreover, since it is sufficient to provide the single reproducing-side VCR, it is possible to form the editing apparatus integrally with the VCR (e.g., VCR with editing function or editing machine with recording function) with ease.

Further, since the buffering start point and the buffering end point, the effect start point and the effect end point can be determined manually or automatically and the effect processing can be executed automatically or manually, it is possible to provide an editing circumstance conforming to the operator's purpose and convenience.

When the above-mentioned settings are carried out automatically, for example, since the buffering end point is set to the starting portion of the second cut V2 (CUT2), after the first cut V1 (CUT1) and the second cut V2 (CUT2) had been set, the lengths of the first cut V1 (CUT1) and the second cut V2 (CUT2) cannot be varied. When on the other hand the above-mentioned settings are carried out manually, the buffering start point, the buffering end point and the effect start point and the effect end point can be set freely.

Therefore, even after the lengths of the first cut V1 (CUT1) and the second cut V2 (CUT2) had been determined, if the position of the buffering end point is advanced from the position of the first cut V1 (CUT1), then there can be achieved the great effect that the length of the first cut V1 (CUT1) can be reduced.

In the first embodiment of the present invention, the reproducing-side VCR 2 and the recording-side VCR 8 are not limited to the analog VCR and the digital VCR. In the case of the digital VCR, the format thereof is not limited to a digital VCR capable of recording a component digital video signal, a digital VCR capable of recording a composite digital video signal and a digital VCR capable of recording a component or composite digital video signal using compressing and coding.

FIG. 21 is a block diagram showing an arrangement of an editing system which will be described below as a practical example of the editing system shown in FIG. 3.

As shown in FIG. 21, a reproducing-side VCR 20 includes a tape transport portion, a video signal processing system and a servo system. A reproduced video signal, which is a reproduced output from the reproducing-side VCR 20, is supplied to an analog-to-digital (A/D) converter 21, in which it is converted to a digital video signal and supplied to a special effect processing unit 23. The special effect processing unit 23 creates special effect, such as "mix", "wipe" and "dissolve" on the digital video signal from the A/D converter 21 and a digital video signal from the temporary recording medium 28, which will be described later on, on the basis of a video special effect control signal supplied thereto from a control unit 39 and supplies the digital video signal thus processed in special effect to a recording-side VCR 25.

A reproduced audio signal from the reproducing-side VCR 20 is supplied to and converted by an A/D converter 22 to a digital audio signal and supplied to an audio mixer 24. The audio mixer 24 processes the digital audio signal from the A/D converter 22 and a digital audio signal from the temporary recording medium 28 (will be referred to later on) in such an audio signal processing fashion, such as "equalizing", "panning", "mix", "boost", "delay" and "reverberation" on the basis an audio mixer control signal supplied thereto from the control unit 39. Then, the audio mixer 24 supplies the digital audio signal thus processed to the recording-side VCR 25. The above-mentioned effect processing can be similarly carried out when an effector apparatus incorporated within the editing system or an effector apparatus connected to a send/return terminal is used.

The recording-side VCR 25 includes an input terminal 25a to receive the digital video signal from the special effect processing unit 23, an input terminal 25b to receive the digital audio signal from the audio mixer 24, an output terminal 25c to output a reproduced video signal, an output terminal 25d to output a reproduced audio signal and an input and output terminal 25e to interchange a control signal between it and a control unit 41.

The output terminal 25c for outputting the reproduced video signal is connected to the other fixed contact 26b of a switch 26 and one fixed contact 26a of the switch 26 is connected to a junction between the input terminal 25a of the recording-side VCR 25 and an output terminal of the special effect processing unit 23. A movable contact 26c of the switch 26 is connected to an input terminal of the temporary recording medium 28.

The output terminal 25d of the recording-side VCR 25 to output the reproduced audio signal is connected to the other fixed contact 27b of a switch 27 and one fixed contact 27a of the switch 27 is connected to a junction between the input terminal 25b of the recording-side VCR 25 and the output terminal of the audio mixer 24. A movable contact 27c of the switch 27 is connected to the input terminal of the temporary recording medium 28. The two switches 26 and 27 are changed-over under the control of control signals supplied thereto from the control unit 39.

The temporary recording medium 28 is composed of a hard disk (including a fixed type hard disk and a removable type hard disk), an optical disk serving as a write once optical disk and a phase change media, a magneto-optical disk or a flexible disk with a storage capacity of at least 20 megabytes or greater and a driver for driving these disks similarly to FIG. 3. Data can be written in and read out from the temporary recording medium 28 under the control of the control signal supplied from the control unit 39.

Output terminals of the temporary recording medium 28 to output the video signal are connected to an input terminal of the special effect processing unit 23, one fixed contact 29a of the switch 29 and an input terminal of a digital-to-analog (D/A) converter 35, respectively. The other fixed contact 29b of the switch 29 is connected to a junction between the output terminal of the special effect processing unit 23 and the input terminal 25a of the recording-side VCR 25. The movable contact 29c of the switch 29 is connected through the D/A converter 30 to an input terminal of a television monitor 31.

Output terminals of the temporary recording medium 28 to output the audio signal are connected to the input terminal of the audio mixer 24, one fixed contact 32a of a switch 32 and an input terminal of a D/A converter 37, respectively. The other fixed contact 32b of the switch 32 is connected to a junction between the output terminal of the audio mixer 24 and the input terminal 25b of the recording-side VCR 25. A movable contact 32c of the switch 32 is connected to an input terminal of a speaker 34 which houses an amplifier.

The control unit 39 supplies a variety of control signals to the above-mentioned respective portions based on commands (or EDL data) entered and supplied thereto by the operator through an operation unit 40. The operation unit 40 includes a display portion (not shown) for displaying time code data from the reproducing-side VCR 20 and the recording-side VCR 25, various operation keys (play key, pause key, rewind key, fast forward key, review key and cue key), a jog dial, an annular-shaped shuttle key, a fader 40 for executing special effect processing, such as "wipe" or the like and various keys (not shown) for the audio mixer 24 to effect the audio processing.

Operation of the editing system shown in FIG. 21 will be described below.

As shown in FIG. 21, when the operator operates the operation unit 40 to issue a command for setting the reproducing-side VCR 20 in the reproducing mode, the control unit 39 supplies a control signal to the reproducing-side VCR 20 to set the reproducing-side VCR 20 in the reproducing mode. Also, the control unit 39 supplies control signals to the switches 29 and 32 such that the switches 29 and 32 connect the movable contacts 29c and 32c to the fixed contacts 29a and 32a.

The reproducing-side VCR 20 that had been placed in the reproducing mode derives reproduced video and audio signals. The reproduced video signal is converted by the A/D converter 21 to the digital video signal and supplied to the special effect processing unit 23. At that time, the digital video signal is not processed in special effect by the special effect processing unit 23. The digital video signal from the special effect processing unit 23 is supplied through the switch 29 to the D/A converter 30, in which it is converted to the analog video signal and supplied to the television monitor 31, thereby being displayed on a picture screen of the television monitor 31 as a picture.

On the other hand, the reproduced audio signal from the reproducing-side VCR 20 is supplied to the A/D converter 22, in which it is converted to the digital audio signal and supplied to the audio mixer 24. At that time, the digital audio signal is not processed in audio effect by the audio mixer 24. The digital audio signal from the audio mixer 24 is supplied through the switch 32 to the D/A converter 33, in which it is converted to the analog audio signal and supplied to the speaker 34 with the amplifier incorporated, thereby emanated from the speaker 34 as sounds.

In this state, having monitored the picture displayed on the picture screen of the television monitor 31 and the sounds generated from the speaker 34, the operator determines an edit-in and an edit-out of one cut in a real time fashion and then depresses operation keys of the operation unit 40, whereby time code data of edit-in and edit-out of one cut are stored in a memory (not shown) of the control unit 39. The above-mentioned work is repeated and edit-in and edit-out of each cut are memorized in the memory of the control unit 39.

If the operator starts the editing operation by operating the operation unit 40, the control portion 39 supplies a control signal to the reproducing-side VCR 20 to set the reproducing-side VCR 20 in the reproducing mode. A reproduced video signal from the reproducing-side VCR 20 that had been set in the reproducing mode is supplied through the A/D converter 21 to the special effect processing unit 23 and further supplied through the input terminal 25a to the recording-side VCR 25. On the other hand, a reproduced audio signal from the reproducing-side VCR 20 is supplied to the A/D converter 22, in which it is converted to a digital audio signal and then supplied to the audio mixer 24. A digital signal from the audio mixer 24 is supplied through the input terminal 25b to the recording-side VCR 25.

The control unit 39 supplies switching control signals to the switches 26 and 27 so that the switches 26 and 27 connect the movable contacts 26c and 27c to the other fixed contacts 26b and 27b. The reason for this is that the reproduced video signal supplied through the input terminal 25a to the recording-side VCR 25 and the reproduced audio signal supplied through the input terminal 26 to the recording-side VCR 25 are supplied to and buffered to the temporary recording medium 28.

The digital video and audio signals that had been supplied to the recording-side VCR 25 are recorded on the magnetic tape of the video tape cassette (not shown) previously set on the recording-side VCR 25 so as to form slant tracks. The control unit 39 monitors the time code data from the reproducing-side VCR 20 or the recording-side VCR 25. Having detected the time code data of the buffering start point, the control unit 39 supplies the switching control signals to the switches 26 and 27 so that the switches 26 and 27 connect the movable contacts 26c and 27c to the fixed contacts 26a and 27a. Thus, of the digital video signals from the special effect processing unit 23, the digital video signal of the buffering start point or later is supplied through the switch 26 to the temporary recording medium 28. Similarly, of the digital audio signals from the audio mixer 24, the digital audio signal of the buffering start point or later is supplied through the switch 27 to the temporary recording medium 28.

At timing in which the control unit 39 supplies the switching control signals to the switches 26 and 27 so that the switches 26 and 27 connect the movable contacts 26c and 27c to the fixed contacts 26a and 27a, the control unit 39 supplies an address signal and a write control signal to the temporary recording medium 28 to record digital video and audio signals supplied thereto after that time point.

Having recognized that a time point reaches the edit-out of the first cut or that a time point passes the edit-out of the first cut by a predetermined period of time, the control unit 39 supplies the control signals to the reproducing-side VCR 20 and the recording-side VCR 25 to set the reproducing-side VCR 20 in the stop mode and to set the recording-side VCR 25 in the pause or stop mode. Then, the control unit 39 controls the reproducing-side VCR 20 to enable the reproducing-side VCR 20 find out the starting portion of the next cut. At that time, the starting position is not set at the edit-in of the next cut but is set at the position advanced from the edit-in by a predetermined time (pre-roll time).

The control unit 39 supplies the control signal to the recording-side VCR 25 to enable the recording-side VCR 25 to find out the starting portion of the cut. The position of the starting portion of the cut is advanced from the buffering start point of the first cut by a predetermined time.

Subsequently, the control unit 39 supplies the control signal to the reproducing-side VCR 20 to place the reproducing-side VCR 20 in the reproducing mode. Having monitored the time code data supplied thereto from the reproducing-side VCR 20 and recognized that the recorded signal on the temporary recording medium is ready for reproduction, the control unit 39 supplies the control signal to the temporary recording medium 28 to reproduce the recorded signal recorded on the temporary recording medium 28.

Then, the control unit 39 supplies the control signal to the recording-side VCR 25 at a time point just before the special effect starting point by a predetermined time to enable the recording-side VCR 25 to start recording from the special effect start point. Concurrently therewith, the control unit 39 supplies the video special effect control signal to the special effect processing unit 23 to enable the special effect processing unit 23 to perform the special effect processing. Also, the control unit 39 supplies the audio mixer control signal to the audio mixer 24 to enable the audio mixer 24 to carry out the audio processing.

Accordingly, the digital video signal from the temporary recording medium 28, the video signal which results from processing the digital video signal from the A/D converter 21 during the special effect period and the digital video signal of the next cut from the A/D converter 21 are supplied to the recording-side VCR 25. Simultaneously, the digital video signal from the temporary recording medium 28, the video signal which results from processing the digital audio signal from the A/D converter 22 during the audio signal processing period and the digital audio signal of the next cut (audio signal) from the A/D converter 22 are supplied to the recording-side VCR 25 and thereby recorded on the magnetic tape of the video tape cassette set on the recording-side VCR 25.

The recording-side VCR 25 can carry out not only the recording but also the playback. Therefore, if the video and audio signals recorded by the recording-side VCR 25 are reproduced, the reproduced video and audio signals are bypassed (passed) through the temporary recording medium 28 and supplied through the switches 29 and 32 to the D/A converters 30 and 33, the video and audio signals are converted to analog video and audio signals and then supplied to the television monitor 31 and the speaker 34 with the incorporated amplifier, then it is possible to use this editing system as a monitor.

FIG. 22 is a block diagram showing an example of the inside arrangement of the recording-side VCR 25 shown in FIG. 21.

In FIG. 22, elements and parts identical to those of FIG. 21 are marked with the same references and therefore need not be described in detail.

As shown in FIG. 22, there is provided a video recording processing circuit 50 which processes the digital video signal supplied thereto from the special effect processing unit 23 shown in FIG. 21 through the input terminal 25a so that the digital video signal can be recorded. The video recording processing circuit 50 shuffles and divides the incoming digital video signal so that the input video signal can be recorded on a plurality of tracks in a so-called multi-segment recording fashion. An output from the video recording processing circuit 50 is supplied to an error correcting code adding circuit 52. An audio recording processing circuit 51 is adapted to process the digital audio signal supplied thereto from the audio mixer 24 shown in FIG. 21 through the input terminal 25b for recording. The audio recording processing circuit 51 interleaves and divides the incoming digital audio signal so that the incoming digital audio signal can be recorded on a plurality of tracks in a multi-segment recording fashion.

The error correcting code adding circuit 52 adds inner codes (inner parity) and outer codes (outer parity) of the digital video signal supplied thereto from the video recording processing circuit 50 and the digital audio signal supplied thereto from the audio recording processing circuit 51 and outputs the processed digital video and audio signals in the form of product code. An output from the error correcting code adding circuit 52 is supplied to a channel coding circuit 53. The channel coding circuit 53 effects the digital modulation suitable for magnetic recording on the output from the error correcting code adding circuit 52 and supplies the modulated signal to be recorded through a recording amplifying circuit 54 to a tape transport portion (referred to hereinafter simply as "tape transport") 55.

The tape transport 55 is composed of a rotary transformer, a rotary drum having a plurality of recording heads and reproducing heads or recording/reproducing heads mounted thereon, a tape loading mechanism, a control system of a mechanical portion or the like, though not shown. A recorded signal from the recording amplifying circuit 54 is supplied through the rotary transformer of the tape transport 55 to the magnetic head and thereby recorded on the magnetic tape of the video tape cassette set on the recording-side VCR 25 so as to form slant tracks. In the case of the digital recording and reproducing format, the recorded signal is recorded on the magnetic tape according to a segment recording system in which a plurality of recording tracks constitute one frame (or one field).

Upon reproduction, the output from the rotary transformer of the tape transport 55 is supplied through a playback amplifying circuit 56 to a data extracting circuit 57. The data extracting circuit 57 reproduces a clock signal from the output of the playback amplifying circuit 56 and extracts data on the basis of the clock signal thus reproduced. The reproduced data thus extracted is supplied to a channel decoding circuit 58. The channel decoding circuit 58 decodes the reproduced signal supplied thereto from the data extracting circuit 57. The decoded signal from the channel decoder 58 is supplied to an error correcting circuit 59. The error correcting circuit 59 error-corrects the demodulated output supplied thereto from the channel decoding circuit 58 by the inner code and supplies an error flag to data that cannot be error-corrected. The error correcting circuit 59 further error-corrects data by the outer code and error-conceals data that cannot be error-corrected. As the error-concealing method, there can be employed some suitable methods, such as a method for interpolating an error by using neighboring data, a method of concealing an error by a mean value of neighboring data and a method of replacing an error with previous data.

The video signal from the error correcting circuit 59 is supplied to a video reproducing processing circuit 60 and the audio signal therefrom is supplied to an audio reproducing processing circuit 61, respectively. The video reproducing processing circuit 60 obtains the original video signal by de-shuffling the video signal supplied thereto from the error correcting circuit 59 and rearranging video data that had been divided so as to be recorded on a plurality of tracks in a multi-segment recording fashion. The audio reproducing processing circuit 61 obtains the original audio signal by deinterleaving the audio data supplied thereto from the error correcting circuit 59 and the audio data that had been divided so as to be recorded on a plurality of tracks in a multi-segment recording fashion.

The reproduced video signal from the video reproducing processing circuit 60 is supplied through the output terminal 25c to the other fixed contact 26b of the switch 26 shown in FIG. 21. The reproduced audio signal from the audio reproducing processing circuit 61 is supplied through the output terminal 25d to the other fixed contact 27b of the switch 27 shown in FIG. 21. The respective portions shown in FIG. 22 are operated under the control of control signals supplied from the control unit 39 through the input terminal 25e.

As described above, according to this practical example, the reproduced video signal of the first cut from the reproducing-side VCR 20 is converted by the A/D converter 21 to the digital video signal. This digital video signal is not processed by the special effect processing unit 23 and recorded on the magnetic tape of the video tape cassette set on the recording-side VCR 25. Simultaneously, the reproduced audio signal of the first cut from the reproducing-side VCR 20 is converted by the A/D converter 22 to the digital audio signal. This digital audio signal is not processed by the audio mixer 24 and recorded on the magnetic tape of the video tape cassette set on the recording-side VCR 25. At that time, a part of the video and audio signals of the first cut that had been determined automatically or designated by the operator, in particular, the portions corresponding to the special effect period or the audio processing period and the nearby portions are recorded on the temporary recording medium 28. The reproduced video signal of the second cut is converted by the A/D converter 21 to the digital video signal. This digital video signal and the digital video signal of a part of the first cut read out from the temporary recording medium 28 are processed in special effect by the special effect processing unit 23 and recorded on the magnetic tape of the video tape cassette set on the recording-side VCR 25. Also, the reproduced audio signal of the second cut from the reproducing-side VCR 20 is converted by the A/D converter 22 to the digital audio signal. This digital audio signal and the digital video signal of a part of the first cut read out from the temporary recording medium 28 are processed in audio effect by the audio mixer 24 and recorded on the magnetic tape of the video tape cassette set on the recording-side VCR 25. At that time, a part of the video and audio signals of the second cut that had been determined automatically under the control of the control unit 39 of designated by the operator, in particular, the portions corresponding to the special effect period and the audio process period and the nearby portions are recorded on the temporary recording medium 28.

Therefore, when the reproducing recorded materials are required in parallel to each other as in the A-B roll editing, for example, it is sufficient to prepare only one reproducing-side VCR 20. Thus, the scale of the system or apparatus can be reduced. Further, if the range of data to be recorded on the temporary recording medium 28 can be set automatically or manually, the video and audio signals are automatically recorded on the temporary recording medium 28 and the above range is automatically or previously designated during the special effect period and the audio processing period, then the video signal that had automatically been read out from the temporary recording medium 28 and the reproduced video signal that had been read out from the reproducing-side VCR 20 can be processed in special effect. Similarly, the audio signal that had automatically been read out from the temporary recording medium 28 and the reproduced audio signal that had been read out from the reproducing-side VCR 20 can be processed in audio effect. Therefore, it is possible to provide comfortable and satisfactory editing circumstances to the operator. Also, in the case of the A-B roll editing, for example, the B roll need not be copied and efficiency in editing can be improved considerably.

Furthermore, as shown in FIGS. 21 and 22, since the editing can be carried out with minimum elements and parts, it is possible to realize an integrated type editing machine. In this case, the video tape cassette insertion mouth of the reproducing-side VCR 20 and the video tape cassette insertion mouth of the recording-side VCR 25 should preferably be disposed at the front wall portion (front panel) of the housing of the editing machine. Unless the temporary recording medium 28 is the fixed type, a media insertion mouth, the operation unit and the display portion (not shown) should preferably be disposed at the front panel of the housing of the editing machine. Terminals and so on should preferably be disposed at the rear portion (rear panel) of the housing of the editing machine. If the editing machine is formed as the integrated type editing machine as described above, then it is possible to remove complex and cumbersome work, such as confirming the connected states of various units, such as VCRs, editing controller and disk drive, after these devices had been connected via specialized cables.

While the buffering period and the special effect processing start point etc., are automatically be set when the edit-in and the edit-out of the cut are designated and the user designates the buffering period manually as described above, the present invention is not limited thereto and the buffering period and the special effect period or the like can be set when the edit-in of the cut and edit-in of the next cut are designated and the edit-out of the cut and edit-out of the next cut are designated.

Furthermore, the EDL (edit decision list) data recorded on the flexible disk may be read out and editing may automatically be carried out by using cut information, special effect information, special effect period information, buffering information or the like of the EDL data thus read out.

An arrangement of an editing system using a compressing and coding will be described below as another practical example of the editing apparatus shown in FIG. 3 with reference to FIGS. 23 and 24.

Figure 23:
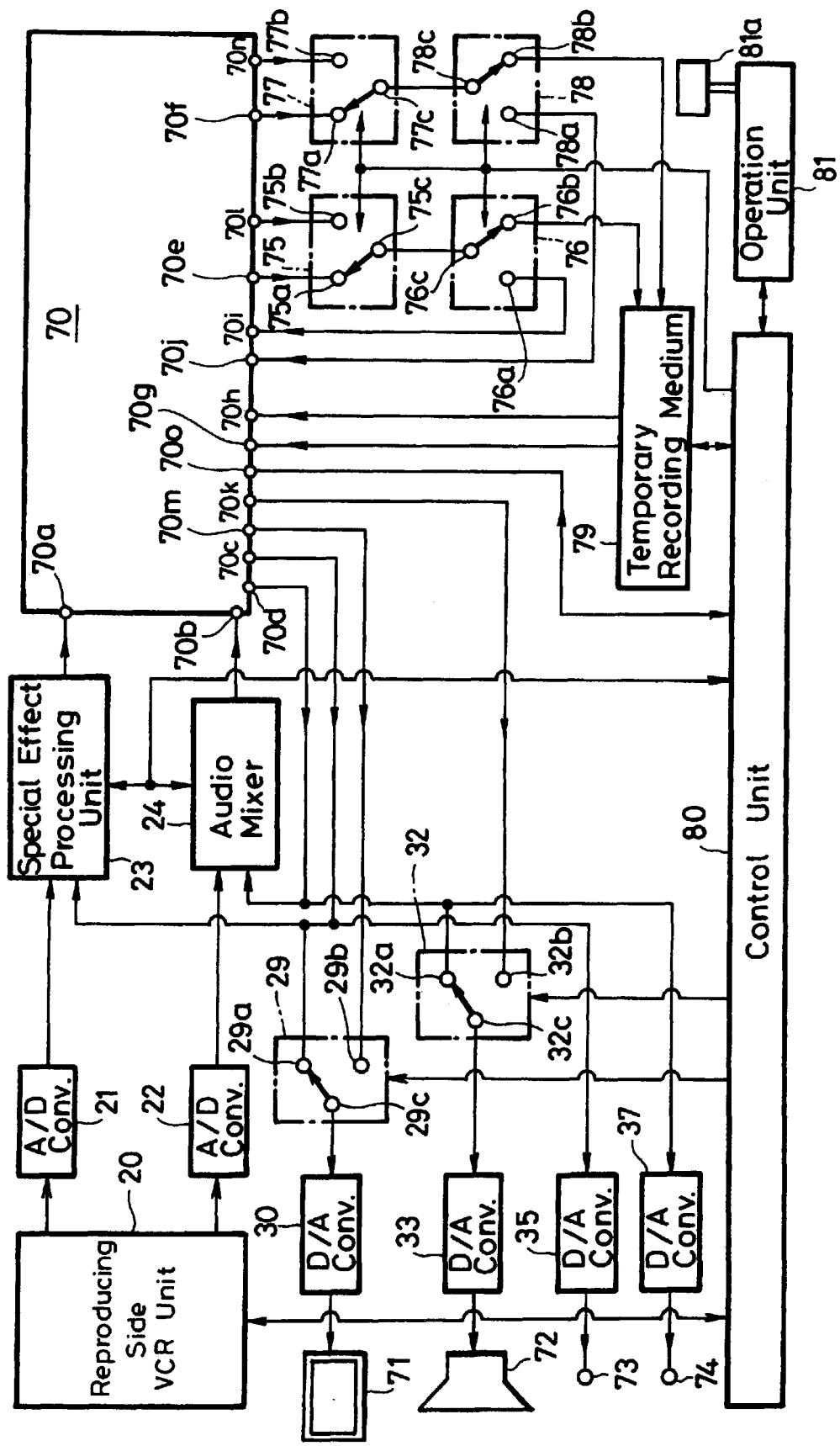
FIG. 23 is a block diagram showing another practical example of the editing system shown in FIG. 3.

FIG. 23 is a block diagram showing an example of an arrangement of an editing system using a compressing and coding. In FIG. 23, like parts corresponding to those of FIG. 21 are marked with the same references and therefore need not be described in detail.

As shown in FIG. 23, a control unit 80 is adapted to control the reproducing-side VCR 20, the A/D converters 21, 22, the special effect processing unit 23, a recording-side VCR 70 which will be described later on and a temporary recording medium 79 which will be described later on on the basis of operation of an operation unit 81 and the EDL data. The recording-side VCR 70 records a video signal supplied thereto from the special effect processing unit 23 through an input terminal 70*a* and an audio signal supplied thereto from the audio mixer 24 through an input terminal 70*b* on a magnetic tape of a video tape cassette set thereon so as to form slant tracks.

An example of the inside arrangement of the recording-side VCR 70 shown in FIG. 23 will be described below with reference to FIG. 24. In FIG. 24, like parts corresponding to those of FIG. 23 are marked with the same references and therefore need not described in detail.

As shown in FIG. 24, the video signal from the video effect processing unit 23 shown in FIG. 23 is supplied to the input terminal 70*a*. The audio signal from the audio mixer 24 shown in FIG. 23 is supplied to the input terminal 70*b*. The input terminal of the special effect processing unit 23, one fixed contact 29*a* of the switch 298 and the input terminal of the D/A converter 35 are connected to an output terminal 70*c*. The input terminal of the audio mixer 24, one fixed contact 32*a* of the switch 32 and the input terminal of the D/A converter 37 are connected to an output terminal 70*d*.

The video signal from the special effect processing unit 23 shown in FIG. 23 is supplied through the input terminal 70*a* to a video recording processing circuit 90. The video recording processing circuit 90 shuffles and divides an input video signal so that the video signal can be recorded on a plurality of tracks in a multi-segment recording fashion. An output of the video recording processing circuit 90 is supplied to a compressing and coding circuit 91. The compressing and coding circuit 91 compresses and codes the video signal supplied thereto from the video recording processing circuit 90. As the compressing and coding, there can be used a variable length coding, such as DCT (discrete cosine transform), ADRC (adaptive dynamic range coding), wavelet transform, Huffman coding and run length coding and quantization processing. An output from the compressing and coding circuit 91 is supplied to an error correcting circuit 92.

On the other hand, the audio signal from the audio mixer 23 shown in FIG. 23 is supplied through the input terminal 70*b* to an audio recording processing circuit 93. The audio recording processing circuit 93 interleaves and divided an input audio signal so that the input audio signal can be recorded on a plurality of tracks in a multi-segment recording fashion. An output of the audio recording processing circuit 93 is supplied to a compressing and coding circuit 94. The compressing and coding circuit 94 compresses and codes the audio signal supplied thereto from the audio recording processing circuit 93. As the compressing and coding, there can be used the variable length coding, such as DCT, ADRC, Huffman coding and run length coding or quantization processing considering that data indicative of sounds which man cannot listen to can be removed so long as a delay time in the processing is not considered to be important unlike the case that audio data is transmitted through telephone network line or ISDN network line.

An error correcting code adding circuit 92 adds the inner code and the outer code to the compressed video signal supplied thereto from the compressing and coding circuit 91 and the compressed audio signal supplied thereto from the compressing and coding circuit 94 and converts the compressed video and audio signal to data of so-called product code form. The error correcting code adding circuit 92 adds the inner code and the outer code to ID (identification) data supplied thereto from an ID generator (not shown). An output from the error correcting code adding circuit 92 is supplied to a channel coding circuit 95.

The channel coding circuit 95 effects digital modulation on the data of the product code form supplied thereto from the error correcting code adding circuit 92. An output from the channel coding circuit 95 is supplied through a recording amplifying circuit 96 to a tape transport portion (hereinafter simply referred to as "tape transport") 97 and thereby recorded on a magnetic tape of a video tape cassette set on the tape transport 97 so as to form slant tracks.

The tape transport 97 is composed of a rotary transformer, a rotary drum assembly (including a motor) having a plurality of recording heads and reproducing heads or a plurality of recording/reproducing heads mounted thereon, a tape loading mechanism (including a motor) and a driver system (including a servo system) for driving these mechanical portions, though not shown.

Upon recording, a reproduced signal reproduced from the magnetic tape of the video tape cassette set on the tape transport 97 is supplied through a playback amplifying circuit 98 to a data extracting circuit 99. The data extracting circuit 99 extracts a clock signal from the reproduced signal supplied thereto from the playback amplifying circuit 98 and extracts the digitally modulated data of the product code form on the basis of the extracted clock signal. The data of the product code form that had been extracted by the data extracting circuit 99 is supplied to a channel decoding circuit 100.

The channel decoding circuit 100 decodes the digitally modulated data supplied thereto from the data extracting circuit 99 to provide data of the original product code form. An output from the channel decoding circuit 100 is supplied to an error correction processing circuit 101. Initially, the error correction processing circuit 101 error-corrects the video and audio data of the product code form supplied thereto from the channel decoding circuit 100 and the ID data supplied thereto from the ID generator (not shown) by using the inner code and adds an error flag to data that cannot be error-corrected. Subsequently, the error correction processing circuit 101 error-corrects the video and audio data and the ID data by using the outer code and conceals an error if uncorrectable data takes place. As earlier noted with reference to FIG. 22, the error concealment should preferably be carried out by using the method of interpolating an error by neighboring data or the method of replacing an error with previous data.

The video signal from the error correction processing circuit 101 is supplied through an output terminal 70*l* to the other fixed contact 75*b* of the switch 75 shown in FIG. 23. The audio signal therefrom is supplied through an output terminal 70*n* to the other fixed contact 77*b* of the switch 77 shown in FIG. 23.

Four switches 75, 76, 77 and 78 shown in FIG. 23 will be described below. As shown in FIG. 24, one fixed contact 75*a* of the switch 75 is connected to an output terminal 70*e* of the recording-side VCR 70. The output terminal 70*e* is connected to a junction between the output terminal of the compressing and coding circuit 91 and the input terminal of the error correcting code adding circuit 92. One fixed contact 77*a* of the switch 77 is connected to an output terminal 70*f* of the recording-side VCR 70. The output terminal 70*f* is connected to a junction between the output terminal of the compressing and coding circuit 94 and the input terminal of the error correcting code adding circuit 92.

A movable contact 75*c* of the switch 75 is connected to a movable contact 76*c* of the switch 76. One fixed contact 76*a* of the switch 76 is connected to an input terminal 70*i* of the recording-side VCR 70. The other fixed contact 76*b* of the switch 76 is connected to the video signal input input terminal of the temporary recording medium 79. A movable contact 77*c* of the switch 77 is connected to a movable contact 78*c* of the switch 78. One fixed contact 77*a* of the switch 77 is connected to the input terminal 70*i* of the recording-side VCR 70. The other fixed contact 77*b* of the switch 77 is connected to an audio signal input input terminal of the temporary recording medium 79.

These switches 75, 76, 77 and 78 are changed-over under the control of switching control signals output from the control unit 80 operated when the operator operates the operation unit 81 or the EDL data is supplied thereto. To switch the switches 75, 76, 77 and 78, the movable contact 75*c* of the switch 75 and the movable contact 77*c* of the switch 77 have to be operated in unison with each other and the movable contact 76*c* of the switch 76 and the movable contact 78*c* of the switch 78 have to be operated in unison with each other.

To understand the present invention more clearly, to change the signal transmission line by the switching control will be hereinafter referred to as "mode". In the first mode, the switches 75, 76, 77, 78 connect the movable contacts 75*c*, 76*c*, 77*c*, 78*c* to the fixed contacts 75*a*, 76*a*, 77*a*, 78*a*, respectively.

In the first mode, the compressed video signal from the compressing and coding circuit 91 is output from the output terminal 70*e*. The compressed video signal is then supplied through the input terminal 70*i* of the recording-side VCR 70 to the compressing and decoding circuit 102. The compressed audio signal from the compressing and coding circuit 94 is output from the output terminal 70*f* and the compressed video signal is supplied through the switches 77, 78 and the input terminal 70*j* of the recording-side VCR 70 to the compressing and decoding circuit 104. In other words, in the first mode, the video and audio signals input to the recording-side VCR 70 are output bypassing the temporary recording medium 79.

At that time, the switches 29 and 32 connect the movable contacts 29*c* and 32*c* to the fixed contacts 29*a* and 32*a*. Therefore, the operator can monitor the video signal input to the recording-side VCR 70 by a television monitor 71 connected to the output terminal of the D/A converter 30 and monitor the audio signal input to the recording-side VCR 70 by a speaker 72 with an amplifier incorporated connected to the output terminal of the D/A converter 33.

In the second mode, the switches 75 and 77, 76 and 78 connect the movable contacts 75*c* and 77*c*, 76*c* and 78*c* to the fixed contacts 75*a* and 77*a*, the other fixed contacts 76*b* and 78*b*, respectively. In the second mode, the compressed video signal from the compressing and coding circuit 91 is output from the output terminal 70*e*. The compressed video signal is supplied through the switches 75 and 76 to the temporary recording medium 79. The compressed audio signal from the compressing and coding circuit 94 is output from the output terminal 70*f* and the compressed video signal is supplied through the switches 77 and 78 to the temporary recording medium 79. In other words, according to the second mode, the compressed video and audio signals that had been input to and compressed by the recording-side VCR 70 are supplied to and recorded on the temporary recording medium 79.

In the third mode, the switches 75 and 77, 76 and 78 connect the movable contacts 75c and 77c, 76c and 78c to the other fixed contacts 75b and 77b, 76a and 78a. According to the third mode, the error-corrected video signal (compressed video signal) from the error correction processing circuit 101 is output from the output terminal 70l. This compressed video signal is supplied through the input terminal 70i of the recording-side VCR 70 to the compressing and decoding circuit 102 of the recording-side VCR 70. The error-corrected audio signal (compressed audio signal) from the error correction processing circuit 101 is output from the output terminal 70n. This compressed audio signal is supplied through the switches 77 and 78 and the input terminal 70j of the recording-side VCR 70 to the compressing and decoding circuit 104 of the recording-side VCR 70. In other words, according to the third mode, the video and audio signals that had been reproduced and error-corrected by the recording-side VCR 70 are output bypassing the temporary recording medium 79.

At that very time, under the control of the control unit 80, the switches 29 and 32 connect the movable contacts 29c and 32c to the fixed contacts 29a and 32a. Therefore, in this case, the operator can monitor the video signal input to the recording-side VCR 70 by the television monitor 71 and monitor the audio signal input to the recording-side VCR 70 by the speaker 72 incorporating the amplifier.

In the fourth mode, the switches 75, 76, 77, 78 connect the movable contacts 75c, 76c, 77c, 78c to the other fixed contacts 75b, 76b, 77b, 78b, respectively. According to the fourth mode, the compressed video signal from the error correction processing circuit 101 in the recording-side VCR 70 is output from the output terminal 70l. This compressed video signal is supplied through the switches 75 and 76 to the temporary recording medium 79. The compressed audio signal from the error correction processing circuit 101 in the recording-side VCR 70 is output from the output terminal 70n. This compressed audio signal is supplied through the switches 77 and 78 to the temporary recording medium 79. In other words, according to the fourth mode, the video and audio signals (compressed video and audio signals) that had been reproduced and error-corrected by the recording-side VCR 70 are supplied to and recorded on the temporary recording medium 79.

The compressing and decoding circuit 102 decodes the compressed video signal (reproduced compressed video signal or input compressed video signal) supplied thereto from the temporary recording medium 79 through the input terminal 70g or the compressed video signal supplied thereto from the compressing and coding circuit 91 or the error correction processing circuit 101 through the input terminal 70i. Specifically, if the video signal is processed by DCT, quantization and variable length coding such as run length coding and Huffman coding when the video signal is compressed, then the compressed video signal is decoded, processed in an inverse quantization fashion and in an IDCT (inverse discrete cosine transform) fashion. An output from the compressing and decoding circuit 102 is supplied to the video reproducing circuit 103. The video reproducing circuit 103 digitally demodulates the video signal from the compressing and decoding circuit 102 by channel decoding and de-shuffles the digitally demodulated video signal. Then, the video data thus de-shuffled is output from the output terminal 70c.

On the other hand, the compressing and decoding circuit 104 decodes the compressed audio signal (reproduced compressed audio signal or input compressed audio signal) supplied thereto from the temporary recording medium 79 through the input terminal 70h or the compressed audio signal supplied thereto from the compressing and coding circuit 94 or the error correction processing circuit 101 through the input terminal 70j. Specifically, if the audio signal is processed by DCT, quantization and variable length coding such as run length coding and Huffman coding when the video signal is compressed, then the compressed audio signal is decoded, processed in an inverse quantization fashion and in an IDCT fashion. An output from the compressing and decoding circuit 104 is supplied to the audio reproducing circuit 105. The audio reproducing processing circuit 105 digitally demodulate the audio signal supplied thereto from the compressing and decoding circuit 104 by channel decoding and de-shuffles the digitally demodulated audio signal. Then, the audio signal thus de-shuffled is output from the output terminal 70d.

As described above, according to the practical example, the reproduced video signal of the first cut from the reproducing-side VCR 20 is converted by the A/D converter 21 to the digital video signal. This digital video signal is not processed in special effect by the special effect processing unit 23 but compressed and recorded on the magnetic tape of the video tape cassette set on the recording-side VCR 25. Simultaneously, the reproduced audio signal of the first cut from the reproducing-side VCR 20 is converted by the A/D converter 22 to the digital audio signal. This digital audio signal is not processed by the audio mixer but is compressed and recorded on the magnetic tape of the video tape cassette set on the recording-side VCR 25. At that time, a part of the video and audio signals of the cut that had been automatically determined by the control unit 80 or designated by the operator, in particular, the image data of the special effect period and the audio processing period corresponding portion and nearby image data are compressed and recorded on the temporary recording medium 79. The second reproduced video signal of the second cut is converted by the A/D converter 21 to the digital video signal. This digital video signal and the digital video signal of a part of image data of the first cut read out from the temporary recording medium 79 are decoded by the compressing and decoding circuit 102. Then, the digital video signal thus decoded is processed in special effect by the special effect processing unit 23 and compressed and recorded on the magnetic tape of the video tape cassette set on the recording-side VCR 25. Simultaneously, the reproduced audio signal of the image data of the second cut from the reproducing-sid VCR 20 is converted by the A/D converter 22 to the digital audio signal. This digital audio signal and the digital audio signal of a part of image data of the first cut read out from the temporary recording medium are compressed by the compressing and decoding circuit 104. Then, the digital audio signal thus decoded by the compressing and decoding circuit 104 is processed by the audio mixer 24 and compressed and recorded on the magnetic tape of the video tape cassette set on the recording-side VCR 70. At that time, a part of the video and audio signals of the second cut that had been automatically determined by the control unit 80 or designated by the operator, in particular, the image data of the special effect period, the image data of the audio processing period and neighboring image data are compressed and coded by the compressing and coding circuits 91 and 94. Then, the video and audio signals thus compressed and coded are recorded on the temporary recording medium 79.

Therefore, even when the recorded material tapes to be reproduced are needed side by side as in the A roll and B roll, for example, it is sufficient to prepare the single reproducing-side VCR 20. Thus, the scale of the editing system or the editing apparatus can be minimized. Further, the range in which data is recorded can be set automatically or manually. Thereafter, the video and audio signals can automatically be recorded on the temporary recording medium 79. If cuts are automatically determined or set manually during the special effect period and the audio processing period, then the video signal automatically read out from the temporary recording medium 28 and the reproduced video signal read out from the reproducing-side VCR 20 can be processed in special effect. Similarly, the audio signal read out from the temporary recording medium 28 and the reproduced audio signal read out from the reproducing-side VCR 20 can be processed in audio effect. Therefore, it is possible to provide comfortable and convenient circumstances for editing to the operator. Moreover, it is possible to remove a cumbersome work for copying the B roll in the case of A-B roll editing. Thus, it is possible to considerably improve an efficiency for editing.

Furthermore, when the video and audio signals are recorded on the temporary recording medium 79, the video and audio signals are compressed and coded by the compressing and coding circuits 91 and 94. Also, when the edited video and audio signals are recorded on the recording-side VCR 70, the video and audio signals can be compressed and recorded by the compressing and coding circuits 91 and 94. Therefore, the storage capacity of the temporary recording medium 79 can be reduced and the editing apparatus can be made inexpensive or the limited recording capacity of the temporary recording medium 79 can be effectively used at maximum. Furthermore, the video and audio signals can be recorded on the magnetic tape of the video tape cassette at maximum.

Furthermore, as shown in FIGS. 21 and 22, since the editing can be carried out with minimum elements and parts, it is possible to realize an integrated type editing machine. In this case, the video tape cassette insertion mouth of the reproducing-side VCR 20 and the video tape cassette insertion mouth of the recording-side VCR 25 should preferably be disposed at the front wall portion (front panel) of the housing of the editing machine. Unless the temporary recording medium 28 is the fixed type, a media insertion mouth, the operation unit and the display portion (not shown) should preferably be disposed at the front panel of the housing of the editing machine. Terminals and so on should preferably be disposed at the rear portion (rear panel) of the housing of the editing machine. If the editing machine is formed as the integrated type editing machine as described above, then it is possible to remove complex and cumbersome work, such as confirming the connected states of various units, such as VCRs, editing controller and disk drive, after these devices had been connected via specialized cables.

A second embodiment of the present invention will be described below. According to the second embodiment, a recording start point of the second cut and the following cuts can be set.

While time code data of the recording start point of the second cut and the following cuts is obtained by calculation as described above, the present invention is not limited thereto and it is possible to call the recording-side preprocessor routine at step S200 by the subroutine call on the program.

If so, then the recording start point can be set manually so that editing can be carried out as the operator wants to be.

According to the editing method of the present invention, since the second recorded material information is reproduced after the first recorded material information had been recorded on the first recording medium and the reproduced second recorded material information and the first recorded material information corresponding to the edit processing period of the first recorded material information reproduced from the second recording medium are edited and recorded on the first recording medium, the editing can be simplified and the efficiency for editing can be improved considerably. Thus, even when the editing such as the A-B roll editing in which the copying of the B roll is indispensable is carried out, it is possible to carry out such editing with ease without adding the reproducing unit.

According to the editing apparatus of the present invention, the control means controls the recorded material information supplying means and the recording means so that the recorded material information supplying means outputs the first recorded material information and the first recorded material information is recorded on the recording medium of the recording means in the first processing step. The control means controls the temporary holding means so that the temporary holding means holds the recorded material information of a part of the first recorded material information supplied from the recorded material information supplying means as the hold recorded material information in the second processing step. Further, the control means controls the recorded material information supplying means, the temporary holding means, the signal processing means and the recording means so that the recorded material information supplying means outputs the second recorded material information, the temporary holding means outputs the held recorded material information, the signal processing means processes the second recorded material information supplied thereto from the recorded material information supplying means and the held recorded material information supplied thereto from the temporary holding means and the output from the signal processing means is recorded on the recording medium of the recording means in the third step. Therefore, the editing can be simplified and the efficiency for editing can be improved considerably. Thus, even when the editing such as the A-B roll editing in which the copying of the B roll is indispensable is carried out, it is possible to carry out such editing with ease without adding the reproducing unit.

Further, according to the editing method of the present invention, in the editing apparatus, since the recorded material information supplying means, the recording means, the temporary holding means and the signal processing means are properly controlled on the basis of the compared results of time information of the output start and end points of the first recorded material information, the output start and end points of the second recorded material information, the first recording start point on the recording medium of the recording means, the second recording start point on the recording medium of the recording means, the hold start point at which a part of the first recorded material information is held in the temporary holding means, a hold end point at which the temporary holding means finishes holding a part of the first recorded material information, a held information output start point at which held information held by the temporary holding means is output and the signal processing start point at which the signal processing means starts processing the signal and time information from the time information reading means. Therefore, it is possible to execute the editing with high accuracy.

Furthermore, according to the editing apparatus of the present invention, when the first mode is executed, the information compressed and coded by the compressing and coding means is decoded by the compressing and decoding means. When the second mode is executed, the information compressed and coded by the compressing and coding means is supplied to and recorded on the temporary holding means. When the third mode is executed, the compressed and coded information reproduced by the recording means is decoded by the compressing and decoding means. When the fourth mode is executed, the compressed and coded information reproduced by the recording means is supplied to and recorded on the temporary holding means. Therefore, it is possible to make editing become efficient, easier and suitable for general purposes.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. An editing method for editing video data reproduced from a first recording medium and recorded as edited video data on a second recording medium, said method comprising the steps of:

reproducing by a single VCR information to be video edited from said first recording medium including first recorded information and second recorded information;

buffering said first recorded information reproduced from said first recording medium in a buffer which temporarily stores said first recorded information;

reproducing said first recorded information from said buffer when said second recorded information is reproduced from said first recording medium;

video editing said first recorded information with said second recorded information while said first recorded information is reproduced from said buffer and while said second recorded information is reproduced from said first recording medium; and recording on said second recording medium the edited video data.

2. The editing method according to claim 1, wherein said step of buffering further comprises the step of designating a buffering start point of said portion of said first recorded information indicating a beginning of said editing.

3. The editing method according to claim 2, wherein said step of buffering further comprises the step of designating a buffering end point of said portion of second recorded information indicating the end of said editing.

4. The editing method according to claim 1, wherein the step of video editing edits said first recorded information simultaneously with said second recorded information.

5. The editing method according to claim 4, wherein the step of video editing provides mixing, wiping and dissolving said first recorded information with said second recorded information.

6. The method according to claim 1, wherein said first and second recorded information are stored on said first recording medium such that said first and second recorded information are reproducible successively and not simultaneously.

7. An editing apparatus for editing video data comprising:

a reproducing-side circuit for reproducing information to be edited including:

reproducing means comprising a single VCR for continuously reproducing recorded information including first recorded information and second recorded information;

a recording-side circuit for recording said information reproduced by said reproducing-side circuit, including:

recording means for recording, to a recording-side recording medium, said first and second recorded information reproduced by said reproducing means;

buffer means for temporarily buffering said first recorded information;

editing means for video editing said first recorded information together with said second recorded information reproduced by said reproducing means and the first recorded information temporarily buffered by said buffer means; and control means for controlling said single VCR to reproduce and store said first recorded information to said buffer means and to reproduce said second recorded information, for controlling said buffer means to recall said first recorded information while said second recorded information is reproduced by said reproducing means, for controlling said editing means to edit said first recorded information with said second recorded information while said first recorded information is reproduced from said buffer means and while said second recorded information is reproduced from said single VCR, and for controlling said recording means to record the edited portion to said recording-side recording medium.

8. The editing apparatus according to claim 7, wherein said recording-side recording medium is a magnetic tape and said buffer means is a medium selected from the group consisting of a semiconductor memory, a hard disk, a mass-storage flexible disk and a re-writable optical disk.

9. The editing apparatus according to claim 7, wherein said first and second recorded information is video information and said editing means is a video special effects processing unit for processing said video information to include video special effects.

10. The editing apparatus according to claim 7, wherein said first and second recorded information is audio information and said editing means is an audio mixer for mixing audio information.

11. The editing apparatus according to claim 7, further comprising switching means, responsive to said control means, for selectively coupling said reproducing means to said buffer means when said first recorded information is to be buffered, selectively coupling said editing means to said buffer means when said first recorded information is to be edited, and selectively coupling said editing means to said recording means when the edited video data is to be recorded on said recording-side recording medium.

12. The editing apparatus according to claim 7, further comprising an operation unit to supply operator-generated commands; and wherein said control means controls said reproducing means, said editing means, said recording means and said buffer means on the basis of said operator-generated commands.

13. The editing apparatus according to claim 7, wherein said control means controls said reproducing means, said editing means, said recording means and said buffer means on the basis of digital editing data pre-stored in said control means including timing information on which said control means times said editing.

14. The editing apparatus according to claim 7, wherein said recording means further comprise compressing means for compressing recorded information.

15. The editing apparatus according to claim 7, wherein said reproducing means, said editing means, said recording means, said buffering means and said control means are integrally formed on a single integrated circuit as one component.

16. The editing apparatus according to claim 7, further comprising monitor means for displaying outputs of said reproducing means, said editing means, said recording means and said buffer means.

17. The editing apparatus according to claim 7, wherein said control means controls said editing means to edit said first recorded information simultaneously with said second recorded information.

18. The editing apparatus according to claim 17, wherein said control means controls said editing means to mix, wipe and dissolve said first recorded information with said second recorded information.

19. The editing apparatus according to claim 7, wherein said reproducing means is a VCR, which is the single reproducing means of said reproducing-side circuit.

20. The apparatus according to claim 7, wherein said first and second recorded information are stored on said first recording medium such that said first and second recorded information are reproducible successively and not simultaneously.

21. An editing apparatus for editing video data comprising:

reproducing means comprising a single VCR for reproducing from a video tape recorded information including first recorded information followed by second recorded information;

recording means for recording, to a recording medium, said first and second recorded information reproduced by said reproducing means;

buffer means for temporarily buffering said first recorded information;

editing means for video editing said second recorded information reproduced by said reproducing means together with the first recorded information temporarily buffered by said buffer means;

control means for controlling said reproducing means to reproduce and store said first recorded information to said buffer means and to reproduce said second recorded information, for controlling said buffer means to recall said first recorded information while said second recorded information is reproduced from said video tape by said reproducing means, for controlling said editing means to edit an edit portion composed of at least a portion of said first recorded information and at least a portion of said second recorded information, and for controlling said recording means to record the information reproduced by said reproducing means with said edit portion to said recording medium;

time information reading means for reading first time information from said reproducing means indicating timing of said first and second recorded information reproduced by said reproducing means, second time information indicating timing of the recording by said recording means, third time information indicating timing of buffering said first recorded information to said buffer means, and fourth time information indicating timing of editing to be performed by said editing means;

comparing means for comparing said first, second, third and fourth time information read by said time information reading means; and wherein, said control means controls said reproducing means, said recording means, said buffer means and said editing means to perform editing based on the comparison performed by said comparing means.

22. The editing apparatus according to claim 21, further comprising coordinating means for coordinating operations of said reproducing means and said recording means such that recording positions of said reproducing means and said recording means are matched.

23. The editing apparatus according to claim 22, wherein said comparing means performs said comparison based on said first time information including an output start point and an output end point for reproducing said first recorded information, an output start point and an output end point for reproducing said second recorded information.

24. The editing apparatus according to claim 23, wherein said comparing means performs said comparison on the basis of said second time information including a first recording start point on said recording-side recording medium of said recording means and a second recording start point on said recording-side recording medium of said recording means.

25. The editing apparatus according to claim 24, wherein said comparing means performs said comparison on the basis of said third time information including a buffer start point at which point said buffer means starts to buffer said portion of first recorded information and a buffer end point at which point said buffer means stops buffering said portion of first recorded information.

26. The editing apparatus according to claim 25, wherein said comparing means performs said comparison on the basis of said fourth time information including a buffer output start point at which point said first recorded information buffered by said buffer means is output to said editing means for editing and an editing start point at which point said editing means starts editing.

* * * * *